(12) United States Patent
Sanjana

(10) Patent No.: US 12,460,200 B2
(45) Date of Patent: Nov. 4, 2025

(54) METHODS AND COMPOSITIONS COMPRISING CRISPR-Cpf1 AND PAIRED GUIDE CRISPR RNAs FOR PROGRAMMABLE GENOMIC DELETIONS

(71) Applicants: NEW YORK GENOME CENTER, INC., New York, NY (US); NEW YORK UNIVERSITY, New York, NY (US)

(72) Inventor: Neville Espi Sanjana, New York, NY (US)

(73) Assignees: NEW YORK GENOME CENTER, INC., New York, NY (US); NEW YORK UNIVERSITY, New York, NY (US)

(*) Notice: Subject to any disclaimer, the term of this patent is extended or adjusted under 35 U.S.C. 154(b) by 1238 days.

(21) Appl. No.: 16/806,197

(22) Filed: Mar. 2, 2020

(65) Prior Publication Data

US 2020/0208141 A1 Jul. 2, 2020

Related U.S. Application Data

(63) Continuation of application No. PCT/US2018/048767, filed on Aug. 30, 2018.

(60) Provisional application No. 62/552,816, filed on Aug. 31, 2017.

(51) Int. Cl.
*C12N 15/10* (2006.01)
*C12N 15/86* (2006.01)

(52) U.S. Cl.
CPC ......... *C12N 15/1082* (2013.01); *C12N 15/86* (2013.01); *C12N 2310/20* (2017.05); *C12N 2750/14141* (2013.01)

(58) Field of Classification Search
None
See application file for complete search history.

(56) References Cited

U.S. PATENT DOCUMENTS

| | | | |
|---|---|---|---|
| 5,902,880 A | 5/1999 | Thompson | |
| 7,195,916 B2 | 3/2007 | Qin et al. | |
| 9,650,617 B2 | 5/2017 | May et al. | |
| 2016/0074535 A1* | 3/2016 | Ranganathan | C12N 15/86 435/325 |
| 2016/0208243 A1* | 7/2016 | Zhang | C12N 15/111 |

FOREIGN PATENT DOCUMENTS

| | | |
|---|---|---|
| EP | 3 009 511 B1 | 4/2016 |
| GB | 2 211 504 A | 7/1989 |
| WO | WO-96/09378 A1 | 3/1996 |
| WO | WO-2014/015134 A1 | 1/2014 |
| WO | WO-2016/054153 A1 | 4/2016 |
| WO | WO-2017/066588 A2 | 4/2017 |
| WO | WO-2017/127807 A1 | 7/2017 |

OTHER PUBLICATIONS

Jo et al. 2015 Efficient Mitochondrial Genome Editing by CRISPR/Cas9 BioMed Research International vol. 2015, Article ID 305716, 10 pages (Year: 2015).*
Makarova, et al., "An updated evolutionary classification of CRISPR-Cas systems," Nature Reviews—Microbiology, Sep. 28, 2015, vol. 13 (pp. 722-736).
Schunder et al., "First indication for a functional CRISPR/Cas system in Francisella tularensis, "International Journal of Medical Microbiology, Mar. 1, 2013, vol. 303 (pp. 51-60).
Shmakov et al., "Discovery and Functional Characterization of Diverse Class 2 CRISPR-Cas Systems", Molecular Cell, Nov. 1, 2015, vol. 60, No. 3 (pp. 385-397).
Vestergaard et al., "CRISPR adaptive immune systems of Archaea," RNA Biology, Feb. 14, 2014, vol. 11, No. 2 (pp. 156-167).
Zetsche et al., "Cpf1 is a single RNA-guided endonuclease of a class 2 CRISPR-Cas system," Cell, Oct. 22, 2015, vol. 163 (pp. 759-771).
Brake et al., "Lentiviral Vector Design for Multiple shRNA Expression and Durable HIV-I Inhibition" Molecular Therapy, Mar. 2008, vol. 16, No. 3 (pp. 557-564).
Canver et al., "Characterization of genomic deletion efficiency mediated by clustered regularly interspaced palindromic repeats (CRISPR)/Cas9 nuclease system in mammalian cells," Journal of Biological Chemistry, Aug. 1, 2014, vol. 289, No. 31 (pp. 21312-21324).
Diao et al., "A tiling1deletion based genetic screen for cis-regulatory element identification in mammalian cells," Nature Methods, Jun. 2017, vol. 14, No. 6 (pp. 629-635).
Doench et al., "Optimized sgRNA design to maximize activity and minimize off-target effects of CRISPR-Cas9", Nature Biotechnology, Feb. 2016, vol. 34, No. 2 (pp. 184-191).
Fonfara et al., "The CRISPR-associated DNA-cleaving enzyme Cpf1 also processes precursor CRISPR RNA," Nature, 2016, vol. 532 (pp. 517-521).

(Continued)

*Primary Examiner* — Jennifer Dunston
*Assistant Examiner* — Tiffany Nicole Grooms
(74) *Attorney, Agent, or Firm* — FOLEY & LARDNER LLP

(57) ABSTRACT

Described are methods comprises transducing a mammalian cell with one or more virus vectors. Each vector comprises a nucleic acid sequence encoding a Cpf1 (also known as Cas12a) protein and an optional selectable marker in operative association with an RNA pol II promoter which controls expression thereof, and a CRISPR RNA (crRNA) array comprising at least two spacers in operative association with an RNA pol III promoter. Each spacer encodes an RNA guide which hybridizes to a unique sequence located 3' from a T-rich protospacer-adjacent motif (PAM) in a genomic region of interest. The method further comprises culturing the transduced cells, thereby providing a plurality of cultured cell cultures, each cell culture comprising said deletion. Additionally, described are compositions used in methods as well as libraries generated by the methods. Such compositions comprise libraries of transduced cell cultures, viral vectors, nucleic acid sequences, CRISPR RNA spacers, and RNA guides, as described herein.

20 Claims, 19 Drawing Sheets
Specification includes a Sequence Listing.

(56) References Cited

OTHER PUBLICATIONS

Goeddel ed., "Gene expression technology," Table of Contents for Methods in Enzymology, vol. 185, Academic Press, 1990 (7 pages).
Gong et al., "A gene expression atlas of the central nervous system based on bacterial artificial chromosomes," Nature, 2003, vol. 425 (pp. 917-925).
Hsu et al., "DNA targeting specificity of RNA-guided Cas9 nucleases", Nature Biotechnology, Sep. 2013, vol. 31, No. 9 (pp. 827-832).
Kadonaga, "Perspectives on the RNA polymerase II core promoter," Wiley Interdisciplinary Review, Developmental Biology, Jan. 2012, vol. 1, No. 1 (pp. 40-51).
Kim et al., "Genome-wide analysis reveals specificities of Cpf1 endonucleases in human cells," Nature Biotechnology, Jun. 6, 2016, vol. 34, No. 8, (corrected Jul. 18, 2016)(pp. 863-888).
Kim et al., "In vivo high-throughput profiling of CRISPR-Cpf1 activity," Manuscript Version, Nature Methods, Dec. 2016, vol. 14, No. 2 (23 pages).
Kleinstiver et al., "Genome-wide specificities of CRISPR-Cas Cpf1 nucleases in human cells," Nature Biotechnology, Aug. 2016, vol. 34, No. 8 (pp. 869-874).
Kumar et al., "Predicting the effects of coding non-synonymous variants on protein function using the SIFT algorithm," Nature Protocols, 2009, vol. 4, No. 8 (pp. 1073-1082).
Ma et al., "Quantitative analysis of copy number variants based on real-time Light Cycler PCR," Current Protocols in Human Genetics, Jan. 21, 2015, vol. 80 (10 pages).
Ng et al., "Accounting for Human Polymorphisms Predicted to Affect Protein Function," Genome Research, 2002, vol. 12, No. 3 (pp. 436-446).
Ng et al., "Predicting the Effects of Amino Acid Substitutions on Protein Function," Annual Review of Genomics and Human Genetics, Sep. 22, 2006, vol. 7 (pp. 61-80).
Ng et al., "SIFT: predicting amino acid changes that affect protein function," Nucleic Acids Research, 2003, vol. 31, No. 13 (pp. 3812-3814).
Pulido-Quetglas et al., "Scalable Design of Paired CRISPR Guide RNAs for Genomic Deletion," PLOS, Computational Biology, Mar. 2, 2017, vol. 13, No. 3 (18 pages).
Sanjana et al., "Improved vectors and genome-wide libraries for CRISPR screening," HHS Public Access Author Manuscript, 2014, vol. 11 (pp. 2145-2148).
Sim et al., "SIFT web server: predicting effects of amino acid substitutions on proteins," Nucleic Acids Research, 2012, vol. 40, Web Server issue (pp. W452-W457).
Thompson et al., "A comprehensive comparison of multiple sequence alignment programs," Nucleic Acids Research, Jul. 1, 1999, vol. 27, No. 13 (pp. 2682-2690).
Yacoub et al., "Optimized production and concentration of lentiviral vectors containing large inserts," The Journal of Gene Medicine, 2007, vol. 9 (pp. 579-584).
Yamano et al., "Crystal Structure of Cpf1 in Complex with Guide RNA and Target DNA," Cell, vol. 165, May 5, 2016 (pp. 949-962), including p. S1-S7 of Supplemental Figures, and pp. 1-2 of Supplemental Information.
Young et al., "A Single CRISPR-Cas9 Deletion Strategy that Targets the Majority of DMD Patients Restores Dystrophin Function in hiPSC Derived Muscle Cells," Cell Stem Cell, Apr. 7, 2016, vol. 18, No. 4 (pp. 533-540).
Zetsche et al., "A Survey of Genome Editing Activity for 16 Cpf1 orthologs," BioRxiv Preprint, this version posted May 4, 2017 (16 pages).
Zetsche et al., "Multiplex gene editing by CRISPR-Cpf1 using a single crRNA array," Nature Biotechnology, Jan. 2017, vol. 35, No. 1 (pp. 31-34).
Zhu, S. et al., "Genome-scale deletion screening of human long non-coding RNAs using a paired-guide RNA CRISPR-Cas9 library," Nature Biotechnology, Oct. 31, 2016, vol. 34, No. 12 (pp. 1279-1286).

* cited by examiner

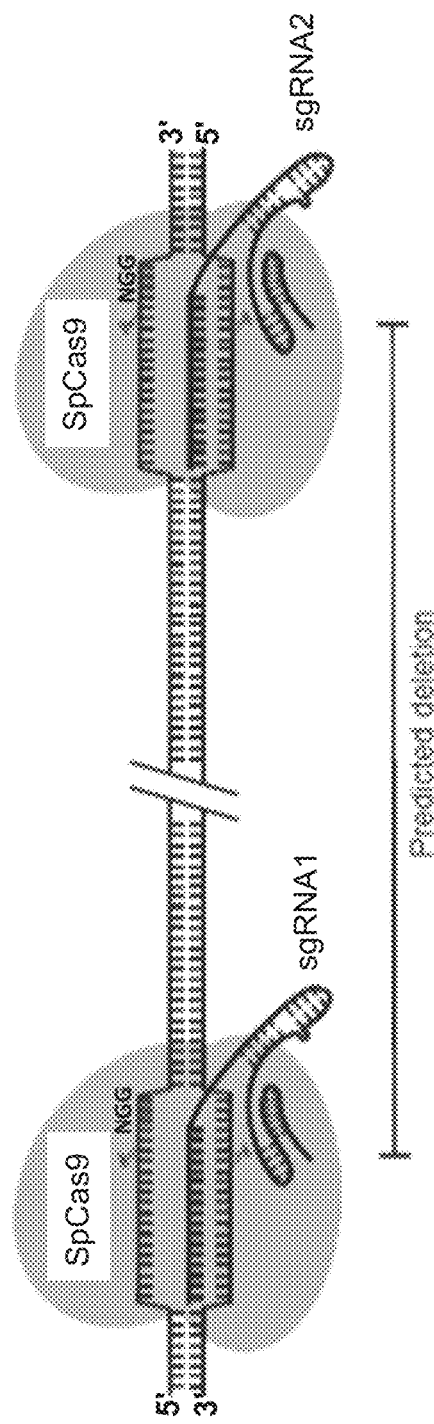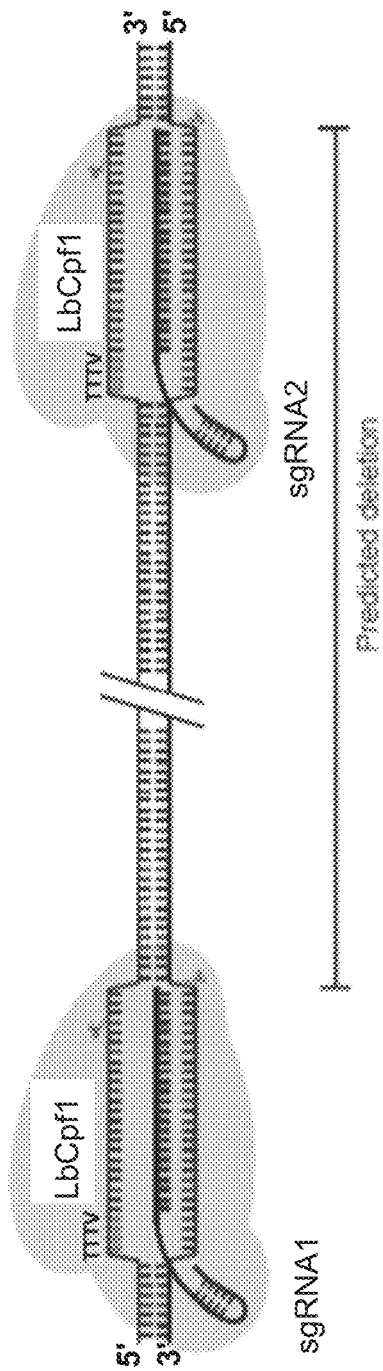

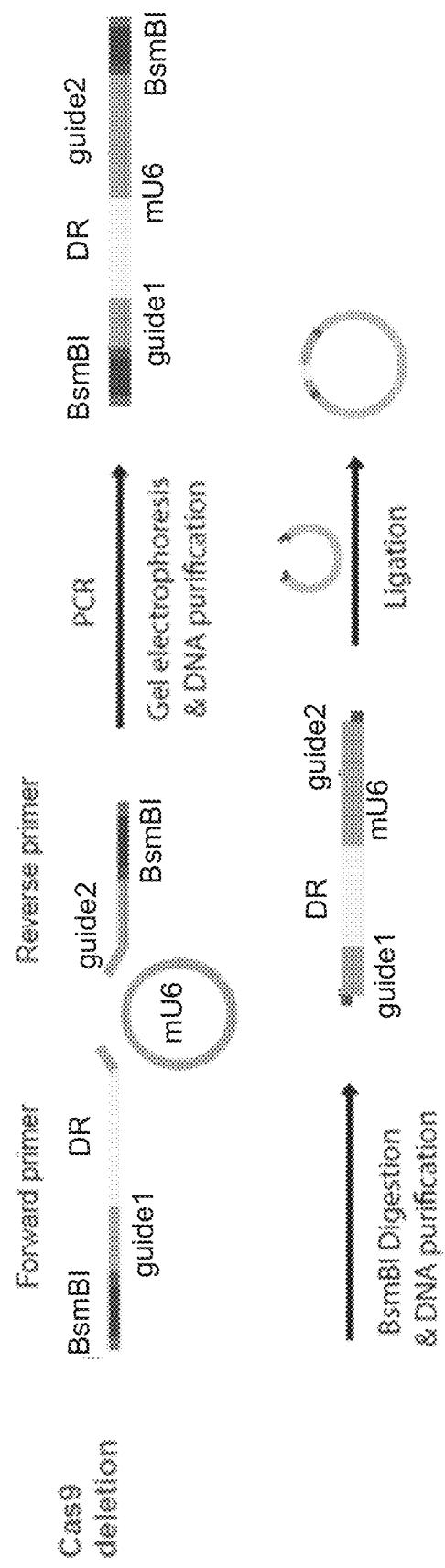
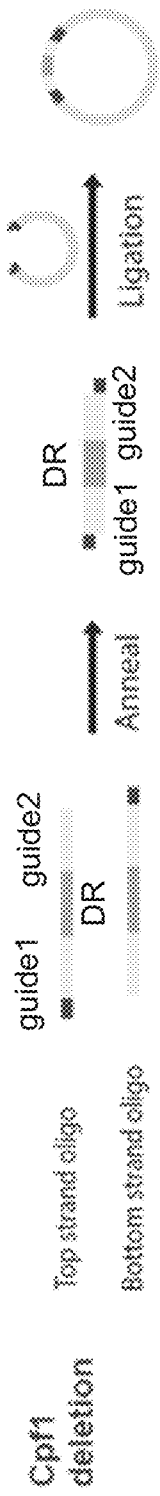
FIG. 3A
FIG. 3B

FIG. 11A

```
GC..46bp..CTCAGCTAAAGGGCGGGAGTCGCGAGG..4970bp..CCACCCAGAGAGACTTTAATCTTCCTT
GC..46bp..CTCAGCTAAAGGGCGGGAGT------------//------------CCAGAGACTTTAATCTTCCTT    21/44
GC..46bp..CTCAGCTAAAGGGCG------------------//------------GAGACTTTAATCTTCCTT       5/44
GC..46bp..CTCAGCTAAAGGGCGGGAGT------------//------------CAGAGACTTTAATCTTCCTT      8/44
GC..46bp..CTCAGCTAAAGGGCGGGAGTC-----------//------------GACTTTAATCTTCCTT          1/44
GC..46bp..CTCAGCTAAAGGGCG------------------//------------GACTTTAATCTTCCTT          1/44
GC..46bp..CTCAGCTAAAGGG---------------------//------------CTTTAATCTTCCTT           1/44
GC..46bp..CTCAG-----------------------------//------------CAGAGACTTTAATCTTCCTT     1/44
GC..46bp..CTCAGCTAA--------------------------//------------CAGAGACTTTAATCTTCCTT    1/44
GC..46bp..CTCAGCTAAAG------------------------//------------AGAGACTTTAATCTTCCTT     1/44
GC..46bp..CTCAGCTAAAGGGCGGGAGT---------------//------------CAGAGACTTTAATCTTCCTT    1/44
GC..46bp..CTCCGCT---------------------------//------------CTTTAATCTTCCTT          1/44
GC-----------------------------------------//------------CAGAGACTTTAATCTTCCTT     1/44
GC-----------------------------------------//------------CTTTAATCTTCCTT           1/44
```

FIG. 11B

| # | | | | |
|---|---|---|---|---|
| 1 | TA..100bp...AG..36bp..GGCTCCAGTCCGGCTTTTGCCTTCCGACTGCGGGCTCCCTCCC | ..4981bp.. |
| 2 | TA..100bp...AG..36bp..GGCTCCAGTCCGGCTTTTGCCTTCCGACTGCGGGCTCCCTCC------ | // |
| 3 | TA..100bp...AG..36bp..GGCTCCAGTCCGGCTTTTG--------------------------- | // |
| 4 | TA..100bp...AG..36bp..GGCTCCAGTCCGGCTTTTGCCTTCCG------------------- | // |
| 5 | TA..100bp...AG..36bp..GGCTCCAGTCCGGCTTTTGCCTTCCG------------------- | // |
| 6 | TA..100bp...AG..36bp..GGCTCCAGTCCGGCTTTTGCCTTCCGACTGCGGGC---------- | // |
| 7 | TA..100bp...AG..36bp..GGCTCCAGTCCGGCTTTTGCCTTCCGACTGCGGGCT--------- | // |
| 8 | TA..100bp...AG..36bp..GGCTCCAGTCCGGCTTTTGCCTTCCGACTGCGGGCTCCCTCCC-- | // |
| 9 | TA..100bp...AG..36bp..GGCTCCAGTCCGGCTTTTGCCTTCC------------------- | // |
| 10 | TA..100bp...AG..36bp..GGCTCCAGTCCGGCTTTTGCCTTCCGACTGCGGGCTCCCTC---- | // |
| 11 | TA..100bp...AG..36bp..GGCTCCAGTCCGGCTTTTGCCTTCCGACTGCGGGG---------- | // |
| 12 | TA..100bp...AG..36bp..GGCTCCAGTCCGGCTTTTGCCTTCCGACTGCGGGCTCCAC----- | // |
| 13 | TA..100bp...AG..36bp..GGCTCCAGTCCGGCTTTTGCCTTCCGACTGCGGGCTC-------- | // |
| 14 | TA..100bp...AG..36bp..GGCTCCAGTCCGGCTTTTGCCTTCCT------------------- | // |
| 15 | TA..100bp...AG..36bp..GGCTCCAGTCCGGCTTTTGCCTTCCGACTGCGGGCTC-------- | // |
| 16 | TA..100bp...AG..36bp..GGCTCCAGTCCGGCTTTTGCCTTGCC------------------- | // |
| 17 | TA..100bp...AG..36bp..GGCTCCAGTCCGGCTTTTGCCTTCCGACTGCGGGCTCCCTCC--- | // |
| 18 | TA..100bp...AG..36bp..GGCTCCAGTCCGGCTTTTGCCGCAGTCG---------------- | // |
| 19 | TA..100bp...AG..36bp..GGCTCCAGTCCGGCTTTTGCCTTCCGACTGCGG------------ | // |
| 20 | TA..100bp...AG..36bp..GGCTCCAGTCCGGCTTTTGCCTTCCG------------------- | // |
| 21 | TA..100bp...AG..36bp..GG--------------------------------------------- | // |
| 22 | TA..100bp...AG..36bp..GGCTCCAGTCCGGCTTTTGCCTTCCGA----------------- | // |
| 23 | TA..100bp...AG..36bp..GGCTCCAGTCCGGCTTTTGCCTTCCGACTGCGGGC---------- | // |
| 24 | TA..100bp...AG..36bp..GGCTCCAGTCCGGCTTTTGCCTC-------------------- | // |
| 25 | TA--------------------------------------------------------------- | // |
| 26 | TA..100bp...AG..36bp..GGCTCCAGTCCGGCTTTTGCCTTCCGACTGCGGGC---------- | // |
| 27 | TA..100bp...AG..36bp..GGCTCCAGTCCGGC------------------------------- | // |
| 28 | TA..100bp...AG..36bp..GGCTCCAGTCCGG-------------------------------- | // |
| 29 | TA..100bp...AG..36bp..GGCTCCAGTCCGGCTTTTGCCTTCCGACTGCGGGC---------- | // |
| 30 | TA..100bp...AG..36bp..GGCTCCAGTCCGGCTTTTGCCTTCCGACTGCGGGCTCCCTC---- | // |

FIG. 11B Continued

| # | | | | | |
|---|---|---|---|---|---|
| 1 | CTGTCTCTATTCCACTATCCCAAGTCAAAACTT | ..9bp.. | CG..18bp.. | CT..25bp.. | TG |
| 2 | -------TCCACTATCCCAAGTCAAGTCAAAACTT | ..9bp.. | CG..18bp.. | CT..25bp.. | TG | 4/39 |
| 3 | ---------CCACTATCCCAAGTCAAAACTT | ..9bp.. | CG..18bp.. | CT..25bp.. | TG | 3/39 |
| 4 | ----------------------------ACTT | ..9bp.. | CG..18bp.. | CT..25bp.. | TG | 3/39 |
| 5 | -------ACTATCCCAAGTCAAAACTT | ..9bp.. | CG..18bp.. | CT..25bp.. | TG | 2/39 |
| 6 | ------TCCACTATCCCAAGTCAAAACTT | ..9bp.. | CG..18bp.. | CT..25bp.. | TG | 2/39 |
| 7 | -------CTATCCCAAGTCAAAACTT | ..9bp.. | CG..18bp.. | CT..25bp.. | TG | 2/39 |
| 8 | -----ATTCCACTATCCCAAGTCAAAACTT | ..9bp.. | CG..18bp.. | CT..25bp.. | TG | 1/39 |
| 9 | -----------------------TCAAAACTT | ..9bp.. | CG..18bp.. | CT..25bp.. | TG | 1/39 |
| 10 | ---------CCACTATCCCAAGTCAAAACTT | ..9bp.. | CG..18bp.. | CT..25bp.. | TG | 1/39 |
| 11 | ----------CACTATCCCAAGTCAAAACTT | ..9bp.. | CG..18bp.. | CT..25bp.. | TG | 1/39 |
| 12 | -----------------------TATCAAGTCAAAACTT | ..9bp.. | CG..18bp.. | CT..25bp.. | TG | 1/39 |
| 13 | ---TCTGTTCCACTATCCCAAGTCAAAACTT | ..9bp.. | CG..18bp.. | CT..25bp.. | TG | 1/39 |
| 14 | -------------CCAAGTCAAAACTT | ..9bp.. | CG..18bp.. | CT..25bp.. | TG | 1/39 |
| 15 | -------GTCCACTATCCCAAGTCAAAACTT | ..9bp.. | CG..18bp.. | CT..25bp.. | TG | 1/39 |
| 16 | -------TCCCACTATCCCAAGTCAAAACTT | ..9bp.. | CG..18bp.. | CT..25bp.. | TG | 1/39 |
| 17 | -----ATTCCACTATCCCAAGTCAAAACTT | ..9bp.. | CG..18bp.. | CT..25bp.. | TG | 1/39 |
| 18 | ------GACTTGGGATAGTCAAAACTT | ..9bp.. | CG..18bp.. | CT..25bp.. | TG | 1/39 |
| 19 | ---CTCTATTCCACTATCCCAAGTCAAAACTT | ..9bp.. | CG..18bp.. | CT..25bp.. | TG | 1/39 |
| 20 | -----ATTCCACTATCCCAAGTCAAAACTT | ..9bp.. | CG..18bp.. | CT..25bp.. | TG | 1/39 |
| 21 | ---------------AGTCAAAACTT | ..9bp.. | CG..18bp.. | CT..25bp.. | TG | 1/39 |
| 22 | ------------------------------- | ------ | --..18bp.. | CT..25bp.. | TG | 1/39 |
| 23 | --------------------GCAAAACTT | ..9bp.. | CG..18bp.. | CT..25bp.. | TG | 1/39 |
| 24 | ------------------------------- | ------ | CG..18bp.. | CT..25bp.. | TG | 1/39 |
| 25 | ----------CCCAAGTCAAAACTT | ..9bp.. | CG..18bp.. | CT..25bp.. | TG | 1/39 |
| 26 | ------------------------------- | ------ | ------ | ------ | AG | 1/39 |
| 27 | ------------------------TCAAAACTT | ..9bp.. | CG..18bp.. | CT..25bp.. | TG | 1/39 |
| 28 | -----------------------------CTT | ..9bp.. | CG..18bp.. | CT..25bp.. | TG | 1/39 |
| 29 | ----------TCCCAAGTCAAAACTT | ..9bp.. | CG..18bp.. | CT..25bp.. | TG | 1/39 |
| 30 | ---------CCCAAGTCAAAACTT | ..9bp.. | CG..18bp.. | CT..25bp.. | TG | 1/39 |

SEQUENCE LISTING

<160> NUMBER OF SEQ ID NOS: 125

<210> SEQ ID NO 1
<211> LENGTH: 1307
<212> TYPE: PRT
<213> ORGANISM: Acidaminococcus sp.

<400> SEQUENCE: 1

Met Thr Gln Phe Glu Gly Phe Thr Asn Leu Tyr Gln Val Ser Lys Thr
1               5                   10                  15

Leu Arg Phe Glu Leu Ile Pro Gln Gly Lys Thr Leu Lys His Ile Gln
            20                  25                  30

Glu Gln Gly Phe Ile Glu Glu Asp Lys Ala Arg Asn Asp His Tyr Lys
        35                  40                  45

Glu Leu Lys Pro Ile Ile Asp Arg Ile Tyr Lys Thr Tyr Ala Asp Gln
    50                  55                  60

Cys Leu Gln Leu Val Gln Leu Asp Trp Glu Asn Leu Ser Ala Ala Ile
65                  70                  75                  80

Asp Ser Tyr Arg Lys Glu Lys Thr Glu Glu Thr Arg Asn Ala Leu Ile
                85                  90                  95

Glu Glu Gln Ala Thr Tyr Arg Asn Ala Ile His Asp Tyr Phe Ile Gly
            100                 105                 110

Arg Thr Asp Asn Leu Thr Asp Ala Ile Asn Lys Arg His Ala Glu Ile
        115                 120                 125

Tyr Lys Gly Leu Phe Lys Ala Glu Leu Phe Asn Gly Lys Val Leu Lys
    130                 135                 140

Gln Leu Gly Thr Val Thr Thr Thr Glu His Glu Asn Ala Leu Leu Arg
145                 150                 155                 160

Ser Phe Asp Lys Phe Thr Thr Tyr Phe Ser Gly Phe Tyr Glu Asn Arg
                165                 170                 175

Lys Asn Val Phe Ser Ala Glu Asp Ile Ser Thr Ala Ile Pro His Arg
            180                 185                 190

Ile Val Gln Asp Asn Phe Pro Lys Phe Lys Glu Asn Cys His Ile Phe
        195                 200                 205

Thr Arg Leu Ile Thr Ala Val Pro Ser Leu Arg Glu His Phe Glu Asn
    210                 215                 220

Val Lys Lys Ala Ile Gly Ile Phe Val Ser Thr Ser Ile Glu Glu Val
225                 230                 235                 240

Phe Ser Phe Pro Phe Tyr Asn Gln Leu Leu Thr Gln Thr Gln Ile Asp
                245                 250                 255

Leu Tyr Asn Gln Leu Leu Gly Gly Ile Ser Arg Glu Ala Gly Thr Glu
            260                 265                 270

Lys Ile Lys Gly Leu Asn Glu Val Leu Asn Leu Ala Ile Gln Lys Asn
        275                 280                 285

Asp Glu Thr Ala His Ile Ile Ala Ser Leu Pro His Arg Phe Ile Pro
    290                 295                 300

Leu Phe Lys Gln Ile Leu Ser Asp Arg Asn Thr Leu Ser Phe Ile Leu
305                 310                 315                 320

Glu Glu Phe Lys Ser Asp Glu Glu Val Ile Gln Ser Phe Cys Lys Tyr
                325                 330                 335

Lys Thr Leu Leu Arg Asn Glu Asn Val Leu Glu Thr Ala Glu Ala Leu
            340                 345                 350

Phe Asn Glu Leu Asn Ser Ile Asp Leu Thr His Ile Phe Ile Ser His
        355                 360                 365

```
Lys Lys Leu Glu Thr Ile Ser Ser Ala Leu Cys Asp His Trp Asp Thr
370                 375                 380

Leu Arg Asn Ala Leu Tyr Glu Arg Arg Ile Ser Glu Leu Thr Gly Lys
385                 390                 395                 400

Ile Thr Lys Ser Ala Lys Glu Lys Val Gln Arg Ser Leu Lys His Glu
            405                 410                 415

Asp Ile Asn Leu Gln Glu Ile Ile Ser Ala Ala Gly Lys Glu Leu Ser
        420                 425                 430

Glu Ala Phe Lys Gln Lys Thr Ser Glu Ile Leu Ser His Ala His Ala
        435                 440                 445

Ala Leu Asp Gln Pro Leu Pro Thr Thr Leu Lys Lys Gln Glu Glu Lys
450                 455                 460

Glu Ile Leu Lys Ser Gln Leu Asp Ser Leu Leu Gly Leu Tyr His Leu
465                 470                 475                 480

Leu Asp Trp Phe Ala Val Asp Glu Ser Asn Glu Val Asp Pro Glu Phe
            485                 490                 495

Ser Ala Arg Leu Thr Gly Ile Lys Leu Glu Met Glu Pro Ser Leu Ser
            500                 505                 510

Phe Tyr Asn Lys Ala Arg Asn Tyr Ala Thr Lys Lys Pro Tyr Ser Val
            515                 520                 525

Glu Lys Phe Lys Leu Asn Phe Gln Met Pro Thr Leu Ala Ser Gly Trp
530                 535                 540

Asp Val Asn Lys Glu Lys Asn Asn Gly Ala Ile Leu Phe Val Lys Asn
545                 550                 555                 560

Gly Leu Tyr Tyr Leu Gly Ile Met Pro Lys Gln Lys Gly Arg Tyr Lys
                565                 570                 575

Ala Leu Ser Phe Glu Pro Thr Glu Lys Thr Ser Glu Gly Phe Asp Lys
            580                 585                 590

Met Tyr Tyr Asp Tyr Phe Pro Asp Ala Ala Lys Met Ile Pro Lys Cys
    595                 600                 605

Ser Thr Gln Leu Lys Ala Val Thr Ala His Phe Gln Thr His Thr Thr
        610                 615                 620

Pro Ile Leu Leu Ser Asn Asn Phe Ile Glu Pro Leu Glu Ile Thr Lys
625                 630                 635                 640

Glu Ile Tyr Asp Leu Asn Asn Pro Glu Lys Glu Pro Lys Lys Phe Gln
            645                 650                 655

Thr Ala Tyr Ala Lys Lys Thr Gly Asp Gln Lys Gly Tyr Arg Glu Ala
            660                 665                 670

Leu Cys Lys Trp Ile Asp Phe Thr Arg Asp Phe Leu Ser Lys Tyr Thr
        675                 680                 685

Lys Thr Thr Ser Ile Asp Leu Ser Ser Leu Arg Pro Ser Ser Gln Tyr
        690                 695                 700

Lys Asp Leu Gly Glu Tyr Tyr Ala Glu Leu Asn Pro Leu Leu Tyr His
705                 710                 715                 720

Ile Ser Phe Gln Arg Ile Ala Glu Lys Glu Ile Met Asp Ala Val Glu
            725                 730                 735

Thr Gly Lys Leu Tyr Leu Phe Gln Ile Tyr Asn Lys Asp Phe Ala Lys
            740                 745                 750

Gly His His Gly Lys Pro Asn Leu His Thr Leu Tyr Trp Thr Gly Leu
        755                 760                 765

Phe Ser Pro Glu Asn Leu Ala Lys Thr Ser Ile Lys Leu Asn Gly Gln
770                 775                 780

Ala Glu Leu Phe Tyr Arg Pro Lys Ser Arg Met Lys Arg Met Ala His
```

-continued

```
             785                 790                 795                 800
        Arg Leu Gly Glu Lys Met Leu Asn Lys Lys Leu Lys Asp Gln Lys Thr
                         805                 810                 815

Pro Ile Pro Asp Thr Leu Tyr Gln Glu Leu Tyr Asp Tyr Val Asn His
                         820                 825                 830

Arg Leu Ser His Asp Leu Ser Asp Glu Ala Arg Ala Leu Leu Pro Asn
                         835                 840                 845

Val Ile Thr Lys Glu Val Ser His Glu Ile Ile Lys Asp Arg Arg Phe
                         850                 855                 860

Thr Ser Asp Lys Phe Phe Phe His Val Pro Ile Thr Leu Asn Tyr Gln
        865                 870                 875                 880

Ala Ala Asn Ser Pro Ser Lys Phe Asn Gln Arg Val Asn Ala Tyr Leu
                         885                 890                 895

Lys Glu His Pro Glu Thr Pro Ile Ile Gly Ile Asp Arg Gly Glu Arg
                         900                 905                 910

Asn Leu Ile Tyr Ile Thr Val Ile Asp Ser Thr Gly Lys Ile Leu Glu
                         915                 920                 925

Gln Arg Ser Leu Asn Thr Ile Gln Gln Phe Asp Tyr Gln Lys Lys Leu
                         930                 935                 940

Asp Asn Arg Glu Lys Glu Arg Val Ala Ala Arg Gln Ala Trp Ser Val
        945                 950                 955                 960

Val Gly Thr Ile Lys Asp Leu Lys Gln Gly Tyr Leu Ser Gln Val Ile
                         965                 970                 975

His Glu Ile Val Asp Leu Met Ile His Tyr Gln Ala Val Val Val Leu
                         980                 985                 990

Glu Asn Leu Asn Phe Gly Phe Lys  Ser Lys Arg Thr Gly  Ile Ala Glu
                    995                 1000                1005

Lys Ala Val Tyr Gln Gln Phe  Glu Lys Met Leu Ile  Asp Lys Leu
                    1010                1015                1020

Asn Cys Leu Val Leu Lys Asp  Tyr Pro Ala Glu Lys  Val Gly Gly
                    1025                1030                1035

Val Leu Asn Pro Tyr Gln Leu  Thr Asp Gln Phe Thr  Ser Phe Ala
                    1040                1045                1050

Lys Met Gly Thr Gln Ser Gly  Phe Leu Phe Tyr Val  Pro Ala Pro
                    1055                1060                1065

Tyr Thr Ser Lys Ile Asp Pro  Leu Thr Gly Phe Val  Asp Pro Phe
                    1070                1075                1080

Val Trp Lys Thr Ile Lys Asn  His Glu Ser Arg Lys  His Phe Leu
                    1085                1090                1095

Glu Gly Phe Asp Phe Leu His  Tyr Asp Val Lys Thr  Gly Asp Phe
                    1100                1105                1110

Ile Leu His Phe Lys Met Asn  Arg Asn Leu Ser Phe  Gln Arg Gly
                    1115                1120                1125

Leu Pro Gly Phe Met Pro Ala  Trp Asp Ile Val Phe  Glu Lys Asn
                    1130                1135                1140

Glu Thr Gln Phe Asp Ala Lys  Gly Thr Pro Phe Ile  Ala Gly Lys
                    1145                1150                1155

Arg Ile Val Pro Val Ile Glu  Asn His Arg Phe Thr  Gly Arg Tyr
                    1160                1165                1170

Arg Asp Leu Tyr Pro Ala Asn  Glu Leu Ile Ala Leu  Leu Glu Glu
                    1175                1180                1185

Lys Gly Ile Val Phe Arg Asp  Gly Ser Asn Ile Leu  Pro Lys Leu
                    1190                1195                1200
```

-continued

```
Leu Glu Asn Asp Asp Ser His Ala Ile Asp Thr Met Val Ala Leu
    1205                1210                1215

Ile Arg Ser Val Leu Gln Met Arg Asn Ser Asn Ala Ala Thr Gly
    1220                1225                1230

Glu Asp Tyr Ile Asn Ser Pro Val Arg Asp Leu Asn Gly Val Cys
    1235                1240                1245

Phe Asp Ser Arg Phe Gln Asn Pro Glu Trp Pro Met Asp Ala Asp
    1250                1255                1260

Ala Asn Gly Ala Tyr His Ile Ala Leu Lys Gly Gln Leu Leu Leu
    1265                1270                1275

Asn His Leu Lys Glu Ser Lys Asp Leu Lys Leu Gln Asn Gly Ile
    1280                1285                1290

Ser Asn Gln Asp Trp Leu Ala Tyr Ile Gln Glu Leu Arg Asn
    1295                1300                1305
```

<210> SEQ ID NO 2
<211> LENGTH: 1300
<212> TYPE: PRT
<213> ORGANISM: Francisella tularensis

<400> SEQUENCE: 2

```
Met Ser Ile Tyr Gln Glu Phe Val Asn Lys Tyr Ser Leu Ser Lys Thr
1               5                   10                  15

Leu Arg Phe Glu Leu Ile Pro Gln Gly Lys Thr Leu Glu Asn Ile Lys
                20                  25                  30

Ala Arg Gly Leu Ile Leu Asp Asp Glu Lys Arg Ala Lys Asp Tyr Lys
            35                  40                  45

Lys Ala Lys Gln Ile Ile Asp Lys Tyr His Gln Phe Phe Ile Glu Glu
        50                  55                  60

Ile Leu Ser Ser Val Cys Ile Ser Glu Asp Leu Leu Gln Asn Tyr Ser
65                  70                  75                  80

Asp Val Tyr Phe Lys Leu Lys Lys Ser Asp Asp Asn Leu Gln Lys
                85                  90                  95

Asp Phe Lys Ser Ala Lys Asp Thr Ile Lys Lys Gln Ile Ser Glu Tyr
                100                 105                 110

Ile Lys Asp Ser Glu Lys Phe Lys Asn Leu Phe Asn Gln Asn Leu Ile
            115                 120                 125

Asp Ala Lys Lys Gly Gln Glu Ser Asp Leu Ile Leu Trp Leu Lys Gln
        130                 135                 140

Ser Lys Asp Asn Gly Ile Glu Leu Phe Lys Ala Asn Ser Asp Ile Thr
145                 150                 155                 160

Asp Ile Asp Glu Ala Leu Glu Ile Ile Lys Ser Phe Lys Gly Trp Thr
                165                 170                 175

Thr Tyr Phe Lys Gly Phe His Glu Asn Arg Lys Asn Val Tyr Ser Ser
                180                 185                 190

Asn Asp Ile Pro Thr Ser Ile Ile Tyr Arg Ile Val Asp Asp Asn Leu
            195                 200                 205

Pro Lys Phe Leu Glu Asn Lys Ala Lys Tyr Glu Ser Leu Lys Asp Lys
        210                 215                 220

Ala Pro Glu Ala Ile Asn Tyr Glu Gln Ile Lys Lys Asp Leu Ala Glu
225                 230                 235                 240

Glu Leu Thr Phe Asp Ile Asp Tyr Lys Thr Ser Glu Val Asn Gln Arg
                245                 250                 255

Val Phe Ser Leu Asp Glu Val Phe Glu Ile Ala Asn Phe Asn Asn Tyr
```

```
            260                 265                 270
Leu Asn Gln Ser Gly Ile Thr Lys Phe Asn Thr Ile Ile Gly Gly Lys
            275                 280                 285
Phe Val Asn Gly Glu Asn Thr Lys Arg Lys Gly Ile Asn Glu Tyr Ile
            290                 295                 300
Asn Leu Tyr Ser Gln Gln Ile Asn Asp Lys Thr Leu Lys Lys Tyr Lys
305                 310                 315                 320
Met Ser Val Leu Phe Lys Gln Ile Leu Ser Asp Thr Glu Ser Lys Ser
                        325                 330                 335
Phe Val Ile Asp Lys Leu Glu Asp Asp Ser Asp Val Val Thr Thr Met
                    340                 345                 350
Gln Ser Phe Tyr Glu Gln Ile Ala Ala Phe Lys Thr Val Glu Glu Lys
            355                 360                 365
Ser Ile Lys Glu Thr Leu Ser Leu Leu Phe Asp Asp Leu Lys Ala Gln
        370                 375                 380
Lys Leu Asp Leu Ser Lys Ile Tyr Phe Lys Asn Asp Lys Ser Leu Thr
385                 390                 395                 400
Asp Leu Ser Gln Gln Val Phe Asp Asp Tyr Ser Val Ile Gly Thr Ala
                        405                 410                 415
Val Leu Glu Tyr Ile Thr Gln Gln Ile Ala Pro Lys Asn Leu Asp Asn
                    420                 425                 430
Pro Ser Lys Lys Glu Gln Glu Leu Ile Ala Lys Thr Glu Lys Ala
            435                 440                 445
Lys Tyr Leu Ser Leu Glu Thr Ile Lys Leu Ala Leu Glu Glu Phe Asn
        450                 455                 460
Lys His Arg Asp Ile Asp Lys Gln Cys Arg Phe Glu Glu Ile Leu Ala
465                 470                 475                 480
Asn Phe Ala Ala Ile Pro Met Ile Phe Asp Glu Ile Ala Gln Asn Lys
                        485                 490                 495
Asp Asn Leu Ala Gln Ile Ser Ile Lys Tyr Gln Asn Gln Gly Lys Lys
                    500                 505                 510
Asp Leu Leu Gln Ala Ser Ala Glu Asp Asp Val Lys Ala Ile Lys Asp
            515                 520                 525
Leu Leu Asp Gln Thr Asn Asn Leu Leu His Lys Leu Lys Ile Phe His
        530                 535                 540
Ile Ser Gln Ser Glu Asp Lys Ala Asn Ile Leu Asp Lys Asp Glu His
545                 550                 555                 560
Phe Tyr Leu Val Phe Glu Glu Cys Tyr Phe Glu Leu Ala Asn Ile Val
                        565                 570                 575
Pro Leu Tyr Asn Lys Ile Arg Asn Tyr Ile Thr Gln Lys Pro Tyr Ser
                    580                 585                 590
Asp Glu Lys Phe Lys Leu Asn Phe Glu Asn Ser Thr Leu Ala Asn Gly
            595                 600                 605
Trp Asp Lys Asn Lys Glu Pro Asp Asn Thr Ala Ile Leu Phe Ile Lys
        610                 615                 620
Asp Asp Lys Tyr Tyr Leu Gly Val Met Asn Lys Lys Asn Asn Lys Ile
625                 630                 635                 640
Phe Asp Asp Lys Ala Ile Lys Glu Asn Lys Gly Glu Gly Tyr Lys Lys
                        645                 650                 655
Ile Val Tyr Lys Leu Leu Pro Gly Ala Asn Lys Met Leu Pro Lys Val
                    660                 665                 670
Phe Phe Ser Ala Lys Ser Ile Lys Phe Tyr Asn Pro Ser Glu Asp Ile
            675                 680                 685
```

-continued

```
Leu Arg Ile Arg Asn His Ser Thr His Thr Lys Asn Gly Ser Pro Gln
690                 695                 700
Lys Gly Tyr Glu Lys Phe Glu Phe Asn Ile Glu Asp Cys Arg Lys Phe
705                 710                 715                 720
Ile Asp Phe Tyr Lys Gln Ser Ile Ser Lys His Pro Glu Trp Lys Asp
                725                 730                 735
Phe Gly Phe Arg Phe Ser Asp Thr Gln Arg Tyr Asn Ser Ile Asp Glu
                740                 745                 750
Phe Tyr Arg Glu Val Glu Asn Gln Gly Tyr Lys Leu Thr Phe Glu Asn
                755                 760                 765
Ile Ser Glu Ser Tyr Ile Asp Ser Val Val Asn Gln Gly Lys Leu Tyr
770                 775                 780
Leu Phe Gln Ile Tyr Asn Lys Asp Phe Ser Ala Tyr Ser Lys Gly Arg
785                 790                 795                 800
Pro Asn Leu His Thr Leu Tyr Trp Lys Ala Leu Phe Asp Glu Arg Asn
                805                 810                 815
Leu Gln Asp Val Val Tyr Lys Leu Asn Gly Glu Ala Glu Leu Phe Tyr
                820                 825                 830
Arg Lys Gln Ser Ile Pro Lys Lys Ile Thr His Pro Ala Lys Glu Ala
                835                 840                 845
Ile Ala Asn Lys Asn Lys Asp Asn Pro Lys Lys Glu Ser Val Phe Glu
850                 855                 860
Tyr Asp Leu Ile Lys Asp Lys Arg Phe Thr Glu Asp Lys Phe Phe Phe
865                 870                 875                 880
His Cys Pro Ile Thr Ile Asn Phe Lys Ser Ser Gly Ala Asn Lys Phe
                885                 890                 895
Asn Asp Glu Ile Asn Leu Leu Leu Lys Glu Lys Ala Asn Asp Val His
                900                 905                 910
Ile Leu Ser Ile Asp Arg Gly Glu Arg His Leu Ala Tyr Tyr Thr Leu
                915                 920                 925
Val Asp Gly Lys Gly Asn Ile Ile Lys Gln Asp Thr Phe Asn Ile Ile
930                 935                 940
Gly Asn Asp Arg Met Lys Thr Asn Tyr His Asp Lys Leu Ala Ala Ile
945                 950                 955                 960
Glu Lys Asp Arg Asp Ser Ala Arg Lys Asp Trp Lys Lys Ile Asn Asn
                965                 970                 975
Ile Lys Glu Met Lys Glu Gly Tyr Leu Ser Gln Val Val His Glu Ile
                980                 985                 990
Ala Lys Leu Val Ile Glu Tyr Asn Ala Ile Val Val Phe Glu Asp Leu
                995                 1000                1005
Asn Phe Gly Phe Lys Arg Gly Arg Phe Lys Val Glu Lys Gln Val
        1010                1015                1020
Tyr Gln Lys Leu Glu Lys Met Leu Ile Glu Lys Leu Asn Tyr Leu
        1025                1030                1035
Val Phe Lys Asp Asn Glu Phe Asp Lys Thr Gly Gly Val Leu Arg
        1040                1045                1050
Ala Tyr Gln Leu Thr Ala Pro Phe Glu Thr Phe Lys Lys Met Gly
        1055                1060                1065
Lys Gln Thr Gly Ile Ile Tyr Tyr Val Pro Ala Gly Phe Thr Ser
        1070                1075                1080
Lys Ile Cys Pro Val Thr Gly Phe Val Asn Gln Leu Tyr Pro Lys
        1085                1090                1095
```

-continued

Tyr Glu Ser Val Ser Lys Ser Gln Glu Phe Phe Ser Lys Phe Asp
       1100                1105                1110

Lys Ile Cys Tyr Asn Leu Asp Lys Gly Tyr Phe Glu Phe Ser Phe
       1115                1120                1125

Asp Tyr Lys Asn Phe Gly Asp Lys Ala Ala Lys Gly Lys Trp Thr
       1130                1135                1140

Ile Ala Ser Phe Gly Ser Arg Leu Ile Asn Phe Arg Asn Ser Asp
       1145                1150                1155

Lys Asn His Asn Trp Asp Thr Arg Glu Val Tyr Pro Thr Lys Glu
       1160                1165                1170

Leu Glu Lys Leu Leu Lys Asp Tyr Ser Ile Glu Tyr Gly His Gly
       1175                1180                1185

Glu Cys Ile Lys Ala Ala Ile Cys Gly Glu Ser Asp Lys Lys Phe
       1190                1195                1200

Phe Ala Lys Leu Thr Ser Val Leu Asn Thr Ile Leu Gln Met Arg
       1205                1210                1215

Asn Ser Lys Thr Gly Thr Glu Leu Asp Tyr Leu Ile Ser Pro Val
       1220                1225                1230

Ala Asp Val Asn Gly Asn Phe Phe Asp Ser Arg Gln Ala Pro Lys
       1235                1240                1245

Asn Met Pro Gln Asp Ala Asp Ala Asn Gly Ala Tyr His Ile Gly
       1250                1255                1260

Leu Lys Gly Leu Met Leu Leu Gly Arg Ile Lys Asn Asn Gln Glu
       1265                1270                1275

Gly Lys Lys Leu Asn Leu Val Ile Lys Asn Glu Glu Tyr Phe Glu
       1280                1285                1290

Phe Val Gln Asn Arg Asn Asn
       1295                1300

<210> SEQ ID NO 3
<211> LENGTH: 1263
<212> TYPE: PRT
<213> ORGANISM: Leptospira inadai

<400> SEQUENCE: 3

Met Glu Asp Tyr Ser Gly Phe Val Asn Ile Tyr Ser Ile Gln Lys Thr
1               5                  10                  15

Leu Arg Phe Glu Leu Lys Pro Val Gly Lys Thr Leu Glu His Ile Glu
            20                  25                  30

Lys Lys Gly Phe Leu Lys Lys Asp Lys Ile Arg Ala Glu Asp Tyr Lys
        35                  40                  45

Ala Val Lys Lys Ile Ile Asp Lys Tyr His Arg Ala Tyr Ile Glu Glu
    50                  55                  60

Val Phe Asp Ser Val Leu His Gln Lys Lys Lys Lys Asp Lys Thr Arg
65                  70                  75                  80

Phe Ser Thr Gln Phe Ile Lys Glu Ile Lys Glu Phe Ser Glu Leu Tyr
                85                  90                  95

Tyr Lys Thr Glu Lys Asn Ile Pro Asp Lys Glu Arg Leu Glu Ala Leu
            100                 105                 110

Ser Glu Lys Leu Arg Lys Met Leu Val Gly Ala Phe Lys Gly Glu Phe
        115                 120                 125

Ser Glu Glu Val Ala Glu Lys Tyr Lys Asn Leu Phe Ser Lys Glu Leu
    130                 135                 140

Ile Arg Asn Glu Ile Glu Lys Phe Cys Glu Thr Asp Glu Glu Arg Lys
145                 150                 155                 160

```
Gln Val Ser Asn Phe Lys Ser Phe Thr Thr Tyr Phe Thr Gly Phe His
                165                 170                 175

Ser Asn Arg Gln Asn Ile Tyr Ser Asp Glu Lys Lys Ser Thr Ala Ile
            180                 185                 190

Gly Tyr Arg Ile Ile His Gln Asn Leu Pro Lys Phe Leu Asp Asn Leu
            195                 200                 205

Lys Ile Ile Glu Ser Ile Gln Arg Arg Phe Lys Asp Phe Pro Trp Ser
210                 215                 220

Asp Leu Lys Lys Asn Leu Lys Lys Ile Asp Lys Asn Ile Lys Leu Thr
225                 230                 235                 240

Glu Tyr Phe Ser Ile Asp Gly Phe Val Asn Val Leu Asn Gln Lys Gly
            245                 250                 255

Ile Asp Ala Tyr Asn Thr Ile Leu Gly Gly Lys Ser Glu Glu Ser Gly
            260                 265                 270

Glu Lys Ile Gln Gly Leu Asn Glu Tyr Ile Asn Leu Tyr Arg Gln Lys
            275                 280                 285

Asn Asn Ile Asp Arg Lys Asn Leu Pro Asn Val Lys Ile Leu Phe Lys
            290                 295                 300

Gln Ile Leu Gly Asp Arg Glu Thr Lys Ser Phe Ile Pro Glu Ala Phe
305                 310                 315                 320

Pro Asp Asp Gln Ser Val Leu Asn Ser Ile Thr Glu Phe Ala Lys Tyr
            325                 330                 335

Leu Lys Leu Asp Lys Lys Lys Ser Ile Ile Ala Glu Leu Lys Lys
            340                 345                 350

Phe Leu Ser Ser Phe Asn Arg Tyr Glu Leu Asp Gly Ile Tyr Leu Ala
            355                 360                 365

Asn Asp Asn Ser Leu Ala Ser Ile Ser Thr Phe Leu Phe Asp Asp Trp
370                 375                 380

Ser Phe Ile Lys Lys Ser Val Ser Phe Lys Tyr Asp Glu Ser Val Gly
385                 390                 395                 400

Asp Pro Lys Lys Lys Ile Lys Ser Pro Leu Lys Tyr Glu Lys Glu Lys
            405                 410                 415

Glu Lys Trp Leu Lys Gln Lys Tyr Tyr Thr Ile Ser Phe Leu Asn Asp
            420                 425                 430

Ala Ile Glu Ser Tyr Ser Lys Ser Gln Asp Glu Lys Arg Val Lys Ile
            435                 440                 445

Arg Leu Glu Ala Tyr Phe Ala Glu Phe Lys Ser Lys Asp Asp Ala Lys
450                 455                 460

Lys Gln Phe Asp Leu Leu Glu Arg Ile Glu Glu Ala Tyr Ala Ile Val
465                 470                 475                 480

Glu Pro Leu Leu Gly Ala Glu Tyr Pro Arg Asp Arg Asn Leu Lys Ala
            485                 490                 495

Asp Lys Lys Glu Val Gly Lys Ile Lys Asp Phe Leu Asp Ser Ile Lys
            500                 505                 510

Ser Leu Gln Phe Phe Leu Lys Pro Leu Leu Ser Ala Glu Ile Phe Asp
            515                 520                 525

Glu Lys Asp Leu Gly Phe Tyr Asn Gln Leu Glu Gly Tyr Tyr Glu Glu
            530                 535                 540

Ile Asp Ser Ile Gly His Leu Tyr Asn Lys Val Arg Asn Tyr Leu Thr
545                 550                 555                 560

Gly Lys Ile Tyr Ser Lys Glu Lys Phe Lys Leu Asn Phe Glu Asn Ser
            565                 570                 575
```

-continued

```
Thr Leu Leu Lys Gly Trp Asp Glu Asn Arg Glu Val Ala Asn Leu Cys
                580                 585                 590
Val Ile Phe Arg Glu Asp Gln Lys Tyr Tyr Leu Gly Val Met Asp Lys
            595                 600                 605
Glu Asn Asn Thr Ile Leu Ser Asp Ile Pro Lys Val Lys Pro Asn Glu
        610                 615                 620
Leu Phe Tyr Glu Lys Met Val Tyr Lys Leu Ile Pro Thr Pro His Met
625                 630                 635                 640
Gln Leu Pro Arg Ile Ile Phe Ser Ser Asp Asn Leu Ser Ile Tyr Asn
                645                 650                 655
Pro Ser Lys Ser Ile Leu Lys Ile Arg Glu Ala Lys Ser Phe Lys Glu
            660                 665                 670
Gly Lys Asn Phe Lys Leu Lys Asp Cys His Lys Phe Ile Asp Phe Tyr
        675                 680                 685
Lys Glu Ser Ile Ser Lys Asn Glu Asp Trp Ser Arg Phe Asp Phe Lys
690                 695                 700
Phe Ser Lys Thr Ser Ser Tyr Glu Asn Ile Ser Glu Phe Tyr Arg Glu
705                 710                 715                 720
Val Glu Arg Gln Gly Tyr Asn Leu Asp Phe Lys Lys Val Ser Lys Phe
                725                 730                 735
Tyr Ile Asp Ser Leu Val Glu Asp Gly Lys Leu Tyr Leu Phe Gln Ile
            740                 745                 750
Tyr Asn Lys Asp Phe Ser Ile Phe Ser Lys Gly Lys Pro Asn Leu His
        755                 760                 765
Thr Ile Tyr Phe Arg Ser Leu Phe Ser Lys Glu Asn Leu Lys Asp Val
770                 775                 780
Cys Leu Lys Leu Asn Gly Glu Ala Glu Met Phe Phe Arg Lys Lys Ser
785                 790                 795                 800
Ile Asn Tyr Asp Glu Lys Lys Arg Glu Gly His His Pro Glu Leu
                805                 810                 815
Phe Glu Lys Leu Lys Tyr Pro Ile Leu Lys Asp Lys Arg Tyr Ser Glu
            820                 825                 830
Asp Lys Phe Gln Phe His Leu Pro Ile Ser Leu Asn Phe Lys Ser Lys
        835                 840                 845
Glu Arg Leu Asn Phe Asn Leu Lys Val Asn Glu Phe Leu Lys Arg Asn
850                 855                 860
Lys Asp Ile Asn Ile Ile Gly Ile Asp Arg Gly Glu Arg Asn Leu Leu
865                 870                 875                 880
Tyr Leu Val Met Ile Asn Gln Lys Gly Glu Ile Leu Lys Gln Thr Leu
                885                 890                 895
Leu Asp Ser Met Gln Ser Gly Lys Gly Arg Pro Glu Ile Asn Tyr Lys
            900                 905                 910
Glu Lys Leu Gln Glu Lys Glu Ile Glu Arg Asp Lys Ala Arg Lys Ser
        915                 920                 925
Trp Gly Thr Val Glu Asn Ile Lys Glu Leu Lys Glu Gly Tyr Leu Ser
930                 935                 940
Ile Val Ile His Gln Ile Ser Lys Leu Met Val Glu Asn Asn Ala Ile
945                 950                 955                 960
Val Val Leu Glu Asp Leu Asn Ile Gly Phe Lys Arg Gly Arg Gln Lys
                965                 970                 975
Val Glu Arg Gln Val Tyr Gln Lys Phe Glu Lys Met Leu Ile Asp Lys
            980                 985                 990
Leu Asn Phe Leu Val Phe Lys Glu  Asn Lys Pro Thr Glu  Pro Gly Gly
```

```
               995                1000               1005
Val Leu Lys Ala Tyr Gln Leu Thr Asp Glu Phe Gln Ser Phe Glu
    1010                1015               1020

Lys Leu Ser Lys Gln Thr Gly Phe Leu Phe Tyr Val Pro Ser Trp
    1025                1030               1035

Asn Thr Ser Lys Ile Asp Pro Arg Thr Gly Phe Ile Asp Phe Leu
    1040                1045               1050

His Pro Ala Tyr Glu Asn Ile Glu Lys Ala Lys Gln Trp Ile Asn
    1055                1060               1065

Lys Phe Asp Ser Ile Arg Phe Asn Ser Lys Met Asp Trp Phe Glu
    1070                1075               1080

Phe Thr Ala Asp Thr Arg Lys Phe Ser Glu Asn Leu Met Leu Gly
    1085                1090               1095

Lys Asn Arg Val Trp Val Ile Cys Thr Thr Asn Val Glu Arg Tyr
    1100                1105               1110

Phe Thr Ser Lys Thr Ala Asn Ser Ser Ile Gln Tyr Asn Ser Ile
    1115                1120               1125

Gln Ile Thr Glu Lys Leu Lys Glu Leu Phe Val Asp Ile Pro Phe
    1130                1135               1140

Ser Asn Gly Gln Asp Leu Lys Pro Glu Ile Leu Arg Lys Asn Asp
    1145                1150               1155

Ala Val Phe Phe Lys Ser Leu Leu Phe Tyr Ile Lys Thr Thr Leu
    1160                1165               1170

Ser Leu Arg Gln Asn Asn Gly Lys Lys Gly Glu Glu Glu Lys Asp
    1175                1180               1185

Phe Ile Leu Ser Pro Val Val Asp Ser Lys Gly Arg Phe Phe Asn
    1190                1195               1200

Ser Leu Glu Ala Ser Asp Asp Glu Pro Lys Asp Ala Asp Ala Asn
    1205                1210               1215

Gly Ala Tyr His Ile Ala Leu Lys Gly Leu Met Asn Leu Leu Val
    1220                1225               1230

Leu Asn Glu Thr Lys Glu Glu Asn Leu Ser Arg Pro Lys Trp Lys
    1235                1240               1245

Ile Lys Asn Lys Asp Trp Leu Glu Phe Val Trp Glu Arg Asn Arg
    1250                1255               1260
```

<210> SEQ ID NO 4
<211> LENGTH: 1228
<212> TYPE: PRT
<213> ORGANISM: Lachnospiraceae bacterium

<400> SEQUENCE: 4

```
Ala Ala Ser Lys Leu Glu Lys Phe Thr Asn Cys Tyr Ser Leu Ser Lys
1               5                   10                  15

Thr Leu Arg Phe Lys Ala Ile Pro Val Gly Lys Thr Gln Glu Asn Ile
                20                  25                  30

Asp Asn Lys Arg Leu Leu Val Glu Asp Glu Lys Arg Ala Glu Asp Tyr
            35                  40                  45

Lys Gly Val Lys Lys Leu Leu Asp Arg Tyr Tyr Leu Ser Phe Ile Asn
        50                  55                  60

Asp Val Leu His Ser Ile Lys Leu Lys Asn Leu Asn Asn Tyr Ile Ser
65                  70                  75                  80

Leu Phe Arg Lys Lys Thr Arg Thr Glu Lys Glu Asn Lys Glu Leu Glu
                85                  90                  95
```

```
Asn Leu Glu Ile Asn Leu Arg Lys Glu Ile Ala Lys Ala Phe Lys Gly
                100                 105                 110

Ala Ala Gly Tyr Lys Ser Leu Phe Lys Asp Ile Ile Glu Thr Ile
            115                 120                 125

Leu Pro Glu Ala Ala Asp Asp Lys Asp Glu Ile Ala Leu Val Asn Ser
130                 135                 140

Phe Asn Gly Phe Thr Thr Ala Phe Thr Gly Phe Phe Asp Asn Arg Glu
145                 150                 155                 160

Asn Met Phe Ser Glu Glu Ala Lys Ser Thr Ser Ile Ala Phe Arg Cys
                165                 170                 175

Ile Asn Glu Asn Leu Thr Arg Tyr Ile Ser Asn Met Asp Ile Phe Glu
            180                 185                 190

Lys Val Asp Ala Ile Phe Asp Lys His Glu Val Gln Glu Ile Lys Glu
        195                 200                 205

Lys Ile Leu Asn Ser Asp Tyr Asp Val Glu Asp Phe Phe Glu Gly Glu
    210                 215                 220

Phe Phe Asn Phe Val Leu Thr Gln Glu Gly Ile Asp Val Tyr Asn Ala
225                 230                 235                 240

Ile Ile Gly Gly Phe Val Thr Glu Ser Gly Glu Lys Ile Lys Gly Leu
                245                 250                 255

Asn Glu Tyr Ile Asn Leu Tyr Asn Ala Lys Thr Lys Gln Ala Leu Pro
            260                 265                 270

Lys Phe Lys Pro Leu Tyr Lys Gln Val Leu Ser Asp Arg Glu Ser Leu
        275                 280                 285

Ser Phe Tyr Gly Glu Gly Tyr Thr Ser Asp Glu Glu Val Leu Glu Val
    290                 295                 300

Phe Arg Asn Thr Leu Asn Lys Asn Ser Glu Ile Phe Ser Ser Ile Lys
305                 310                 315                 320

Lys Leu Glu Lys Leu Phe Lys Asn Phe Asp Glu Tyr Ser Ser Ala Gly
                325                 330                 335

Ile Phe Val Lys Asn Gly Pro Ala Ile Ser Thr Ile Ser Lys Asp Ile
            340                 345                 350

Phe Gly Glu Trp Asn Leu Ile Arg Asp Lys Trp Asn Ala Glu Tyr Asp
        355                 360                 365

Asp Ile His Leu Lys Lys Lys Ala Val Val Thr Glu Lys Tyr Glu Asp
    370                 375                 380

Asp Arg Arg Lys Ser Phe Lys Lys Ile Gly Ser Phe Ser Leu Glu Gln
385                 390                 395                 400

Leu Gln Glu Tyr Ala Asp Ala Asp Leu Ser Val Val Glu Lys Leu Lys
                405                 410                 415

Glu Ile Ile Ile Gln Lys Val Asp Glu Ile Tyr Lys Val Tyr Gly Ser
            420                 425                 430

Ser Glu Lys Leu Phe Asp Ala Asp Phe Val Leu Glu Lys Ser Leu Lys
        435                 440                 445

Lys Asn Asp Ala Val Val Ala Ile Met Lys Asp Leu Leu Asp Ser Val
    450                 455                 460

Lys Ser Phe Glu Asn Tyr Ile Lys Ala Phe Phe Gly Glu Gly Lys Glu
465                 470                 475                 480

Thr Asn Arg Asp Glu Ser Phe Tyr Gly Asp Phe Val Leu Ala Tyr Asp
                485                 490                 495

Ile Leu Leu Lys Val Asp His Ile Tyr Asp Ala Ile Arg Asn Tyr Val
            500                 505                 510

Thr Gln Lys Pro Tyr Ser Lys Asp Lys Phe Lys Leu Tyr Phe Gln Asn
```

```
                    515                 520                 525
Pro Gln Phe Met Gly Gly Trp Asp Lys Asp Lys Glu Thr Asp Tyr Arg
    530                 535                 540

Ala Thr Ile Leu Arg Tyr Gly Ser Lys Tyr Tyr Leu Ala Ile Met Asp
545                 550                 555                 560

Lys Lys Tyr Ala Lys Cys Leu Gln Lys Ile Asp Lys Asp Asp Val Asn
                565                 570                 575

Gly Asn Tyr Glu Lys Ile Asn Tyr Lys Leu Leu Pro Gly Pro Asn Lys
                580                 585                 590

Met Leu Pro Lys Val Phe Phe Ser Lys Lys Trp Met Ala Tyr Tyr Asn
            595                 600                 605

Pro Ser Glu Asp Ile Gln Lys Ile Tyr Lys Asn Gly Thr Phe Lys Lys
            610                 615                 620

Gly Asp Met Phe Asn Leu Asn Asp Cys His Lys Leu Ile Asp Phe Phe
625                 630                 635                 640

Lys Asp Ser Ile Ser Arg Tyr Pro Lys Trp Ser Asn Ala Tyr Asp Phe
                645                 650                 655

Asn Phe Ser Glu Thr Glu Lys Tyr Lys Asp Ile Ala Gly Phe Tyr Arg
            660                 665                 670

Glu Val Glu Glu Gln Gly Tyr Lys Val Ser Phe Glu Ser Ala Ser Lys
            675                 680                 685

Lys Glu Val Asp Lys Leu Val Glu Gly Lys Leu Tyr Met Phe Gln
            690                 695                 700

Ile Tyr Asn Lys Asp Phe Ser Asp Lys Ser His Gly Thr Pro Asn Leu
705                 710                 715                 720

His Thr Met Tyr Phe Lys Leu Leu Phe Asp Glu Asn His Gly Gln
                725                 730                 735

Ile Arg Leu Ser Gly Gly Ala Glu Leu Phe Met Arg Arg Ala Ser Leu
                740                 745                 750

Lys Lys Glu Glu Leu Val Val His Pro Ala Asn Ser Pro Ile Ala Asn
            755                 760                 765

Lys Asn Pro Asp Asn Pro Lys Lys Thr Thr Thr Leu Ser Tyr Asp Val
            770                 775                 780

Tyr Lys Asp Lys Arg Phe Ser Glu Asp Gln Tyr Glu Leu His Ile Pro
785                 790                 795                 800

Ile Ala Ile Asn Lys Cys Pro Lys Asn Ile Phe Lys Ile Asn Thr Glu
                805                 810                 815

Val Arg Val Leu Leu Lys His Asp Asp Asn Pro Tyr Val Ile Gly Ile
                820                 825                 830

Asp Arg Gly Glu Arg Asn Leu Leu Tyr Ile Val Val Val Asp Gly Lys
            835                 840                 845

Gly Asn Ile Val Glu Gln Tyr Ser Leu Asn Glu Ile Ile Asn Asn Phe
            850                 855                 860

Asn Gly Ile Arg Ile Lys Thr Asp Tyr His Ser Leu Leu Asp Lys Lys
865                 870                 875                 880

Glu Lys Glu Arg Phe Glu Ala Arg Gln Asn Trp Thr Ser Ile Glu Asn
                885                 890                 895

Ile Lys Glu Leu Lys Ala Gly Tyr Ile Ser Gln Val Val His Lys Ile
            900                 905                 910

Cys Glu Leu Val Glu Lys Tyr Asp Ala Val Ile Ala Leu Glu Asp Leu
            915                 920                 925

Asn Ser Gly Phe Lys Asn Ser Arg Val Lys Val Glu Lys Gln Val Tyr
            930                 935                 940
```

```
Gln Lys Phe Glu Lys Met Leu Ile Asp Lys Leu Asn Tyr Met Val Asp
945                 950                 955                 960

Lys Lys Ser Asn Pro Cys Ala Thr Gly Gly Ala Leu Lys Gly Tyr Gln
                965                 970                 975

Ile Thr Asn Lys Phe Glu Ser Phe Lys Ser Met Ser Thr Gln Asn Gly
            980                 985                 990

Phe Ile Phe Tyr Ile Pro Ala Trp Leu Thr Ser Lys Ile Asp Pro Ser
        995                1000                1005

Thr Gly Phe Val Asn Leu Leu Lys Thr Lys Tyr Thr Ser Ile Ala
   1010                1015                1020

Asp Ser Lys Lys Phe Ile Ser Ser Phe Ala Arg Ile Met Tyr Val
   1025                1030                1035

Pro Glu Glu Asp Leu Phe Glu Phe Ala Leu Asp Tyr Lys Asn Phe
   1040                1045                1050

Ser Arg Thr Asp Ala Asp Tyr Ile Lys Lys Trp Lys Leu Tyr Ser
   1055                1060                1065

Tyr Gly Asn Arg Ile Arg Ile Phe Ala Ala Ala Lys Lys Asn Asn
   1070                1075                1080

Val Phe Ala Trp Glu Glu Val Cys Leu Thr Ser Ala Tyr Lys Glu
   1085                1090                1095

Leu Phe Asn Lys Tyr Gly Ile Asn Tyr Gln Gln Gly Asp Ile Arg
   1100                1105                1110

Ala Leu Leu Cys Glu Gln Ser Asp Lys Ala Phe Tyr Ser Ser Phe
   1115                1120                1125

Met Ala Leu Met Ser Leu Met Leu Gln Met Arg Asn Ser Ile Thr
   1130                1135                1140

Gly Arg Thr Asp Val Asp Phe Leu Ile Ser Pro Val Lys Asn Ser
   1145                1150                1155

Asp Gly Ile Phe Tyr Asp Ser Arg Asn Tyr Glu Ala Gln Glu Asn
   1160                1165                1170

Ala Ile Leu Pro Lys Asn Ala Asp Ala Asn Gly Ala Tyr Asn Ile
   1175                1180                1185

Ala Arg Lys Val Leu Trp Ala Ile Gly Gln Phe Lys Lys Ala Glu
   1190                1195                1200

Asp Glu Lys Leu Asp Lys Val Lys Ile Ala Ile Ser Asn Lys Glu
   1205                1210                1215

Trp Leu Glu Tyr Ala Gln Thr Ser Val Lys
   1220                1225

<210> SEQ ID NO 5
<211> LENGTH: 1267
<212> TYPE: PRT
<213> ORGANISM: Butyrivibrio hungatei

<400> SEQUENCE: 5

Met Leu Tyr Asp Glu Tyr Ser Thr Gln Tyr Tyr Lys Gly Asp Glu Lys
1               5                   10                  15

Arg Pro Met Leu Asn Tyr Glu Glu Phe Thr Lys Arg Asn His Ile Thr
            20                  25                  30

Lys Ala Leu Arg Met Glu Leu Ile Pro Gln Gly Lys Thr Gln Asn Val
        35                  40                  45

Ile Asp Glu Lys Gly Asp Arg Lys Tyr Asp Ala Ala Leu Tyr Ser Ser
    50                  55                  60

Leu Glu Arg Leu Lys Pro Val Ile Asp Ser Phe Ile Arg Ser Thr Ala
```

```
                65                  70                  75                  80
        Ser Arg Ala Leu Ser Asp Val Asp Tyr Asp Phe Asn Ala Met His Asp
                            85                  90                  95

Ala Tyr Ile Asn Lys Asp Lys Lys Ser Trp Ala Lys Glu Glu Lys Ala
                            100                 105                 110

Leu Lys Lys Val Leu Met Lys Ala Val Asp Glu Ala Leu Pro Lys Gly
                            115                 120                 125

Leu Lys Cys Ser Gln Ile Asn Ser Ala Ala Phe Leu Gln Glu Val Leu
                            130                 135                 140

Arg Glu Tyr Val Leu His Ala Thr Asp Thr Glu Leu Arg Lys Asp Val
        145                 150                 155                 160

Ala Leu Lys Asp Ile Glu Glu Thr Lys Gly Cys Leu Ala Leu Phe Ser
                            165                 170                 175

Lys Phe Leu Thr Thr Arg Ile Thr Ala Leu Thr Val Trp Met Pro Glu
                            180                 185                 190

Arg Val Ile Glu Asn Phe Lys Ile Tyr Cys Ser Asn Ile Pro Arg Ile
                            195                 200                 205

Glu Ala Ile Phe Asn Glu Ala Lys Asp Ile Ala Asn Asn Tyr Ser Asp
                            210                 215                 220

Glu Leu Glu Leu Met Lys Thr Ala Gln Tyr Tyr Thr Lys Ile Leu Ser
        225                 230                 235                 240

Gln Asp Ala Ile Asp Gly Tyr Asn Leu Val Ile Ala Gly Lys Ile Thr
                            245                 250                 255

Glu Asn Gly Ile Glu Thr Lys Gly Leu Asn Val Leu Ile Asn Glu Tyr
                            260                 265                 270

Asn Ile Asp Val Lys Asn Gln Lys Leu Asp Lys Pro Tyr Leu Arg Lys
                            275                 280                 285

Ile Asn Gln Leu Tyr Lys Gln Thr Leu Phe Ser Ser Glu Lys Gln Phe
                            290                 295                 300

Val Ile Thr Ala Ile Lys Thr Asp Asp Glu Val Arg Arg Val Ile Lys
        305                 310                 315                 320

Ser Ala Trp Glu Ser Phe Asp Gly Ala Ala Thr Lys Met Leu Gly Leu
                            325                 330                 335

Phe Lys Glu Thr Leu Glu Ala Thr Asn Gly Asn Gly Val Cys Val Lys
                            340                 345                 350

Gly Asn Arg Leu His Ile Leu Ser His Ala Leu Leu Gly Glu His Lys
                            355                 360                 365

Ala Ile Thr Asp Asn Leu Val Lys Ala Glu Leu Val Glu Ile His Glu
                            370                 375                 380

Met Leu Lys Asn Glu Ala Leu Lys Pro Ser Met Arg Ala Glu Leu Glu
        385                 390                 395                 400

Lys Arg Val Asp Ile Ala Gln Ser Leu Val Val Lys Lys Asp Tyr Ser
                            405                 410                 415

Phe Thr Ala Leu Asp Glu Ala Val Thr Ser Ile Asp Glu Asn Val Ile
                            420                 425                 430

Gly Leu Ser Lys Gly Ala Phe Asn Leu Tyr Val Ala Lys Thr Glu Glu
                            435                 440                 445

Leu Ile Lys Glu Ala Lys Met Tyr Tyr Lys Val Leu Glu Gly Gly Asp
                            450                 455                 460

Ile Phe Lys Lys Arg His Ile Lys Gly Asp Lys His Val Gln Glu Met
        465                 470                 475                 480

Leu Val Asp Phe Phe Asp Ala Leu Thr Glu Val Arg Asn Ile Ile Ser
                            485                 490                 495
```

```
Val Ile Ser Met Pro Asp Glu Asn Glu Asp Ala Asp Val Ser Phe Tyr
            500                 505                 510

Asn Arg Phe Asp Glu Ile Tyr Glu Asn Ile Arg Leu Thr Tyr Lys Ala
            515                 520                 525

Glu Asn Leu Val Arg Asn Tyr Ile Thr Lys Ser Val Lys Asp Thr Ala
            530                 535                 540

Glu Glu Lys Gln Thr Cys Phe Gly Thr Pro Ala Arg Leu Arg Thr Gln
545                 550                 555                 560

Trp Trp Asn Gly Glu Gln Lys Phe Ala Lys Asn His Ala Ala Ile Ile
            565                 570                 575

Lys His Asp Gly Lys Tyr Tyr Phe Ile Leu Ala Gly Asp Ser Lys
            580                 585                 590

Pro Ile Glu Ile Lys Glu Asp Gly Asn Ser Ala Thr Gly Leu Leu Thr
            595                 600                 605

Leu Lys Lys Gly Gln Lys Ser Phe Met Met Leu Pro Lys Ile Leu Phe
            610                 615                 620

Thr Asp His Ala Val Pro Phe Phe Glu Gly Asn Lys Asp Ala Met Glu
625                 630                 635                 640

Tyr Thr Leu Asp Asp Glu Ser Val Ile Arg Pro Val Lys Val Gly Arg
            645                 650                 655

Met Leu Tyr Glu Ile Tyr Lys Lys Gly Leu Phe Lys Arg Glu Ala Val
            660                 665                 670

Thr Ser Gly Ala Ile Thr Glu Glu Tyr Ala Lys Asn Ile Gln Ala
            675                 680                 685

Leu Ile Glu Lys Tyr Thr Glu Phe Ala Asn Ala Tyr Val Gln Tyr Gln
            690                 695                 700

Lys Phe Asn Leu Asp Asp Ile Asn Asp Pro Thr Arg Tyr Ser Asp Ile
705                 710                 715                 720

Gly Glu Phe Phe Ser Glu Val Asp Thr Cys Thr Ser Arg Leu Ser Trp
            725                 730                 735

Thr Tyr Ile Asp Tyr Ala Gln Ile Ala Asn Leu Val Asp Ser Gly Ser
            740                 745                 750

Ala Tyr Leu Phe Leu Ile Ser Thr Lys Phe Leu Tyr Thr Glu Ser Glu
            755                 760                 765

Asp Lys Asn Ala Tyr Thr Lys Thr Phe Arg Ser Ile Leu Ser Asp Ala
            770                 775                 780

Asn Met Asp Lys Thr Thr Ile Leu Leu Asn Ser Asn Pro Ala Val Phe
785                 790                 795                 800

Phe Arg Pro Gln Ser Ile Lys Lys Glu Ile Thr His Lys Ala Gly Ser
            805                 810                 815

Ile Met Val Asn Lys Leu Thr Glu Asp Gly Glu His Ile Pro Lys Lys
            820                 825                 830

Ile Tyr Glu Ala Ile Tyr Lys Ser Lys Asn Glu Met Ser Gly Val Ser
            835                 840                 845

Glu Glu Asp Met Ala Ala Ala Asn Glu Tyr Met Arg Thr His Lys Val
            850                 855                 860

Arg Ser Phe Lys Ala Lys Tyr Asp Lys Thr Tyr Arg Gly Asn Tyr Met
865                 870                 875                 880

Ser Asp Lys Tyr Thr Leu Gln Leu Thr Tyr Thr Lys Asn Asn Asp Val
            885                 890                 895

Ser Asp Arg Val Asn Asp Met Leu Asn Asp Arg Val Ile Glu Ala Met
            900                 905                 910
```

```
Gln Asp Gly Phe Asn Ile Val Ser Val Ala Arg Ser Thr Lys Asp Met
        915                 920                 925

Val Tyr Ala Leu Val Leu Asp Ser Ser Leu Lys Ile Ile Lys Glu Leu
930                 935                 940

Ser Leu Asn Val Ile Asp Gly Val Asp Tyr Tyr Ala Leu Leu His Asp
945                 950                 955                 960

Thr Tyr Leu Glu Lys Lys Glu Asn Lys Lys Leu Trp Ile Tyr Asp Thr
            965                 970                 975

Glu Asn Thr Glu Leu Lys Ser Ala Tyr Ile Asp Leu Ala Ile Ser Glu
        980                 985                 990

Ile Leu Lys Leu Ala Arg Glu Tyr  Asn Ala Val Ile Ala  Val Glu Ser
    995                 1000                1005

Ile Ser  Asp Ala Val Lys Asn  Lys Tyr Ser Phe Ile  Asp Asn Gln
    1010                1015                1020

Val Phe  Lys Ala Phe Glu Asn  Arg Ile Ala Gln Arg  Leu Ser Asp
    1025                1030                1035

Leu Thr  Tyr Lys Asp Val Val  Asp Gly Arg Pro Gly  Ser Val Ser
    1040                1045                1050

Asn Pro  Leu Gln Leu Ser Asn  Asn Gly Asn Thr  Tyr Gln Asp
    1055                1060                1065

Gly Ile  Leu Phe Phe Ile Asn  Gly Ala Tyr Thr Arg  Gly Ile Asp
    1070                1075                1080

Pro Ser  Ser Gly Phe Thr Ser  Leu Phe Asp Phe Ser  Arg Tyr Asn
    1085                1090                1095

Ser Ile  Ala Ser Lys Arg Gln  Phe Phe Ser Lys Met  Ala Lys Ile
    1100                1105                1110

Ser Tyr  Thr Gly Asp Ser Ile  Val Phe Asp Phe Asp  Tyr Val Asp
    1115                1120                1125

Tyr Pro  Val His Val Asp Thr  Glu Lys Thr Lys Trp  Gln Val Lys
    1130                1135                1140

Leu Ser  Gly Asp Val Val Val  Tyr Asp Arg Glu Lys  Lys Gln Asn
    1145                1150                1155

Lys Arg  Ile Lys Asp Val Val  Asn Glu Ile Ile  Pro Leu Ala
    1160                1165                1170

Gly Lys  Thr Asp Leu Asn Gly  Asn Ile Ala Glu Asn  Ile Leu Asn
    1175                1180                1185

Lys Asp  Val Pro Gly Ala Phe  Val Glu Glu Leu Phe  Arg Trp Phe
    1190                1195                1200

Arg Tyr  Ala Val Thr Gly Ile  His Ala Gln Val Lys  Gly Lys Asp
    1205                1210                1215

Glu Phe  Tyr Lys Ser Pro Val  Asp Gly Asn Glu Tyr  Asn Ile Ser
    1220                1225                1230

Asn Met  Leu Ala Phe Asn Leu  Ala Lys Lys Leu Val  Phe Arg Leu
    1235                1240                1245

Glu Tyr  Ala Gly Glu Ser Lys  Asp Phe Thr Lys Glu  Trp Leu Asn
    1250                1255                1260

Tyr Met  Gln Ala
    1265

<210> SEQ ID NO 6
<211> LENGTH: 36
<212> TYPE: DNA
<213> ORGANISM: Artificial Sequence
<220> FEATURE:
<223> OTHER INFORMATION: Direct repeat  sequence
```

<400> SEQUENCE: 6
gtttcaaaga ttaaataatt tctactaagt gtagat                          36

<210> SEQ ID NO 7
<211> LENGTH: 21
<212> TYPE: DNA
<213> ORGANISM: Artificial Sequence
<220> FEATURE:
<223> OTHER INFORMATION: Direct repest sequence.

<400> SEQUENCE: 7
taatttctac taagtgtaga t                                          21

<210> SEQ ID NO 8
<211> LENGTH: 20
<212> TYPE: DNA
<213> ORGANISM: Artificial Sequence
<220> FEATURE:
<223> OTHER INFORMATION: Pair a, guide 1, minus strand for Cas9

<400> SEQUENCE: 8
tcaccttcca cccgcgaccg                                            20

<210> SEQ ID NO 9
<211> LENGTH: 20
<212> TYPE: DNA
<213> ORGANISM: Artificial Sequence
<220> FEATURE:
<223> OTHER INFORMATION: Pair a, guide 2, plus strand for Cas9

<400> SEQUENCE: 9
ccaaacatcc accctccgct                                            20

<210> SEQ ID NO 10
<211> LENGTH: 20
<212> TYPE: DNA
<213> ORGANISM: Artificial Sequence
<220> FEATURE:
<223> OTHER INFORMATION: Pair b, guide 1, minus strand for Cas9

<400> SEQUENCE: 10
gccggactgg agccttcgcg                                            20

<210> SEQ ID NO 11
<211> LENGTH: 20
<212> TYPE: DNA
<213> ORGANISM: Artificial Sequence
<220> FEATURE:
<223> OTHER INFORMATION: Pair b, guide 2, plus strand for Cas9

<400> SEQUENCE: 11
gtgcacaccc cgcaaggcgg                                            20

<210> SEQ ID NO 12
<211> LENGTH: 23
<212> TYPE: DNA
<213> ORGANISM: Artificial Sequence
<220> FEATURE:
<223> OTHER INFORMATION: Pair c, guide 1, plus strand for Cpf1

<400> SEQUENCE: 12
agccacagtg tctccgaggc cct                                        23

<210> SEQ ID NO 13

-continued

```
<211> LENGTH: 23
<212> TYPE: DNA
<213> ORGANISM: Artificial Sequence
<220> FEATURE:
<223> OTHER INFORMATION: Pair c, guide 2, plus strand for Cpf1

<400> SEQUENCE: 13
gccccaagcc cttcggacgc ctt                                              23

<210> SEQ ID NO 14
<211> LENGTH: 23
<212> TYPE: DNA
<213> ORGANISM: Artificial Sequence
<220> FEATURE:
<223> OTHER INFORMATION: Pair d, guide 1, plus strand for Cpf1

<400> SEQUENCE: 14
ccatagagtc cttggtggcc aag                                              23

<210> SEQ ID NO 15
<211> LENGTH: 23
<212> TYPE: DNA
<213> ORGANISM: Artificial Sequence
<220> FEATURE:
<223> OTHER INFORMATION: Pair d, guide 2, minus strand for Cpf1

<400> SEQUENCE: 15
ctgggaggga gacctacgcg gcg                                              23

<210> SEQ ID NO 16
<211> LENGTH: 23
<212> TYPE: DNA
<213> ORGANISM: Artificial Sequence
<220> FEATURE:
<223> OTHER INFORMATION: Pair e, guide 1, minus strand for Cpf1

<400> SEQUENCE: 16
ttagcaagcc gattgctgga tgc                                              23

<210> SEQ ID NO 17
<211> LENGTH: 23
<212> TYPE: DNA
<213> ORGANISM: Artificial Sequence
<220> FEATURE:
<223> OTHER INFORMATION: Pair e, guide 2, plus strand for Cpf1

<400> SEQUENCE: 17
ccaggtcccg atttgtcagg caa                                              23

<210> SEQ ID NO 18
<211> LENGTH: 20
<212> TYPE: DNA
<213> ORGANISM: Artificial Sequence
<220> FEATURE:
<223> OTHER INFORMATION: Pair f, guide 1, plus strand for Cas9

<400> SEQUENCE: 18
agctaaaggg cggagtcgcg                                                  20

<210> SEQ ID NO 19
<211> LENGTH: 20
<212> TYPE: DNA
<213> ORGANISM: Artificial Sequence
<220> FEATURE:
<223> OTHER INFORMATION: Pair f, guide 2, minus strand for Cas9

<400> SEQUENCE: 19
```

-continued gaagattaaa gtctctgggg                                             20

<210> SEQ ID NO 20
<211> LENGTH: 20
<212> TYPE: DNA
<213> ORGANISM: Artificial Sequence
<220> FEATURE:
<223> OTHER INFORMATION: Pair g, guide 1, plus strand for Cas9

<400> SEQUENCE: 20
ggtcccagcg ggactccgaa                                             20

<210> SEQ ID NO 21
<211> LENGTH: 20
<212> TYPE: DNA
<213> ORGANISM: Artificial Sequence
<220> FEATURE:
<223> OTHER INFORMATION: Pair g, guide 2, minus strand for Cas9

<400> SEQUENCE: 21
acagagttgc taggattgcg                                             20

<210> SEQ ID NO 22
<211> LENGTH: 20
<212> TYPE: DNA
<213> ORGANISM: Artificial Sequence
<220> FEATURE:
<223> OTHER INFORMATION: Pair h, guide 1, minus strand for Cas9

<400> SEQUENCE: 22
tgagggtagt tgagcgccgt                                             20

<210> SEQ ID NO 23
<211> LENGTH: 20
<212> TYPE: DNA
<213> ORGANISM: Artificial Sequence
<220> FEATURE:
<223> OTHER INFORMATION: Pair h, guide 2, plus strand for Cas9

<400> SEQUENCE: 23
gattgtgtga gggcctagtg                                             20

<210> SEQ ID NO 24
<211> LENGTH: 23
<212> TYPE: DNA
<213> ORGANISM: Artificial Sequence
<220> FEATURE:
<223> OTHER INFORMATION: Pair i, guide 1, minus strand for Cpf1 (D239)

<400> SEQUENCE: 24
actgggcagg tagagaagct tgg                                         23

<210> SEQ ID NO 25
<211> LENGTH: 23
<212> TYPE: DNA
<213> ORGANISM: Artificial Sequence
<220> FEATURE:
<223> OTHER INFORMATION: Pair i, guide 2, plus strand for Cpf1 (D239)

<400> SEQUENCE: 25
gaaccctgta gcgctgttgc ttc                                         23

<210> SEQ ID NO 26
<211> LENGTH: 23
<212> TYPE: DNA

```
<213> ORGANISM: Artificial Sequence
<220> FEATURE:
<223> OTHER INFORMATION: Pair j, guide 1, plus strand for Cpf1 (D240)

<400> SEQUENCE: 26
gttccatatg gaaggagaca acg                                          23

<210> SEQ ID NO 27
<211> LENGTH: 23
<212> TYPE: DNA
<213> ORGANISM: Artificial Sequence
<220> FEATURE:
<223> OTHER INFORMATION: Pair j, guide 2, minus strand for Cpf1 (D240)

<400> SEQUENCE: 27
tagagaaccg ggtctcagcg atg                                          23

<210> SEQ ID NO 28
<211> LENGTH: 23
<212> TYPE: DNA
<213> ORGANISM: Artificial Sequence
<220> FEATURE:
<223> OTHER INFORMATION: Pair k, guide 1, plus strand for Cpf1 (D241)

<400> SEQUENCE: 28
agttctcaga gaacttggat ccg                                          23

<210> SEQ ID NO 29
<211> LENGTH: 23
<212> TYPE: DNA
<213> ORGANISM: Artificial Sequence
<220> FEATURE:
<223> OTHER INFORMATION: Pair k, guide 2, plus strand for Cpf1 (D241)

<400> SEQUENCE: 29
ctctggacaa atgaaccaga gag                                          23

<210> SEQ ID NO 30
<211> LENGTH: 23
<212> TYPE: DNA
<213> ORGANISM: Artificial Sequence
<220> FEATURE:
<223> OTHER INFORMATION: Pair l, guide 1, plus strand for Cpf1 (D216)

<400> SEQUENCE: 30
cctccgactg cgggctccct ccc                                          23

<210> SEQ ID NO 31
<211> LENGTH: 23
<212> TYPE: DNA
<213> ORGANISM: Artificial Sequence
<220> FEATURE:
<223> OTHER INFORMATION: Pair l, guide 2, minus strand for Cpf1 (D216)

<400> SEQUENCE: 31
acttgggata gtggaataga cag                                          23

<210> SEQ ID NO 32
<211> LENGTH: 23
<212> TYPE: DNA
<213> ORGANISM: Artificial Sequence
<220> FEATURE:
<223> OTHER INFORMATION: Pair 1, guide 1, plus strand for Cpf1

<400> SEQUENCE: 32
gctgagtctg gtggccgtgc cgc                                          23
```

<210> SEQ ID NO 33
<211> LENGTH: 23
<212> TYPE: DNA
<213> ORGANISM: Artificial Sequence
<220> FEATURE:
<223> OTHER INFORMATION: Pair 1, guide 2, minus strand for Cpf1

<400> SEQUENCE: 33
aagcaagtta ttaacattaa caa                                    23

<210> SEQ ID NO 34
<211> LENGTH: 23
<212> TYPE: DNA
<213> ORGANISM: Artificial Sequence
<220> FEATURE:
<223> OTHER INFORMATION: Pair 2, guide 1, minus strand for Cpf1

<400> SEQUENCE: 34
accacaaaat ttcttgaatg att                                    23

<210> SEQ ID NO 35
<211> LENGTH: 23
<212> TYPE: DNA
<213> ORGANISM: Artificial Sequence
<220> FEATURE:
<223> OTHER INFORMATION: Pair 2, guide 2, minus strand for Cpf1

<400> SEQUENCE: 35
ctgggaggga gacctacgcg gcg                                    23

<210> SEQ ID NO 36
<211> LENGTH: 23
<212> TYPE: DNA
<213> ORGANISM: Artificial Sequence
<220> FEATURE:
<223> OTHER INFORMATION: Pair 3, guide 1, minus strand for Cpf1

<400> SEQUENCE: 36
accacaaaat ttcttgaatg att                                    23

<210> SEQ ID NO 37
<211> LENGTH: 23
<212> TYPE: DNA
<213> ORGANISM: Artificial Sequence
<220> FEATURE:
<223> OTHER INFORMATION: Pair 3, guide 2, minus strand for Cpf1

<400> SEQUENCE: 37
ccccgcccgg acgcgccagc gaa                                    23

<210> SEQ ID NO 38
<211> LENGTH: 23
<212> TYPE: DNA
<213> ORGANISM: Artificial Sequence
<220> FEATURE:
<223> OTHER INFORMATION: Pair 4, guide 1, minus strand for Cpf1

<400> SEQUENCE: 38
gctgagtctg gtggccgtgc cgc                                    23

<210> SEQ ID NO 39
<211> LENGTH: 23
<212> TYPE: DNA
<213> ORGANISM: Artificial Sequence
<220> FEATURE:

```
<223> OTHER INFORMATION: Pair 4, guide 2, plus strand for Cpf1

<400> SEQUENCE: 39
aagcaagtta ttaacattaa caa                                              23

<210> SEQ ID NO 40
<211> LENGTH: 23
<212> TYPE: DNA
<213> ORGANISM: Artificial Sequence
<220> FEATURE:
<223> OTHER INFORMATION: Pair 5, guide 1, plus strand for Cpf1

<400> SEQUENCE: 40
cctccgactg cgggctccct ccc                                              23

<210> SEQ ID NO 41
<211> LENGTH: 23
<212> TYPE: DNA
<213> ORGANISM: Artificial Sequence
<220> FEATURE:
<223> OTHER INFORMATION: Pair 5, guide 2, plus strand for Cpf1

<400> SEQUENCE: 41
aagcaagtta ttaacattaa caa                                              23

<210> SEQ ID NO 42
<211> LENGTH: 23
<212> TYPE: DNA
<213> ORGANISM: Artificial Sequence
<220> FEATURE:
<223> OTHER INFORMATION: Pair 6, guide 1, minus strand for Cpf1

<400> SEQUENCE: 42
ggagtcccgc tgggaccgac ccc                                              23

<210> SEQ ID NO 43
<211> LENGTH: 23
<212> TYPE: DNA
<213> ORGANISM: Artificial Sequence
<220> FEATURE:
<223> OTHER INFORMATION: Pair 6, guide 2, plus strand for Cpf1

<400> SEQUENCE: 43
aagcaagtta ttaacattaa caa                                              23

<210> SEQ ID NO 44
<211> LENGTH: 23
<212> TYPE: DNA
<213> ORGANISM: Artificial Sequence
<220> FEATURE:
<223> OTHER INFORMATION: Pair 7, guide 1, plus strand for Cpf1

<400> SEQUENCE: 44
taaggcaagg agacataaag atg                                              23

<210> SEQ ID NO 45
<211> LENGTH: 23
<212> TYPE: DNA
<213> ORGANISM: Artificial Sequence
<220> FEATURE:
<223> OTHER INFORMATION: Pair 7, guide 2, plus strand for Cpf1

<400> SEQUENCE: 45
tagaaaatat accagttcgg acg                                              23
```

```
<210> SEQ ID NO 46
<211> LENGTH: 23
<212> TYPE: DNA
<213> ORGANISM: Artificial Sequence
<220> FEATURE:
<223> OTHER INFORMATION: Pair 8, guide 1, minus strand for Cpf1

<400> SEQUENCE: 46
ctggctaact tcgttcttaa aac                                             23

<210> SEQ ID NO 47
<211> LENGTH: 23
<212> TYPE: DNA
<213> ORGANISM: Artificial Sequence
<220> FEATURE:
<223> OTHER INFORMATION: Pair 8, guide 2, minus strand for Cpf1

<400> SEQUENCE: 47
tccgggaaag acaaataatt gaa                                             23

<210> SEQ ID NO 48
<211> LENGTH: 23
<212> TYPE: DNA
<213> ORGANISM: Artificial Sequence
<220> FEATURE:
<223> OTHER INFORMATION: Pair 9, guide 1, minus strand for Cpf1

<400> SEQUENCE: 48
ttccatagct ctgcttatct tta                                             23

<210> SEQ ID NO 49
<211> LENGTH: 23
<212> TYPE: DNA
<213> ORGANISM: Artificial Sequence
<220> FEATURE:
<223> OTHER INFORMATION: Pair 9, guide 2, minus strand for Cpf1

<400> SEQUENCE: 49
atttgtttct ctaaaagccg ggt                                             23

<210> SEQ ID NO 50
<211> LENGTH: 23
<212> TYPE: DNA
<213> ORGANISM: Artificial Sequence
<220> FEATURE:
<223> OTHER INFORMATION: Pair 10, guide 1, minus strand for Cpf1

<400> SEQUENCE: 50
ctggaggtcc catctcctgc aac                                             23

<210> SEQ ID NO 51
<211> LENGTH: 23
<212> TYPE: DNA
<213> ORGANISM: Artificial Sequence
<220> FEATURE:
<223> OTHER INFORMATION: Pair 10, guide 2, plus strand for Cpf1

<400> SEQUENCE: 51
tcggcaacct tggcccgact tct                                             23

<210> SEQ ID NO 52
<211> LENGTH: 23
<212> TYPE: DNA
<213> ORGANISM: Artificial Sequence
<220> FEATURE:
<223> OTHER INFORMATION: Pair 11, guide 1, minus strand for Cpf1
```

```
<400> SEQUENCE: 52
actttgcccc tgtccagcct ccc                                              23

<210> SEQ ID NO 53
<211> LENGTH: 23
<212> TYPE: DNA
<213> ORGANISM: Artificial Sequence
<220> FEATURE:
<223> OTHER INFORMATION: Pair 11, guide 2, plus strand for Cpf1

<400> SEQUENCE: 53
aggtcgtagc cagtccgaac ccc                                              23

<210> SEQ ID NO 54
<211> LENGTH: 23
<212> TYPE: DNA
<213> ORGANISM: Artificial Sequence
<220> FEATURE:
<223> OTHER INFORMATION: Pair 12, guide 1, minus strand for Cpf1

<400> SEQUENCE: 54
ctcccaccca agctgctgag ctc                                              23

<210> SEQ ID NO 55
<211> LENGTH: 23
<212> TYPE: DNA
<213> ORGANISM: Artificial Sequence
<220> FEATURE:
<223> OTHER INFORMATION: Pair 12, guide 2, minus strand for Cpf1

<400> SEQUENCE: 55
gagacccagg cttcggatcg agc                                              23

<210> SEQ ID NO 56
<211> LENGTH: 23
<212> TYPE: DNA
<213> ORGANISM: Artificial Sequence
<220> FEATURE:
<223> OTHER INFORMATION: Pair 13, guide 1, minus strand for Cpf1

<400> SEQUENCE: 56
ctctcccagc gcccctttct gtc                                              23

<210> SEQ ID NO 57
<211> LENGTH: 23
<212> TYPE: DNA
<213> ORGANISM: Artificial Sequence
<220> FEATURE:
<223> OTHER INFORMATION: Pair 13, guide 2, minus strand for Cpf1

<400> SEQUENCE: 57
tgtgaaagtc aaagtgtcaa gag                                              23

<210> SEQ ID NO 58
<211> LENGTH: 23
<212> TYPE: DNA
<213> ORGANISM: Artificial Sequence
<220> FEATURE:
<223> OTHER INFORMATION: Pair 14, guide 1, minus strand for Cpf1

<400> SEQUENCE: 58
gagaatagcc cgatgcctcc cag                                              23

<210> SEQ ID NO 59
<211> LENGTH: 23
```

```
<212> TYPE: DNA
<213> ORGANISM: Artificial Sequence
<220> FEATURE:
<223> OTHER INFORMATION: Pair 14, guide 2, plus strand for Cpf1

<400> SEQUENCE: 59
aattatttgt ctttcccgga gaa                                          23

<210> SEQ ID NO 60
<211> LENGTH: 23
<212> TYPE: DNA
<213> ORGANISM: Artificial Sequence
<220> FEATURE:
<223> OTHER INFORMATION: Pair 15, guide 1, plus strand for Cpf1

<400> SEQUENCE: 60
gatatgaaca agtatacccca gag                                         23

<210> SEQ ID NO 61
<211> LENGTH: 23
<212> TYPE: DNA
<213> ORGANISM: Artificial Sequence
<220> FEATURE:
<223> OTHER INFORMATION: Pair 15, guide 2, plus strand for Cpf1

<400> SEQUENCE: 61
cctcaagaac cgagtctgga cgc                                          23

<210> SEQ ID NO 62
<211> LENGTH: 23
<212> TYPE: DNA
<213> ORGANISM: Artificial Sequence
<220> FEATURE:
<223> OTHER INFORMATION: Pair 16, guide 1, plus strand for Cpf1

<400> SEQUENCE: 62
agaacgaagt tagccagcaa aga                                          23

<210> SEQ ID NO 63
<211> LENGTH: 23
<212> TYPE: DNA
<213> ORGANISM: Artificial Sequence
<220> FEATURE:
<223> OTHER INFORMATION: Pair 16, guide 2, plus strand for Cpf1

<400> SEQUENCE: 63
catccagcaa tcggcttgct aat                                          23

<210> SEQ ID NO 64
<211> LENGTH: 23
<212> TYPE: DNA
<213> ORGANISM: Artificial Sequence
<220> FEATURE:
<223> OTHER INFORMATION: Pair 17, guide 1, minus strand for Cpf1

<400> SEQUENCE: 64
cttctttgct ggctaacttc gtt                                          23

<210> SEQ ID NO 65
<211> LENGTH: 23
<212> TYPE: DNA
<213> ORGANISM: Artificial Sequence
<220> FEATURE:
<223> OTHER INFORMATION: Pair 17, guide 2, plus strand for Cpf1

<400> SEQUENCE: 65
```
tctttcccgg agaaaagaga gtt                                          23

<210> SEQ ID NO 66
<211> LENGTH: 23
<212> TYPE: DNA
<213> ORGANISM: Artificial Sequence
<220> FEATURE:
<223> OTHER INFORMATION: Pair 18, guide 1, plus strand for Cpf1

<400> SEQUENCE: 66
gagtctgaca ttgatccagt gca                                          23

<210> SEQ ID NO 67
<211> LENGTH: 23
<212> TYPE: DNA
<213> ORGANISM: Artificial Sequence
<220> FEATURE:
<223> OTHER INFORMATION: Pair 18, guide 2, minus strand for Cpf1

<400> SEQUENCE: 67
tctttcccgg agaaaagaga gtt                                          23

<210> SEQ ID NO 68
<211> LENGTH: 23
<212> TYPE: DNA
<213> ORGANISM: Artificial Sequence
<220> FEATURE:
<223> OTHER INFORMATION: Pair 19, guide 1, plus strand for Cpf1

<400> SEQUENCE: 68
gctcctagca cggctctatg aaa                                          23

<210> SEQ ID NO 69
<211> LENGTH: 23
<212> TYPE: DNA
<213> ORGANISM: Artificial Sequence
<220> FEATURE:
<223> OTHER INFORMATION: Pair 19, guide 2, minus strand for Cpf1

<400> SEQUENCE: 69
tagaaaagcc tggaggtctc cac                                          23

<210> SEQ ID NO 70
<211> LENGTH: 23
<212> TYPE: DNA
<213> ORGANISM: Artificial Sequence
<220> FEATURE:
<223> OTHER INFORMATION: Pair 20, guide 1, minus strand for Cpf1

<400> SEQUENCE: 70
tccatgcgga gaacttggga atc                                          23

<210> SEQ ID NO 71
<211> LENGTH: 23
<212> TYPE: DNA
<213> ORGANISM: Artificial Sequence
<220> FEATURE:
<223> OTHER INFORMATION: Pair 20, guide 2, plus strand for Cpf1

<400> SEQUENCE: 71
ttagtgtaga ccagaccaca gcc                                          23

<210> SEQ ID NO 72
<211> LENGTH: 23
<212> TYPE: DNA
<213> ORGANISM: Artificial Sequence

```
<220> FEATURE:
<223> OTHER INFORMATION: Pair 21, guide 1, plus strand for Cpf1

<400> SEQUENCE: 72
ctcctcacag aggtcccgta taa                                          23

<210> SEQ ID NO 73
<211> LENGTH: 23
<212> TYPE: DNA
<213> ORGANISM: Artificial Sequence
<220> FEATURE:
<223> OTHER INFORMATION: Pair 21, guide 2, minus strand for Cpf1

<400> SEQUENCE: 73
ttagcaagcc gattgctgga tgc                                          23

<210> SEQ ID NO 74
<211> LENGTH: 23
<212> TYPE: DNA
<213> ORGANISM: Artificial Sequence
<220> FEATURE:
<223> OTHER INFORMATION: Pair 22, guide 1, minus strand for Cpf1

<400> SEQUENCE: 74
acctccttct ttcctattca gcc                                          23

<210> SEQ ID NO 75
<211> LENGTH: 23
<212> TYPE: DNA
<213> ORGANISM: Artificial Sequence
<220> FEATURE:
<223> OTHER INFORMATION: Pair 22, guide 2, minus strand for Cpf1

<400> SEQUENCE: 75
cttactgcaa accttcccca cct                                          23

<210> SEQ ID NO 76
<211> LENGTH: 23
<212> TYPE: DNA
<213> ORGANISM: Artificial Sequence
<220> FEATURE:
<223> OTHER INFORMATION: Pair 23, guide 1, minus strand for Cpf1

<400> SEQUENCE: 76
tgtcctcatg tttctctcag tct                                          23

<210> SEQ ID NO 77
<211> LENGTH: 23
<212> TYPE: DNA
<213> ORGANISM: Artificial Sequence
<220> FEATURE:
<223> OTHER INFORMATION: Pair 23, guide 2, plus strand for Cpf1

<400> SEQUENCE: 77
cagtaagcaa actggcttcc gcc                                          23

<210> SEQ ID NO 78
<211> LENGTH: 23
<212> TYPE: DNA
<213> ORGANISM: Artificial Sequence
<220> FEATURE:
<223> OTHER INFORMATION: Pair 24, guide 1, plus strand for Cpf1

<400> SEQUENCE: 78
aggtgattcc caagttctcc gca                                          23
```

```
<210> SEQ ID NO 79
<211> LENGTH: 23
<212> TYPE: DNA
<213> ORGANISM: Artificial Sequence
<220> FEATURE:
<223> OTHER INFORMATION: Pair 24, guide 2, plus strand for Cpf1

<400> SEQUENCE: 79
aagagtggcc ttgatttgta cag                                              23

<210> SEQ ID NO 80
<211> LENGTH: 20
<212> TYPE: DNA
<213> ORGANISM: Artificial Sequence
<220> FEATURE:
<223> OTHER INFORMATION: Non-targeting control guide 1 for Cas 9

<400> SEQUENCE: 80
ctgaaggttc caggtcattg                                                  20

<210> SEQ ID NO 81
<211> LENGTH: 20
<212> TYPE: DNA
<213> ORGANISM: Artificial Sequence
<220> FEATURE:
<223> OTHER INFORMATION: Non-targeting control guide 2 for Cas 9

<400> SEQUENCE: 81
acggaggcta agcgtcgcaa                                                  20

<210> SEQ ID NO 82
<211> LENGTH: 23
<212> TYPE: DNA
<213> ORGANISM: Artificial Sequence
<220> FEATURE:
<223> OTHER INFORMATION: Non-targeting control guide 1 for Cpf1

<400> SEQUENCE: 82
gagcagactc gtcgctcacg acc                                              23

<210> SEQ ID NO 83
<211> LENGTH: 23
<212> TYPE: DNA
<213> ORGANISM: Artificial Sequence
<220> FEATURE:
<223> OTHER INFORMATION: Non-targeting control guide 2 for Cpf1

<400> SEQUENCE: 83
gaagctgtac cggtgctgag tca                                              23

<210> SEQ ID NO 84
<211> LENGTH: 23
<212> TYPE: DNA
<213> ORGANISM: Artificial Sequence
<220> FEATURE:
<223> OTHER INFORMATION: Guide 1, minus strand  for two-guide deletion
     via Cpf1

<400> SEQUENCE: 84
agttctcaga gaacttggat ccg                                              23

<210> SEQ ID NO 85
<211> LENGTH: 23
<212> TYPE: DNA
<213> ORGANISM: Artificial Sequence
<220> FEATURE:
```

<223> OTHER INFORMATION: Guide 2, plus strand for two-guide deletion
      via Cpf1

<400> SEQUENCE: 85
tagaaaatat accagttcgg acg                                              23

<210> SEQ ID NO 86
<211> LENGTH: 23
<212> TYPE: DNA
<213> ORGANISM: Artificial Sequence
<220> FEATURE:
<223> OTHER INFORMATION: Set 1, Guide 1, minus strand for four-guide
      deletion via Cpf1

<400> SEQUENCE: 86
agttctcaga gaacttggat ccg                                              23

<210> SEQ ID NO 87
<211> LENGTH: 23
<212> TYPE: DNA
<213> ORGANISM: Artificial Sequence
<220> FEATURE:
<223> OTHER INFORMATION: Set 1, Guide 2, plus strand for four-guide
      deletion via Cpf1

<400> SEQUENCE: 87
gccccaagcc cttcggacgc ctt                                              23

<210> SEQ ID NO 88
<211> LENGTH: 23
<212> TYPE: DNA
<213> ORGANISM: Artificial Sequence
<220> FEATURE:
<223> OTHER INFORMATION: Set 1, Guide 3, minus strand for four-guide
      deletion via Cpf1

<400> SEQUENCE: 88
tagaaaagcc tggaggtctc cac                                              23

<210> SEQ ID NO 89
<211> LENGTH: 23
<212> TYPE: DNA
<213> ORGANISM: Artificial Sequence
<220> FEATURE:
<223> OTHER INFORMATION: Set 1, Guide 4, plus strand for four-guide
      deletion via Cpf1

<400> SEQUENCE: 89
tagaaaatat accagttcgg acg                                              23

<210> SEQ ID NO 90
<211> LENGTH: 23
<212> TYPE: DNA
<213> ORGANISM: Artificial Sequence
<220> FEATURE:
<223> OTHER INFORMATION: Set 2, Guide 1, minus strand for four-guide
      deletion via Cpf1

<400> SEQUENCE: 90
agttctcaga gaacttggat ccg                                              23

<210> SEQ ID NO 91
<211> LENGTH: 23
<212> TYPE: DNA
<213> ORGANISM: Artificial Sequence
<220> FEATURE:
<223> OTHER INFORMATION: Set 2, Guide 2, minus strand for four-guide deletion via Cpf1

<400> SEQUENCE: 91
gctgagtctg gtggccgtgc cgc                                              23

<210> SEQ ID NO 92
<211> LENGTH: 23
<212> TYPE: DNA
<213> ORGANISM: Artificial Sequence
<220> FEATURE:
<223> OTHER INFORMATION: Set 2, Guide 3, minus strand  for four-guide
      deletion via Cpf1

<400> SEQUENCE: 92
ctgggaggga gacctacgcg gcg                                              23

<210> SEQ ID NO 93
<211> LENGTH: 23
<212> TYPE: DNA
<213> ORGANISM: Artificial Sequence
<220> FEATURE:
<223> OTHER INFORMATION: Set 2, Guide 4, plus strand  for four-guide
      deletion via Cpf1

<400> SEQUENCE: 93
tagaaaatat accagttcgg acg                                              23

<210> SEQ ID NO 94
<211> LENGTH: 20
<212> TYPE: DNA
<213> ORGANISM: Artificial Sequence
<220> FEATURE:
<223> OTHER INFORMATION: Normalization primers, forward.

<400> SEQUENCE: 94
cacagtcctt ctccagccag                                                  20

<210> SEQ ID NO 95
<211> LENGTH: 20
<212> TYPE: DNA
<213> ORGANISM: Artificial Sequence
<220> FEATURE:
<223> OTHER INFORMATION: Normalization primers, reverse.

<400> SEQUENCE: 95
ttcacatact gggtcacgcc                                                  20

<210> SEQ ID NO 96
<211> LENGTH: 19
<212> TYPE: DNA
<213> ORGANISM: Artificial Sequence
<220> FEATURE:
<223> OTHER INFORMATION: 500bp inner primers, Cas9 pair 1, forward.

<400> SEQUENCE: 96
gatgggctcg ggctacttg                                                   19

<210> SEQ ID NO 97
<211> LENGTH: 18
<212> TYPE: DNA
<213> ORGANISM: Artificial Sequence
<220> FEATURE:
<223> OTHER INFORMATION: 500bp inner primers, Cas9 pair 1, reverse.

<400> SEQUENCE: 97
caccctccag ctgttcgc                                                    18

<210> SEQ ID NO 98
<211> LENGTH: 18
<212> TYPE: DNA
<213> ORGANISM: Artificial Sequence
<220> FEATURE:
<223> OTHER INFORMATION: 500bp inner primers, Cas9 pair 2, forward.

<400> SEQUENCE: 98
aggtgagcgg cggccaat                                           18

<210> SEQ ID NO 99
<211> LENGTH: 18
<212> TYPE: DNA
<213> ORGANISM: Artificial Sequence
<220> FEATURE:
<223> OTHER INFORMATION: 500bp inner primers, Cas9 pair 2, reverse.

<400> SEQUENCE: 99
gcgcgggctc cgtgctag                                           18

<210> SEQ ID NO 100
<211> LENGTH: 19
<212> TYPE: DNA
<213> ORGANISM: Artificial Sequence
<220> FEATURE:
<223> OTHER INFORMATION: 500bp inner primers, Cpf1 pair 1, forward.

<400> SEQUENCE: 100
tggatctccc agtgccgag                                          19

<210> SEQ ID NO 101
<211> LENGTH: 20
<212> TYPE: DNA
<213> ORGANISM: Artificial Sequence
<220> FEATURE:
<223> OTHER INFORMATION: 500bp inner primers, Cpf1 pair 1, reverse.

<400> SEQUENCE: 101
tgttcctgag gtttcgcgtt                                         20

<210> SEQ ID NO 102
<211> LENGTH: 19
<212> TYPE: DNA
<213> ORGANISM: Artificial Sequence
<220> FEATURE:
<223> OTHER INFORMATION: 500bp inner primers, Cpf1 pair 2, forward.

<400> SEQUENCE: 102
gttccccgag gccatgaac                                          19

<210> SEQ ID NO 103
<211> LENGTH: 20
<212> TYPE: DNA
<213> ORGANISM: Artificial Sequence
<220> FEATURE:
<223> OTHER INFORMATION: 500bp inner primers, Cpf1 pair 2, reverse.

<400> SEQUENCE: 103
ggacccaggg gtagaaatgg                                         20

<210> SEQ ID NO 104
<211> LENGTH: 23
<212> TYPE: DNA
<213> ORGANISM: Artificial Sequence
<220> FEATURE:

<223> OTHER INFORMATION: 500bp inner primers, Cpf1 pair 3, forward.

<400> SEQUENCE: 104
tcccggagaa aagagagttg cat                                    23

<210> SEQ ID NO 105
<211> LENGTH: 22
<212> TYPE: DNA
<213> ORGANISM: Artificial Sequence
<220> FEATURE:
<223> OTHER INFORMATION: 500bp inner primers, Cpf1 pair 3, reverse.

<400> SEQUENCE: 105
ctagctctga gccatagacc ct                                     22

<210> SEQ ID NO 106
<211> LENGTH: 19
<212> TYPE: DNA
<213> ORGANISM: Artificial Sequence
<220> FEATURE:
<223> OTHER INFORMATION: 5kb inner primers, forward.

<400> SEQUENCE: 106
gttccccgag gccatgaac                                         19

<210> SEQ ID NO 107
<211> LENGTH: 20
<212> TYPE: DNA
<213> ORGANISM: Artificial Sequence
<220> FEATURE:
<223> OTHER INFORMATION: 5kb inner primers, reverse.

<400> SEQUENCE: 107
ggacccaggg gtagaaatgg                                        20

<210> SEQ ID NO 108
<211> LENGTH: 19
<212> TYPE: DNA
<213> ORGANISM: Artificial Sequence
<220> FEATURE:
<223> OTHER INFORMATION: Multi-guide inner primers, forward.

<400> SEQUENCE: 108
gttccccgag gccatgaac                                         19

<210> SEQ ID NO 109
<211> LENGTH: 20
<212> TYPE: DNA
<213> ORGANISM: Artificial Sequence
<220> FEATURE:
<223> OTHER INFORMATION: Multi-guide inner primers, reverse.

<400> SEQUENCE: 109
ggacccaggg gtagaaatgg                                        20

<210> SEQ ID NO 110
<211> LENGTH: 20
<212> TYPE: DNA
<213> ORGANISM: Artificial Sequence
<220> FEATURE:
<223> OTHER INFORMATION: 5kb outer primers, forward.

<400> SEQUENCE: 110
ggagggttgg agtttagccc                                        20

```
<210> SEQ ID NO 111
<211> LENGTH: 20
<212> TYPE: DNA
<213> ORGANISM: Artificial Sequence
<220> FEATURE:
<223> OTHER INFORMATION: 5kb outer primers, reverse.

<400> SEQUENCE: 111
aacaagcctc tacccacagc                                                    20

<210> SEQ ID NO 112
<211> LENGTH: 20
<212> TYPE: DNA
<213> ORGANISM: Artificial Sequence
<220> FEATURE:
<223> OTHER INFORMATION: 500bp outer primers, Cas9 pair 1, foward.

<400> SEQUENCE: 112
ccgtacggaa aaactggccg                                                    20

<210> SEQ ID NO 113
<211> LENGTH: 20
<212> TYPE: DNA
<213> ORGANISM: Artificial Sequence
<220> FEATURE:
<223> OTHER INFORMATION: 500bp outer primers, Cas9 pair 1, reverse.

<400> SEQUENCE: 113
ttcgtcccgg gatgtcgttt                                                    20

<210> SEQ ID NO 114
<211> LENGTH: 19
<212> TYPE: DNA
<213> ORGANISM: Artificial Sequence
<220> FEATURE:
<223> OTHER INFORMATION: 500bp outer primers, Cas9 pair 2, foward.

<400> SEQUENCE: 114
aggaggaggc ctggatctc                                                     19

<210> SEQ ID NO 115
<211> LENGTH: 18
<212> TYPE: DNA
<213> ORGANISM: Artificial Sequence
<220> FEATURE:
<223> OTHER INFORMATION: 500bp outer primers, Cas9 pair 2, reverse.

<400> SEQUENCE: 115
gtagttgagc gccgtggg                                                      18

<210> SEQ ID NO 116
<211> LENGTH: 20
<212> TYPE: DNA
<213> ORGANISM: Artificial Sequence
<220> FEATURE:
<223> OTHER INFORMATION: 500bp outer primers, Cpf1 pair 1, forward.

<400> SEQUENCE: 116
tgcttctgcg tgtcctgacg                                                    20

<210> SEQ ID NO 117
<211> LENGTH: 19
<212> TYPE: DNA
<213> ORGANISM: Artificial Sequence
<220> FEATURE:
<223> OTHER INFORMATION: 500bp outer primers, Cpf1 pair 1, reverse.
```

-continued

<400> SEQUENCE: 117
ctggcttctc ctcgcgact                                                      19

<210> SEQ ID NO 118
<211> LENGTH: 21
<212> TYPE: DNA
<213> ORGANISM: Artificial Sequence
<220> FEATURE:
<223> OTHER INFORMATION: 500bp outer primers, Cpf1 pair 2, forward.

<400> SEQUENCE: 118
gcgcggcttt accatagagt c                                                   21

<210> SEQ ID NO 119
<211> LENGTH: 20
<212> TYPE: DNA
<213> ORGANISM: Artificial Sequence
<220> FEATURE:
<223> OTHER INFORMATION: 500bp outer primers, Cpf1 pair 2, reverse.

<400> SEQUENCE: 119
cttgcgagag aagcgtggtg                                                     20

<210> SEQ ID NO 120
<211> LENGTH: 20
<212> TYPE: DNA
<213> ORGANISM: Artificial Sequence
<220> FEATURE:
<223> OTHER INFORMATION: 500bp outer primers, Cpf1 pair 3, forward.

<400> SEQUENCE: 120
ttaaggtcgt agccagtccg                                                     20

<210> SEQ ID NO 121
<211> LENGTH: 20
<212> TYPE: DNA
<213> ORGANISM: Artificial Sequence
<220> FEATURE:
<223> OTHER INFORMATION: 500bp outer primers, Cpf1 pair 3, reverse.

<400> SEQUENCE: 121
cttgcccaag gcagatgaca                                                     20

<210> SEQ ID NO 122
<211> LENGTH: 20
<212> TYPE: DNA
<213> ORGANISM: Artificial Sequence
<220> FEATURE:
<223> OTHER INFORMATION: Multi-guide outer primers, forward.

<400> SEQUENCE: 122
tgttggaccc caaacatcca                                                     20

<210> SEQ ID NO 123
<211> LENGTH: 20
<212> TYPE: DNA
<213> ORGANISM: Artificial Sequence
<220> FEATURE:
<223> OTHER INFORMATION: Multi-guide outer primers, reverse.

<400> SEQUENCE: 123
ggagagcggg aggagttgta                                                     20

<210> SEQ ID NO 124
<211> LENGTH: 50

```
<212> TYPE: DNA
<213> ORGANISM: Artificial Sequence
<220> FEATURE:
<223> OTHER INFORMATION: 5kb outer primers for allelic cloning, forward.

<400> SEQUENCE: 124
agtcacgacg ttgtaaaacg acggccagtg ggagggttgg agtttagccc            50

<210> SEQ ID NO 125
<211> LENGTH: 50
<212> TYPE: DNA
<213> ORGANISM: Artificial Sequence
<220> FEATURE:
<223> OTHER INFORMATION: 5kb outer primers for allelic cloning, reverse.

<400> SEQUENCE: 125
agcttgcatg cctgcaggtc gactctagag aacaagcctc tacccacagc            50
```

ME THODS AND COMPOSITIONS COMPRISING CRISPR-Cpf1 AND PAIRED GUIDE CRISPR RNAs FOR PROGRAMMABLE GENOMIC DELETIONS

CROSS-REFERENCE TO RELATED APPLICATION

This application is a continuation of International Application No. PCT/US2018/048767, filed on Aug. 30, 2018, which claims the benefit of and priority of U.S. Provisional Application No. 62/552,816, filed on Aug. 31, 2017, both of which are hereby incorporated by reference herein in their entireties.

STATEMENT REGARDING FEDERALLY SPONSORED RESEARCH OR DEVELOPMENT

This invention was made with government support under Grant Nos. R00-HG008171 awarded by the National Institutes of Health/NHGRI. The government has certain rights in this invention.

INCORPORATION-BY-REFERENCE OF MATERIAL SUBMITTED IN ELECTRONIC FORM

Applicant hereby incorporates by reference the Sequence Listing material filed in electronic form herewith. This file is labeled 114203-5837_SL.txt, dated Feb. 26, 2020 and is 79.2 kb in size.

BACKGROUND OF THE INVENTION

Current methods for genomic deletions rely on the Clustered Regularly Interspaced Short Palindromic Repeats (CRISPR) and CRISPR-associated Cas9 nuclease (Canver, 2014; Zhu, 2016). Briefly, the conventional CRISPR approach is to introduce guide RNA (gRNAs) library via lentiviral infection to a population of cells. The guide RNA is a combination of the endogenous bacterial crRNA (CRISPR RNA) and tracrRNA (transactivating crRNA) into a single chimeric guide RNA (gRNA) transcript. The gRNA combines the targeting specificity of crRNA with the scaffolding properties of tracrRNA into a single transcript. When the gRNA and Cas9 are expressed in a cell, an assay is then run that queries the function or expression of a gene of interest. CRISPR/Cas9 mediates double-stranded breaks at sites specified by the gRNA in each cell, eventually resulting in an insertion or deletion (indel) via imperfect non-homologous end joining (NHEJ). However, existing technologies for making libraries of paired-cuts/deletions are difficult to package into lentivirus and require multiple cloning steps.

In order to make large libraries for functional genomic screens, these methods require two separate cloning steps: (1) introducing the Cas9 guide RNA(s); and (2) adding a separate promoter to drive the second Cas9 guide RNA.

Precise genomic deletions using Cas9 have been valuable for establishing in vivo disease models (Young, 2016) and performing high-throughput loss-of-function screens (Zhu, 2016; Diao, 2017). However, Cas9-driven deletions have several limitations, including difficultly in targeting AT-rich regions of the genome such as introns, potentially confounding off-target effects, low successful packaging rate into lentivirus, and multiple cloning steps.

CRISPR-associated endonuclease Cpf1 (also referred to as Cas12a), a class 2 CRISPR effector, is a single RNA-guided endonuclease lacking tracrRNA; and it utilizes a T-rich protospacer-adjacent motif (PAM) (Bernd Zetsche, 2015). Moreover, Cpf1(Cas12a) cleaves DNA via a staggered DNA double-stranded break. Previous Cpf1 work has demonstrated use of multiple guides for knocking out multiple genes (Zetsche B, 2017).

Thus, efficient compositions and methods are needed for programmable genomic deletions.

SUMMARY OF THE INVENTION

In one aspect, a method comprises transducing a mammalian cell with one or more virus vectors. Each vector comprises a nucleic acid sequence encoding a Cpf1 protein (also known as Cas12a) and an optional selectable marker in operative association with an RNA pol II promoter which controls expression thereof, in a mammalian cell. Each vector also comprises a CRISPR RNA (crRNA) array comprising at least two spacers, wherein each spacer encodes a guide RNA (i.e., guide). Each guide hybridizes to a unique sequence located 3' from a T-rich protospacer-adjacent motif (PAM) in a contiguous region of the genome or a chromosome of a mammalian cell. The array is in operative association with an RNA pol III promoter. The method further comprises culturing the transduced cells. In the cultured cells, the Cpf1 creates a deletion comprising the chromosome or genome between cleavage sites located downstream of each PAM, thereby providing a plurality of transduced cell cultures, each cell culture comprising a deletion.

In another aspect, a library of mammalian cell cultures generated by the described method is provided, wherein each cell of the cell culture comprises at least one deletion in a contiguous DNA sequence of a chromosome or the genome.

In yet another aspect, a library of nucleic acid sequences is provided, comprising at least two CRISPR RNA (crRNAs) spacers, wherein each spacer encodes a guide RNA (i.e., guide, or guide CRISPR RNA). Each guide hybridizes to a unique protospacer sequence located 3' from a T-rich protospacer-adjacent motif (PAM) in a contiguous region of the genome or a chromosome of a mammalian cell. The guide RNAs are capable of complexing with Cpf1 (Cas12a) protein and providing targeting specificity and binding ability for nuclease activity of Cpf1. Each of the spacers is adjacent to an optimized Direct Repeat at the 5' end thereof.

In a further aspect, a library of virus vectors is provided, each vector comprising a nucleic acid sequence encoding a Cpf1(Cas12a) protein and a selectable marker in operative association with an RNA pol II promoter which controls expression thereof, in a mammalian cell. Each vector also comprises a CRISPR RNA (crRNA) array comprising at least two spacers, wherein each spacer encodes a guide RNA (i.e., guide). Each guide RNA hybridizes to a unique sequence located 3' from a T-rich protospacer-adjacent motif (PAM) in a contiguous region of the genome or a chromosome of a mammalian cell, and the array is in operative association with an RNA pol III promoter.

Still other aspects and advantages of the invention will be readily apparent from the following detailed description of the invention.

BRIEF DESCRIPTION OF THE DRAWINGS

FIGS. 1a to 1b illustrate deletion systems (Cas9, FIG. 1a, or Cpf1/Cas12a, FIG. 1b) that create two double stranded breaks that lead to a targeted genomic deletion. FIG. 1a shows schematics of SpCas9-mediated deletion. Paired sgR- NAs containing 20 bp guide sequences direct Cas9 to targeted sites, creating blunt ends which are joined via cellular repair mechanisms. In this study, designed pairs also included guides targeting the same strand (shown above) or targeting opposite DNA strands (not shown). FIG. 1b shows schematics of LbCpf1-mediated deletions. Cpf1 with paired guides (23 bp guide sequences) processed from a single crRNA introduces genomic deletions.

FIG. 2a shows vector maps of CRISPR-Cas9 (upper map) and CRISPR-Cpf1 (lower map) single vector deletion systems. LTR, long terminal repeats; hU6 and mU6, human and mouse pol III promoter; sgRNA, single guide RNA; EFS, pol II promoter; P2A, porcine teschovirus-1 2A self-cleaving peptide; puro, puromycin resistance gene; WPRE, woodchuck hepatitis virus post-transcriptional regulatory element; crRNA, CRISPR RNA. FIG. 2b shows schematic of genomic loci of targeted deletions. Pairs of Cas9-associated sgRNAs and Cpf1-associated crRNAs are designed to introduce about 500 bp deletions around the EMX1 gene. FIG. 2c is a representative PCR readout of Cas9- and Cpf1-mediated deletions (Cas9: pair b; Cpf1: pair d). Upper arrow in the gel image indicates the non-deletion band whereas lower arrow indicates genome repair of two ends after successful deletion. FIG. 2d shows quantification of deletion efficiency using primers that amplify inside the deleted region (mean±s.e.m, n=3 biological replicates). FIG. 2e shows Cpf1 deletion construct with full-length direct repeats or processed repeats. FIG. 2f shows deletion efficiency of Cpf1 with processed repeats (mean±s.e.m, n=3 biological replicates). FIG. 2g shows average deletion efficiency comparing Cpf1 full-length repeats and processed repeats (mean±s.e.m, n=3 different constructs with 3 biological replicates each).

FIGS. 3a to 3b illustrate cloning strategies for assembling Cas9 and Cpf1 deletion constructs. FIG. 3a shows that Cas9 deletion constructs require additional steps (PCR and BsmBI restriction digestion) to clone the pol II promoter (mouse U6) between the 2 sgRNA cassettes. See Example 1 for details. FIG. 3b shows that for Cpf1 deletion construct assembly, one-step annealing of top and bottom strand oligonucleotides creates a double-stranded template for ligation into the plasmid backbone.

FIG. 5a provides gel images of Cas9 500 bp deletions. FIG. 5b provides gels of Cpf1 500 bp deletions.

FIG. 6a provides assay sensitivity characterized by qPCR of wild-type gDNA 2-fold dilution series. In the given range (7.8 ng/ul to 500 ng/ul), threshold Ct values and the logarithms of the corresponding concentrations were confirmed to be linear ($r^2_{5kb\ Inner\ Primer}=0.9916$, $r^2_{Normalization\ Primer}=0.9982$). Error bars are s.e.m of 3-4 technical replicates. FIG. 6b shows that increasing the number of dilutions per sample reduces the standard deviation among biological replicates. For each sample, 3 biological replicates were used and the plotted dot is the standard deviation of the percent deletion among the 3 biological replicates. Different dots for each dilution are from 3 distinct constructs (Cpf1 non-targeting pair, Cpf1 500 bp direct-repeat pair b and processed-repeat pair b). For 1 dilution, all samples were diluted to <100 ng/μl and used as is. For 2 dilutions, the initial (1 dilution) template and a 2-fold dilution were used for each sample. For 3 and 4 dilutions, additional 2-fold dilutions were added for each sample. When using 2 or more dilutions, the median Ct value was calculated from dilution replicates. All serial dilutions were in the range of gDNA concentrations shown to be linear in FIG. 6a.

FIG. 7a provides a schematic of genomic loci of targeted deletions. FIG. 7b provides predicted genotype of 2-guide deletion construct and 4-guide deletion construct. FIG. 7c provides PCR genotyping of multi-guide deletion with outer primers shown FIG. 7a. FIG. 7d provides percent deletion assessed by qPCR.

FIG. 8a provides deletion efficiency of Cpf1 guide pairs where both guides have 30-70% GC content and where both guides have a GC content outside of that range (p=0.03, Mann-Whitney U test; mean±s.e.m, n=3 biological replicates). FIG. 8b provides quantification of deletion efficiency using primers that amplify inside the deleted region for 5 kb deletions compared to either Cas9 or Cpf1 non-targeting guide pairs (mean±s.e.m, n=3 biological replicates, Cas9, pairs f, g, and h; Cpf1, pairs i, j and k). FIG. 8c provides distribution of deletion sizes using Cas9 and Cpf1 paired guides (Cas9: pair f; Cpf1: pair 1). FIGS. 8d and 8e provide frequency of bases remaining at the junction surrounding the predicted deletion site (n=44 clones for Cas9, FIG. 8d; 39 clones for Cpf1, FIG. 8e) (Cas9: pair f, Cpf1: pair 1). FIG. 8f provides deletion efficiency at about 3 weeks after lentiviral transduction compared to a control (tdTomato-expressing) lentivirus (mean±s.e.m, n=3 biological replicates) (Cas9: pair f, Cpf1: pair 1).

FIGS. 11a to 11b provide analysis result of greater sequence heterogeneity in deletion junctions with Cpf1 than with Cas9. Genomic DNA was harvested 5-6 days after transient transfection of the respective constructs into HAP1 cells. Sanger sequencing reads from individual alleles cloned into pUC19. FIG. 11a provides allele sequencing from Cpf1-induced deletions. FIG. 11b provides allele sequencing from Cas9-induced deletions.

DETAILED DESCRIPTION

Figure 2A:
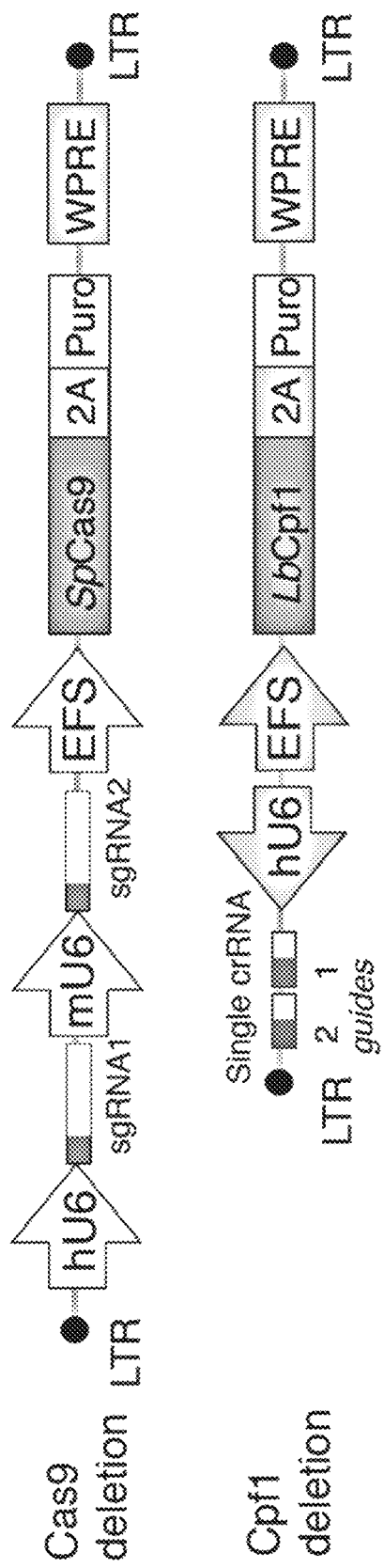
FIGS. 2a to 2g demonstrate that LbCpf1 can create genomic deletions using a single crRNA with comparable efficiency to SpCas9 and can also utilize shorter, processed direct repeats.

The novel compositions (e.g., library of mammalian cell cultures, library of nucleic acid sequences, library of vectors) and in vitro methods of using these compositions or generating these compositions, as described herein, provide efficient systems to engineer genomic deletions via Cpf1 (also known as Cas12a) and paired guide CRISPR RNAs.

In one embodiment, various additional assays, such as expression of a gene of interests and/or a functional analysis of the gene products, are combined with the described compositions and methods for multiple purposes. Some of these purposes include, but are not limited to, interrogating genomic regions in order to allow the identification of relevant functional units for gene expression, gene regulation, drug resistance, cell growth and/or reproduction, and responses to biological agents, chemical agents or physical stress.

The compositions and methods provided herein are useful for interrogating a continuous genomic region. Such a continuous genomic region may comprise small portions, i.e., genomic sequences of about 50 kb, up to the entire chromosome or the entire genome. In one embodiment, the compositions and methods are useful in interrogating a functional element of the genome. A functional element typically encompasses a limited region of the genome, such as a region of 50, 60, 70, 80, 90 to 100 kb of genomic DNA. In one embodiment, the methods described herein are used for the interrogation of non-coding genomic regions, such as regions 5' and 3' of the coding region of a gene of interest. The methods allow the identification of targets in the 5' and 3' region of a gene which may affect a phenotypic change only under particular circumstances or only for particular cells or tissues in an organism.

In certain embodiments, the genomic region of interest comprises a transcription factor binding site, a region of DNase I hypersensitivity, a transcription enhancer or repressor element, a chromosome, or other intergenic region containing sequence with biochemical activity. In other embodiments, the genomic region of interest comprises an epigenetic signature for a particular disease or disorder. Additionally, or alternatively, the genomic region of interest may comprise an epigenetic insulator. In other embodiments, a genomic region of interest comprises two or more continuous genomic regions that physically interact. In still other embodiments, the genomic region of interest comprises one or more sites susceptible to one or more of histone acetylation, histone methylation, histone ubiquitination, histone phosphorylation, DNA methylation, or a lack thereof.

Examples of genomic regions of interest for interrogation using the methods and compositions described herein include regions comprising, or located 5' or 3' of, a gene associated with a signaling biochemical pathway, e.g., a signaling biochemical pathway associated gene or polynucleotide. Examples of genomic regions include regions comprising, or located 5' or 3' of, a disease associated gene or polynucleotide. In one embodiment, the region located 5' or 3' of a gene refers to a genomic region of a genome or a chromosome from a first nucleotide of the genome or chromosome to a second nucleotide of the genome or chromosome. The second nucleotide is located between the first nucleotide and the gene in the genome or chromosome. The first nucleotide is about 100 bp, about 200 bp, about 300 bp, about 400 bp, about 500 bp, about 600 bp, about 700 bp, about 800 bp, about 900 bp, about 1 kb, about 2 kb, about 3 kb, about 4 kb, about 5 kb, about 6 kb, about 7 kb, about 8 kb, about 9 kb, about 10 kb, about 15 kb, about 20 kb, about 30 kb, about 40 kb, about 50 kb, about 60 kb, about 70 kb, about 80 kb, about 90 kb, about 100 kb, about 150 kb, about 200 kb, about 250 kb, about 300 kb, about 350 kb, about 400 kb, about 450 kb, about 500 kb, about 550 kb, about 600 kb, about 650 kb, about 700 kb, about 750 kb, about 800 kb, about 850 kb, about 900 kb, about 950 kb, or about 1 mb, 5' or 3' to the gene. A "disease-associated" gene or polynucleotide refers to any gene or polynucleotide which yields transcription or translation products at an abnormal level or in an abnormal form in cells derived from a disease-affected tissue compared with tissues or cells of a non-disease control. Another embodiment of a disease-associated gene is a gene that becomes expressed at an abnormally high level; it may be a gene that becomes expressed at an abnormally low level. The altered expression correlates with the occurrence and/or progression of the disease. The transcribed or translated products may be known or unknown, and may be expressed at a normal or abnormal level. Sites of DNA hypersensitivity, transcription factor binding sites, and epigenetic markers of a gene of interest can be determined by accessing publicly available data bases.

The compositions and methods provided herein are useful for interrogating a genomic region of interest as described above. It will also be readily obvious to one of skill in the art that the term "a contiguous region of the genome or a chromosome of a mammalian cell" in the compositions and methods of this invention can be used interchangeably with a genomic region of interest as described above.

I. Components and Definitions

In the descriptions of the compositions and methods discussed herein, the various components can be defined by use of technical and scientific terms having the same meaning as commonly understood by one of ordinary skill in the art to which this invention belongs and by reference to published texts. Such texts provide one skilled in the art with a general guide to many of the terms used in the present application. The definitions contained in this specification are provided for clarity in describing the components and compositions herein and are not intended to limit the claimed invention.

A. Cpf1 Cas12a

The Cpf1 protein, which is also known as Cas12a, is a class 2 CRISPR effector guided by a single RNA (RNA guide) that utilizes a T-rich protospacer-adjacent motif (PAM), cleaves DNA, and results in a staggered double-stranded break. See, Zetsche B, 2017; Bernd Zetsche, 2015;

U.S. Pat. No. 9,650,617B2; and EP3009511B1. Each reference is incorporated herein by reference in its entirety. The term "cleavage site" refers to a site that can be cleaved by a Cpf1 protein after binding to a target sequence. For example, the staggered cleavage site of FnCpf1 is distant from the PAM: cleavage occurs after the 18$^{th}$ base on the non-targeted (+) strand and after the 23$^{rd}$ base on the targeted (−) strand. See, e.g., (Zetsche B. G., 2015). In one embodiment, the cleavage site may be predicted by one of skill in the art. Throughout the Specification, one of skill in the art would appreciate that the use of the terms "Cpf1" or "Cas12a" are interchangeable and refer to the same protein. That protein includes e.g., a wild type or naturally occurring Cpf1 or "Cas12a" protein, an ortholog of a Cpf1 or "Cas12a" protein, or a functional variant thereof, a nucleic acid sequence encoding a Cpf1 or "Cas12a" protein, or a functional variant of the nucleic acid sequence, or both the aforementioned Cpf1 or "Cas12a" proteins or nucleic acid sequences. Mutations in the naturally occurring "Cpf1" or "Cas12a" proteins are also encompassed by these interchangeable terms.

Orthologs are genes in different species that evolved from a common ancestral gene by speciation. Normally, orthologs retain the same function in the course of evolution. In some embodiments, the Cpf1 is selected from an Acidaminococcus sp Cpf1 (AsCpf1), *Lachnospiraceae bacterium* Cpf1 ND2006 (LbCpf1), *Lachnospiraceae bacterium* MA2020 Cpf1 (Lb2Cpf1), *Lachnospiraceae bacterium* MC2017 Cpf1 (Lb3Cpf1), *Butyrivibrio proteoclasticus* Cpf1 (BpCpf1), *Peregrinibacteria bacterium* Cpf1 (PeCpf1), *Francisella tularensis* subsp. *Novicida* Cpf1 (FnCpf1), *Parcubacteria bacterium* Cpf1 (PbCpf1), *Moraxella bovoculi* Cpf1 (MbCpf1), *Leptospira inadai* Cpf1 (LiCpf1), *Porphyromonas macacae* Cpf1 (PmCpf1), *Porphyromonas crevioricanis* Cpf1 (PcCpf1), *Prevotella disiens* Cpf1 (PdCpf1), *Smithella* sp. Cpf1 (SsCpf1), *Candidatus methanoplasma termitum* Cpf1 (CMtCpf1), and/or *Eubacterium eligens* Cpf1 (EeCpf1). The amino acid sequences of the Cpf1 orthologs are readily known by one of skill in the art. See, e.g., (Zetsche B. G., 2015; Zetsche, et al., 2017), addgene.org and uniprot.org/uniprot/.

In one embodiment, the Cpf1 is an Acidaminococcus sp Cpf1 (i.e., AsCpf1) having an amino acid sequence with a UniProtKB identification of U2UMQ6 (CPF1_ACISB), which is also reproduced as SEQ ID NO: 1. In another embodiment, the Cpf1 is an *Francisella tularensis* subsp. *Novicida* Cpf1 (i.e., FnCpf1) having an amino acid sequence with a UniProtKB identification of A0Q7Q2 (CPF1_FRATN), which is also reproduced as SEQ ID NO: 2. In yet another embodiment, the Cpf1 is a *Leptospira inadai serovar* Lyme Cpf1 having an amino acid sequence with a UniProtKB identification of V6HCU8 (V6HCU8_9LEPT), which is also reproduced as SEQ ID NO: 3. In one embodiment, the Cpf1 is an *Lachnospiraceae bacterium* Cpf1 (i.e., LbCpf1) having an amino acid sequence with a UniProtKB identification of A0A182DWE3 (A0A182DWE3_9FIRM), which is also reproduced as SEQ ID NO: 4. In another embodiment, the Cpf1 is an *Butyrivibrio hungatei* Cpf1 having an amino acid sequence with a UniProtKB identification of A0A1D9P5I8 (A0A1D9P5I8_9FIRM), which is also reproduced as SEQ ID NO: 5.

A functional variant of the Cpf1 protein is a protein or a polypeptide which shares the same biological function with Cpf1. A functional variant of the Cpf1 protein might be a Cpf1 protein with 1, 2, 3, 4, 5, 6, 7, 8, 9, 10, 11, 12, 13, 14, 15, 16, 17, 18, 19, about 20, about 25, about 30, about 35, about 40, about 45, about 50, about 60, about 70, about 80, about 90, about 100, about 110, about 120, about 130, about 140, about 150, about 160, about 170, about 180, about 200, about 220, about 240, about 260, about 280, about 300, about 330, about 360, about 390 or more conserved amino acid substitution(s).

Identifying an amino acid for a possible conserved substitution, determining a substituted amino acid, as well as the methods and techniques involved in incorporating the amino acid substation into a Cpf1 protein are well-known to one of skill in the art. See, sift.jcvi.org/ and (Ng & Henikoff, Predicting the Effects of Amino Acid Substitutions on Protein Function, 2006; Ng & Henikoff, Predicting the effects of coding non-synonymous variants on protein function using the SIFT algorithm, 2009; Ng PC, 2003; Ng & Henikoff, Accounting for Human Polymorphisms Predicted to Affect Protein Function, 2002; Sim, et al., 2012; Sim, et al., 2012), each of which is incorporated herein by reference in its entirety.

In some embodiments, the Cpf1 protein is a Cpf1 protein mutated to increase or decrease guided indel formation, or to increase or decrease the activity of dsDNA cleavage. In one embodiment, one or more of the following exemplified amino acids is or are mutated in a Cpf1 protein: T167, R176, R192, W382, K548, M604, K607, K780, G783, D908, R951, R955, W958, E993, R1226, S1228, D1235, D1263 (the numbering of which is based on AsCpf1, SEQ ID NO: 1); or D917, E1006, or D1255 (the numbering of which is based on FnCpf1, SEQ ID NO: 2). In one embodiment, the amino acid(s) is/are mutated to an A (Ala) or a P (Pro). In a further embodiment, modifications of a Cpf1 protein include but are not limited to: T167A, R176A, R192A, W382A, K548A, M604A, K607A, K780A, G783P, D908P, R951A, R955A, W958A, E993P, R1226A, 51228A, D1235A, D1263A (the numbering of which is based on AsCpf1, SEQ ID NO: 1); or D917A, E1006A, or D1255A (the numbering of which is based on FnCpf1, SEQ ID NO: 2); or any combination thereof. See, (Bernd Zetsche, 2015; Yamano, et al., 2016). Furthermore, one of skill in the art would readily recognize that the amino acid mutation(s) mentioned above might be incorporated at a corresponding amino acid of any Cpf1 protein as described herein, wherein the corresponding amino acid is determined by an alignment of amino acid sequences of the Cpf1 protein with AsCpf1 or FnCpf1.

A variety of algorithms and/or computer programs are well known in the art or commercially available for alignment of multiple amino acid sequences (e.g., BLAST, ExPASy; FASTA; using, e.g., Needleman-Wunsch algorithm, Smith-Waterman algorithm). Alignments are performed using any of a variety of publicly or commercially available Multiple Sequence Alignment Programs. Sequence alignment programs are available for amino acid sequences, e.g., the "Clustal Omega", "Clustal X", "MAP", "PIMA", "MSA", "BLOCKMAKER", "MEME", and "Match-Box" programs. Generally, any of these programs are used at default settings, although one of skill in the art can alter these settings as needed. Alternatively, one of skill in the art can utilize another algorithm or computer program which provides at least the level of identity or alignment as that provided by the referenced algorithms and programs. See, e.g., J. D. Thomson et al, Nucl. Acids. Res., "A comprehensive comparison of multiple sequence alignments", 27(13):2682-2690 (1999).

A functional variant of the nucleic acid sequence encoding an Cpf1 protein is a nucleic acid sequence that can be directly translated, using the standard genetic code, to provide an amino acid sequence identical to that translated from the parental nucleic acid molecules.

In some embodiments, the nucleic acid sequence encoding Cpf1 may be codon-optimized for expression in eukaryotic cell, such as mammalian cells. Methods of codon-optimization are known and have been described previously (e.g. WO 96/09378). A sequence is considered codon-optimized if at least one non-preferred codon as compared to a wild type sequence is replaced by a codon that is more preferred. Herein, a non-preferred codon is a codon that is used less frequently in an organism than another codon coding for the same amino acid, and a codon that is more preferred is a codon that is used more frequently in a target cell than a non-preferred codon. The frequency of codon usage for a specific organism can be found in codon frequency tables, such as in kazusa.jp/codon. Preferably more than one non-preferred codon, preferably most or all non-preferred codons, are replaced by codons that are more preferred. Preferably the most frequently used codons in an organism are used in a codon-optimized sequence. Replacement by preferred codons generally leads to higher expression. It will also be understood by a skilled person that numerous different nucleic acid molecules can encode the same polypeptide as a result of the degeneracy of the genetic code.

It is also understood that skilled persons may, using routine techniques, make nucleotide substitutions that do not affect the amino acid sequence encoded by the nucleic acid molecules to reflect the codon usage of any particular host organism in which the polypeptides are to be expressed. Therefore, unless otherwise specified, a "nucleic acid sequence encoding an amino acid sequence" includes all nucleotide sequences that are degenerate versions of each other and that encode the same amino acid sequence. Nucleic acid sequences can be cloned using routine molecular biology techniques, or generated de novo by DNA synthesis, which can be performed using routine procedures by service companies having business in the field of DNA synthesis and/or molecular cloning (e.g. GeneArt™, GenScript®, Life Technologies™, Eurofins).

In one embodiment, the Cpf1 coding sequence is operably linked to a regulatory element to ensure expression in a target cell. In a further embodiment, the promoter is an inducible promoter, such as a doxycycline inducible promoter. In a preferred embodiment, the regulatory element(s) comprises an RNA pol II promoter. A RNA pol II promoter is a promoter that is sufficient to direct accurate initiation of transcription by the RNA polymerase II machinery, wherein the RNA polymerase II (RNAP II and Pol II) is a RNA polymerase found in the nucleus of eukaryotic cells, catalyzing the transcription of DNA to synthesize precursors of messenger RNA (mRNA) and most small nuclear RNA (snRNA) and microRNA.

A variety of Polymerase II promoters that can be used within the compositions and methods described herein are publicly or commercially available to a skilled artisan, for example, viral promoters obtained from the genomes of viruses including promoters from polyoma virus, fowlpox virus (UK 2,211,504), adenovirus (such as Adenovirus 2 or 5), herpes simplex virus (thymidine kinase promoter), bovine papilloma virus, avian sarcoma virus, cytomegalovirus (CMV), a retrovirus (e.g., MoMLV, or RSV LTR), Hepatitis-B virus, Myeloproliferative sarcoma virus promoter (MPSV), VISNA, and Simian Virus 40 (SV40); other heterologous mammalian promoters including the actin promoter, β-actin promoter, immunoglobulin promoter, heat-shock protein promoters, human Ubiquitin-C promoter, PGK promoter. Additional promoters are readily known and available. See, e.g., (Kadonaga, 2012), WO 2014/15134, and WO 2016/054153. In one particular embodiment, the promoter is a CMV promoter.

Optionally, the nucleic acid sequence encoding a Cpf1 protein further comprises a reporter gene or a nucleic acid encoding a selectable marker, which may include sequences encoding geneticin, hygromicin, ampicillin or purimycin resistance, among others. As used herein, the term "selectable marker" refers to a peptide or polypeptide whose presence can be readily detected in a target cell when a selective pressure is applied to the cell. A reporter gene, which is used as an indication of whether the Cfp1 coding sequence has been incorporated into and/or expressed as a functional protein in the target cell or not, is readily known by one of skill in the art. For example, the *E. coli* lacZ gene, the chloramphenicol acetyltransferase (CAT) gene, or a gene encoding a fluorescent protein such as Green fluorescent protein (GFP).

B. CRISPR-Cpf1 System

As used herein a "target sequence" refers to a nucleic acid sequence in a contiguous region of the genome or a chromosome of a mammalian, or a nucleic acid sequence in the genomic region of interest as described, to which a guide sequence is designed to target, e.g. have complementarity, where hybridization between a target sequence and a guide sequence promotes the formation of a CRISPR-Cpf1 complex.

As used herein, the term "protospacer" refers to the nucleic acid sequence consisting of the target sequence and the adjacent protospacer adjacent motif (PAM) thereof. By "PAM" as used herein is meant a PAM specific for Cpf1 (Cas12a).

In one embodiment of the compositions and methods described herein, a protospacer adjacent motif (PAM) or PAM-like motif directs binding of the CRISPR-Cpf1 complex to the target locus of interest. In one embodiment of the invention, the PAM is 5'-TTN-3', where N is A/C/G or T. In a further embodiment, the PAM is 5'-TTN-3', where N is A/C/G or T and the Cpf1 protein is FnCpf1. In another embodiment of the invention, the PAM is 5'-TTTN-3', where N is A/C/G or T. In a further embodiment, the PAM is 5'-TTTN-3', where N is A/C/G or T and the Cpf1 is LbCpf1. In yet another embodiment, the PAM is 5'-TTTV-3', where V is A/C or G, In a further embodiment, the PAM is 5'-TTTV-3', where V is A/C or G and the Cpf1 is PaCpf1. In yet a further embodiment, the PAM is 5'-TTTV-3', where V is A/C or G and the Cpf1 is LbCpf1. Additionally, the PAM is located upstream of the 5' end of the protospacer. Other PAMs are readily known by one of the skill in the art. See, e.g., (Zetsche, et al., 2017), which is incorporated herein by reference. In an embodiment, a targeting range is provided for RNA guided genome editing nucleases wherein the T-rich PAMs of the Cpf1 family allow for targeting and editing of AT-rich genomes. The terms "T-rich" and "AT-rich" are used herein interchangeably, which means the AT ratio over the nucleic acids of a sequence is at least about 50%, at least about 75%, at least about 80%, or at least about 90%.

The terms "guide RNA" "guide" or "guide sequence" refer to a nucleic acid sequence which can hybridize to a unique sequence located 3' from a T-rich protospacer-adjacent motif (PAM) in a contiguous region of the genome or a chromosome of a mammalian cell. The guide is capable of complexing with Cpf1 protein and providing targeting specificity and binding ability for nuclease activity of Cpf1. In one embodiment, the guide RNA is about 18 nucleotides (nt)

to about 35 nt. In one embodiment, the guide RNA is about 23 nt. The terms "CRISPR RNA spacer" and "spacer" are used interchangeably herein, and refer to a nucleic acid sequence which encodes a guide RNA. In one embodiment, the spacer is about 18 nt to about 35 nt. In one embodiment, the spacer is about 23 nt. Exemplified spacers and guides can be found in the Examples. The term "unique sequence" as used herein means a nucleic acid sequence which is different from any other nucleic acid sequence in a contiguous region of the genome or a chromosome of a mammalian cell or in a genomic region of interest.

A CRISPR RNA (crRNA) array comprises at least two spacers. In one embodiment, the crRNA array comprises two to ten spacers. In one embodiment, the crRNA array comprises 2, 3, 4, 5, 6, 7, 8, 9, 10, 11, 12, 13, 14, 15, 16, 17, 18, 19, 20, 21, 22, 23, 24, 25, 26, 27, 28, 29 or 30 spacers. In one embodiment, the crRNA array further comprises a direct repeat sequence (i.e., repeats, or direct repeats) which separates each spacer in the crRNA array. The direct repeat sequence is a nucleic acid sequence which encodes a nucleic acid sequence preceding the RNA guide, wherein the encoded nucleic acid sequence is capable of complexing with Cpf1 protein and directing Cpf1 protein to complex with the RNA guide. In one embodiment, the direct repeat comprises one or more stem loops or secondary structures. In one embodiment, the direct repeat has a length of at least about 16 nucleotides (nt). In another embodiment, the direct repeat has a single stem loop. In one embodiment, the direct repeat is a nucleic acid sequence of 5'-GTTTCAAAGAT-TAAATAATTTCTACTAAGTGTAGAT-3', SEQ ID NO: 6. In another embodiment, the direct repeat is an engineered optimized repeat comprising a nucleic acid sequence of 5'-TAATTTCTACTAAGTGTAGAT-3', SEQ ID NO: 7. In another embodiment, the direct repeat is an engineered optimized repeat consisting of a nucleic acid sequence of 5'-TAATTTCTACTAAGTGTAGAT-3', SEQ ID NO: 7. An engineered optimized repeat (also referred to as a processed repeat) refers to non-naturally-occurring or deliberately designed nucleic acid sequence which encodes a nucleic acid sequence preceding the RNA guide, wherein the encoded nucleic acid sequence is capable of complexing with Cpf1 protein and directing Cpf1 protein to complex with the RNA guide. In one embodiment, the optimized direct repeat is a naturally occurring direct repeat that has been manipulated, e.g., truncated. In one embodiment, optimized direct repeats such as SEQ ID NO: 7 that are shorter than the naturally occurring direct repeat (SEQ ID NO: 6) demonstrate a similar function and efficiency. One of skill in the art would appreciate that multiple repeats in a crRNA array comprising more than 2 spacers share a same sequence or comprise different sequences as disclosed herein and as known publicly.

In one embodiment, the Cpf1 cleavage sites for any two crRNA spacers or guides are spaced apart in contiguous sequence of the genome or chromosome by about 100 bp (base pairs) to about 1 mb (mega base pairs), for example about 100 bp, about 200 bp, about 300 bp, about 400 bp, about 500 bp, about 600 bp, about 700 bp, about 800 bp, about 900 bp, about 1 kb (kilo base pairs), about 2 kb, about 3 kb, about 4 kb, about 5 kb, about 6 kb, about 7 kb, about 8 kb, about 9 kb, about 10 kb, about 15 kb, about 20 kb, about 30 kb, about 40 kb, about 50 kb, about 60 kb, about 70 kb, about 80 kb, about 90 kb, about 100 kb, about 150 kb, about 200 kb, about 250 kb, about 300 kb, about 350 kb, about 400 kb, about 450 kb, about 500 kb, about 550 kb, about 600 kb, about 650 kb, about 700 kb, about 750 kb, about 800 kb, about 850 kb, about 900 kb, about 950 kb, or about 1 mb. In a further embodiment, the Cpf1 cleavage sites for any two crRNA spacers or guides are spaced apart in contiguous sequence of the genome or chromosome by about 100 bp to about 10 kb.

In one embodiment, two target sequences or protospacers are spaced apart in contiguous sequence of the genome or chromosome by about 100 bp to about 1 mb, for example about 100 bp, about 200 bp, about 300 bp, about 400 bp, about 500 bp, about 600 bp, about 700 bp, about 800 bp, about 900 bp, about 1 kb, about 1.5 kb, about 2 kb, about 2.5 kb, about 3 kb, about 3.5 kb, about 4 kb, about 4.5 kb, about 5 kb, about 5.5 kb, about 6 kb, about 6.5 kb, about 7 kb, about 7.5 kb, about 8 kb, about 8.5 kb, about 9 kb, about 9.5 kb, about 10 kb, about 15 kb, about 20 kb, about 30 kb, about 40 kb, about 50 kb, about 60 kb, about 70 kb, about 80 kb, about 90 kb, about 100 kb, about 150 kb, about 200 kb, about 250 kb, about 300 kb, about 350 kb, about 400 kb, about 450 kb, about 500 kb, about 550 kb, about 600 kb, about 650 kb, about 700 kb, about 750 kb, about 800 kb, about 850 kb, about 900 kb, about 950 kb, or about 1 mb. In a further embodiment, two target sequences or protospacers are spaced apart in contiguous sequence of the genome or chromosome by about 100 bp to about 10 kb.

In one embodiment, the crRNA array is in operative association with an RNA pol III promoter. A RNA pol III promoter is a promoter that is sufficient to direct accurate initiation of transcription by the RNA polymerase III machinery, wherein the RNA polymerase III (RNAP III and Pol III) is a RNA polymerase transcribing DNA to synthesize ribosomal 5S ribosomal RNA (rRNA), transfer RNA (tRNA), crRNA, and other small RNAs. A variety of Polymerase III promoters which can be used are publicly or commercially available, for example the U6 promoter, the promoter fragments derived from HI RNA genes or U6 snRNA genes of human or mouse origin or from any other species. In addition, pol III promoters can be modified/engineered to incorporate other desirable properties such as the ability to be induced by small chemical molecules, either ubiquitously or in a tissue-specific manner. For example, in one embodiment the promoter may be activated by tetracycline. In another embodiment, the promoter may be activated by IPTG (lacI system). See, U.S. Pat. Nos. 5,902,880A and 7,195,916B2. In another embodiment, a Pol III promoter from various species might be utilized, such as human, mouse or rat.

In a preferred embodiment, the GC ratio over the nucleic acids of the spacer is about 30% to about 70%. In one embodiment, the GC ratio over all nucleic acids of the spacer is about 30%, about 35%, about 40%, about 45%, about 50%, about 55%, about 60%, about 65%, or about 70%. The GC ratio of an RNA guide or a target sequence is about 30% to about 70%, for example about 30%, about 35%, about 40%, about 45%, about 50%, about 55%, about 60%, about 65%, or about 70%.

C. Vectors

A "vector" as used herein is a biological or chemical moiety comprising a nucleic acid sequence which can be introduced into an appropriate host cell for replication or expression of the nucleic acid sequence. Common vectors include naked DNA, phage, transposon, plasmids, viral vectors, cosmids (Phillip McClean, ndsu.edu/pubweb/~mcclean/plsc731/cloning/cloning4.htm) and artificial chromosomes (Gong, Shiaoching, et al. "A gene expression atlas of the central nervous system based on bacterial artificial chromosomes." Nature 425.6961 (2003): 917-925). One type of vector is a "plasmid", which refers to a circular double stranded DNA loop into which additional nucleic acid segments can be ligated. Another type of vector is a viral vector, wherein additional nucleic acid segments can be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) are integrated into the genome of a host cell upon introduction into the host cell, and thereby are replicated along with the host genome. Moreover, certain vectors are capable of directing the expression of genes to which they are operatively linked.

A "viral vector" refers to a synthetic or artificial viral particle in which an expression cassette containing a nucleic acid sequence of interest is packaged in a viral capsid or envelope. Examples of viral vector include but are not limited to adenoviruses (Ads), retroviruses (γ-retroviruses and lentiviruses), poxviruses, adeno-associated viruses (AAV), baculoviruses, herpes simplex viruses. In one embodiment, the viral vector is replication defective. A "replication-defective virus" refers to a viral vector, wherein any viral genomic sequences also packaged within the viral capsid or envelope are replication-deficient; i.e., they cannot generate progeny virions but retain the ability to infect target cells.

D. Other Components Definitions.

A "nucleic acid" or "nucleic acid sequence", as described herein, can be RNA, DNA, or a modification thereof, and can be single or double stranded, and can be selected, for example, from a group including: nucleic acid encoding a protein of interest, oligonucleotides, nucleic acid analogues, for example peptide-nucleic acid (PNA), pseudocomplementary PNA (pc-PNA), locked nucleic acid (LNA) etc. Such nucleic acid sequences include, for example, but are not limited to, nucleic acid sequence encoding proteins, for example that act as transcriptional repressors, antisense molecules, ribozymes, small inhibitory nucleic acid sequences, for example but are not limited to RNA interference (RNAi), short hairpin RNAi (shRNAi), small interfering RNA (siRNA), micro RNAi (mRNAi), antisense oligonucleotides etc.

As used herein, "operably linked" sequences or sequences "in operative association" include both expression control sequences that are contiguous with the nucleic acid sequence of interest and expression control sequences that act in trans or at a distance to control the nucleic acid sequence of interest.

The term "regulatory element" or "regulatory sequence" refers to expression control sequences which are contiguous with the nucleic acid sequence of interest and expression control sequences that act in trans or at a distance to control the nucleic acid sequence of interest. As described herein, regulatory elements comprise but not limited to: promoter; enhancer; transcription factor; transcription terminator; efficient RNA processing signals such as splicing and polyadenylation signals (polyA); sequences that stabilize cytoplasmic mRNA, for example Woodchuck Hepatitis Virus (WHP) Posttranscriptional Regulatory Element (WPRE); sequences that enhance translation efficiency (i.e., Kozak consensus sequence); sequences that enhance protein stability; and when desired, sequences that enhance secretion of the encoded product. Also, see Goeddel; Gene Expression Technology: Methods in Enzymology 185, Academic Press, San Diego, CA (1990). Regulatory sequences include those which direct constitutive expression of a nucleic acid sequence in many types of target cell and those which direct expression of the nucleic acid sequence only in certain target cells (e.g., tissue-specific regulatory sequences). Furthermore, the Cpf1 can be delivered by way of a vector comprising a regulatory sequence to direct synthesis of the Cpf1 at specific intervals, or over a specific time period. It will be appreciated by those skilled in the art that the design of the vector can depend on such factors as the choice of the target cell, the level of expression desired, and the like.

The terms "target cell" and "host cell", which are used herein interchangeably, may refer to any target cell to which introduction of the nucleic acid sequence or vector of interest is desired. Thus, a "target cell," refers to a cell that contains the nucleic acid sequence of interest that has been introduced into the cell by any means, e.g., electroporation, calcium phosphate precipitation, microinjection, transformation, viral infection, transfection, liposome delivery, membrane fusion techniques, high velocity DNA-coated pellets, viral infection and protoplast fusion. In certain embodiments herein, the term "target cell" refers to cultures of cells of various mammalian species. In one embodiment, the target cell is a mammalian cell. In a further embodiment, the target cell might be a eukaryotic cell, a prokaryotic cell, an embryonic stem cell, a cancer cell, a neuronal cell, an epithelial cell, an immune cell, an endocrine cell, a muscle cell, an erythrocyte, or a lymphocyte.

The term "mammal" or grammatical variations thereof, are intended to encompass a singular "mammal" and plural "mammals," and includes, but is not limited to humans; primates such as apes, monkeys, orangutans, and chimpanzees; canids such as dogs and wolves; felids such as cats, lions, and tigers; equids such as horses, donkeys, and zebras; food animals such as cows, pigs, and sheep; ungulates such as deer and giraffes; rodents such as mice, rats, hamsters and guinea pigs; and bears. In some preferred embodiments, a mammal is a human.

As used herein, the term "mammalian subject" or "subject" includes any mammal in need of these methods, including particularly humans. Other mammals include dogs, cats, or other domesticated animals, horses, livestock, laboratory animals, including non-human primates, etc. The subject may be male or female.

As used herein, the terms "therapy", "treatment" and any grammatical variations thereof shall mean any of prevention, delay of outbreak, reducing the severity of the disease symptoms, and/or removing the disease symptoms (to cure) in a subject in need.

By the terms "increase" "decrease" "inhibit" "change" or a grammatical variation thereof, refer to a variability of at least about 10% from the reference given, unless otherwise specified. By the terms "low" "high" or a grammatical variation thereof, refer to a variability of at least about 10%, or at least about 20%, or at least about 30%, or at least about 40%, or at least about 50%, or at least about 75%, or at least about 80%, or at least about 90%, from the reference given, unless otherwise specified.

The terms "a" or "an" refers to one or more. For example, "a vector" is understood to represent one or more such vectors. As such, the terms "a" (or "an"), "one or more," and "at least one" are used interchangeably herein.

As used herein, the term "about" or "~" means a variability of plus or minus 10% from the reference given, unless otherwise specified.

The words "comprise", "comprises", and "comprising" are to be interpreted inclusively rather than exclusively, i.e., to include other unspecified components or process steps.

The words "consist", "consisting", and its variants, are to be interpreted exclusively, rather than inclusively, i.e., to exclude components or steps not specifically recited.

As used herein, the phrase "consisting essentially of" limits the scope of a described composition or method to the specified materials or steps and those that do not materially affect the basic and novel characteristics of the described or claimed method or composition. Wherever in this specification, a method or composition is described as "comprising" certain steps or features, it is also meant to encompass the same method or composition consisting essentially of those steps or features and consisting of those steps or features.

With regard to the descriptions below, it is intended that each of the compositions herein described, is useful, in another embodiment, in the methods of the invention. In addition, it is also intended that each of the compositions herein described as useful in the methods, is, in another embodiment, itself an embodiment of the invention.

II. Compositions

In one aspect, a vector is provided comprising (i) a nucleic acid sequence encoding a Cpf1 or Cas12a protein and an optional selectable marker in operative association with an RNA pol II promoter which controls expression thereof, in a mammalian cell; and (ii) a CRISPR RNA (crRNA) array comprising at least two spacers, wherein each spacer encodes a RNA guide, wherein each guide hybridizes to a unique sequence located 3' from a T-rich protospacer-adjacent motif (PAM) in a contiguous region of the genome or a chromosome of a mammalian cell. The array is in operative association with an RNA pol III promoter. In one embodiment, the vector is a non-viral vector. In a further embodiment, the vector is a plasmid. In one embodiment, the vector is a viral vector. In a further embodiment, the vector is a retroviral vector. In yet a further embodiment, the vector is a lentiviral vector. In another embodiment, provided is a library of the vectors described herein.

In another aspect, a cell culture is provided comprising at least one deletion, wherein the deletion generated by the Cpf1 or Cas12a protein in the cell culture or a progenitor cell, comprises the chromosome or genome between cleavage sites located downstream of each the PAM of each crRNA spacer. In one embodiment, a library of mammalian cell cultures is provided, wherein each cell of the cell culture comprises at least one deletion in a contiguous DNA of a chromosome or the genome. The library is generated by the methods described herein. In one embodiment, the cell is a eukaryotic cell, a prokaryotic cell, a mammalian cell, an embryonic stem cell, or a cancer cell.

In another embodiment, provided is a library of nucleic acid sequences, comprising at least two CRISPR RNA (crRNAs) spacers, wherein each spacer encodes a RNA guide (i.e., guide, guide RNA). Each RNA guide hybridizes to a unique target sequence located 3' from a T-rich protospacer-adjacent motif (PAM) in a contiguous region of the genome or a chromosome of a mammalian cell. The RNA guides are capable of complexing with Cpf1 protein and providing targeting specificity and binding ability for nuclease activity of Cpf1. Each of the spacers is adjacent to a Direct Repeat at the 5' end thereof. In one embodiment, the direct repeats (i.e., repeats) are the optimized Direct Repeats (which are also noted as "processed repeats") comprise a nucleic acid sequence of 5'-TAATTTCTACTAAGTGTA-GAT-3', SEQ ID NO: 7. In one embodiment, the GC ratio over the nucleic acids of the spacer is about 30% to about 70%. In some embodiments, the crRNA guide targets every Cpf1-specific protospacer in a contiguous region of genome or a chromosome of a cell. In one embodiment, the crRNA guide targets at least about 100, about 1000, about 10,000, about 100,000, about 1,000,000 or more sequences in a genome or chromosome of the cell or in a genomic region of interest.

In yet another embodiment, provided herein is a library of vectors, wherein each vector comprises two or more spacers as described herein. In one embodiment, the vector is a non-viral vector. In other embodiments, the vector is a viral vector. In a further embodiment, the vector is a retroviral vector. In yet another embodiment, the vector is a lentiviral vector.

In another embodiment, a library comprises vectors, wherein each vector comprises: (a) a nucleic acid sequence encoding a Cpf1 protein and an optional selectable marker in operative association with regulatory sequences which controls expression thereof; and (b) two or more spacers from any of the nucleic acid sequence libraries as described herein. In one embodiment, each of the spacers is adjacent to a Direct Repeat at the 5' end thereof. In another embodiment, a direct repeat sequence separates each spacer. In one embodiment, the vector is a non-viral vector. In other embodiments, the vector is a viral vector. In a further embodiment, the vector is a retroviral vector. In yet another embodiment, the vector is a lentiviral vector. Furthermore, the library comprises at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 97%, at least about 99% of the vectors as described herein.

In another embodiment, a higher concentration of infectious particles per unit volume is present in the viral vector library provided herein compared to a conventional CRISPR viral vector library. Therefore, a lower viral volume is required at transduction using the viral vector library provided herein compared to the conventional CRISPR viral vector library. This provides a manufacturing and/or production advantage since less volume of virus needs to be produced to infect the same number of cells compared to the conventional CRISPR viral vector library.

A higher percentage of the described vector in the library leads to a higher functional viral titer compared to a CRISPR-CAS9 system. This advantage of higher titer is beneficial from multiple perspectives, including the need for a lower number of cells prepared for transduction of the vectors to achieve a desired number of cells containing deletions by the Cpf1 protein. Furthermore, as disclosed herein, only one vector is incorporated into a cell to generate a deletion by a Cpf1 protein. In one embodiment, this use of a single vector also contributes to a desired functional viral titer.

III. Methods

Methods are thus described herein for generation of the compositions described above or for use of same to generate genomic deletions via Cpf1 and paired-guide RNA, particularly in a high-throughput manner.

In one aspect, a method comprises transducing in vitro a mammalian cell with one or more vectors, each vector comprising (i) a nucleic acid sequence encoding a Cpf1 protein and an optional selectable marker in operative association with an RNA pol II promoter which controls expression thereof, in a mammalian cell; and (ii) a CRISPR RNA (crRNA) array comprising at least two spacers, wherein each spacer encodes an RNA guide. Each guide hybridizes to a unique sequence located 3' from a T-rich protospacer-adjacent motif (PAM) in a contiguous region of the genome or a chromosome of a mammalian cell. The CRISPR RNA array is in operative association with an RNA pol III promoter. The method further includes culturing the transduced cells. In the cultured cells, the Cpf1 creates a deletion comprising the chromosome or genome between cleavage sites located downstream of each PAM, thereby providing a plurality of transduced cell cultures. Each cell culture comprises at least one such deletion.

As disclosed in the examples, a variability in the junctions of deletion was observed, which might be introduced by a cellular DNA repair machinery. In one embodiment, the Cpf1 creates a deletion of the chromosome or genome between cleavage sites. In another embodiment, the Cpf1 creates (i) a deletion of the chromosome or genome between cleavage sites; and (ii) a deletion of a region adjacent to one of the cleavage site, wherein the adjacent region might consist of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, about 45, or about 50 nucleotide(s) adjacent to the cleavage sites, and wherein the adjacent region is not in the chromosome or genome between cleavage sites. In yet another embodiment, the Cpf1 creates (i) a deletion of the chromosome or genome between cleavage sites; and (ii) a deletion of two adjacent regions thereof, wherein each region is adjacent to one of the cleavage site, wherein the adjacent region might consist of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, about 45, or about 50 nucleotide(s) adjacent to the cleavage sites, and wherein the adjacent region is not in the chromosome or genome between cleavage sites. In one embodiment, the vector is a viral vector. In a further embodiment, the vector is a retroviral vector. In yet a further embodiment, the vector is a lentiviral vector.

In one embodiment, the Cpf1 protein is selected from AsCpf1, LbCpf1, Lb2Cpf1, Lb3Cpf1, BpCpf1, PeCpf1, FnCpf1, LiCpf1, PmCpf1, PcCpf1, PdCpf1, MbCpf1, SsCpf1, CMtCpf1, and EeCpf1. In one embodiment, the Cpf1 protein is LbCpf1.

In one embodiment, the PAM is TTTV or TTTN, where in V stands for A, C or G and N stands for any nucleotide.

In one embodiment, the crRNA array comprises between two to ten spacers. In one embodiment, a direct repeat sequence separates each spacer in the crRNA array. In a further embodiment, at least one direct repeat is a direct repeat with a sequence of SEQ ID NO: 6. Additionally or alternatively, at least one direct repeat is an engineered optimized repeat. In some embodiments, the optimized repeat comprises a nucleic acid sequence, TAATTTCTACTAAGTGTAGAT, SEQ ID NO: 7. In a further embodiment, the optimized repeat consists of a nucleic acid sequence,

SEQ ID NO: 7
TAATTTCTACTAAGTGTAGAT.

In one embodiment, the Cpf1 cleavage sites for any two crRNA spacers are spaced apart in contiguous sequence of the genome or chromosome by about 100 bp to about 10 kb. In one embodiment, the distance between the spacers is at least 200, 300, 400, 500, 600, 700, 800, 900, 1000, 2000, 3000, 4000, 5000, 6000, 7000, 8000, 9000 or up to 10,000 or more bases. In one embodiment, the deletion occurs in a non-coding sequence of said genome or chromosome. In another embodiment, the deletion occurs in a coding sequence of said genome or chromosome.

In one embodiment, the method described herein further comprising prior to the transducing step: generating a library of CRISPR RNA (crRNA) spacers, wherein each spacer encodes a RNA guide which hybridizes to a unique sequence located 3' from a T-rich protospacer-adjacent motif (PAM) in a contiguous region of the genome or a chromosome of a mammalian, and wherein each crRNA hybridizes to a protospacer that is unique as compared to that of any other crRNA in the library.

Additionally or alternatively, the method further comprises prior to the transducing step: generating a library of virus vectors, each vector comprising (i) a nucleic acid sequence encoding a Cpf1 protein and a selectable marker in operative association with an RNA pol II promoter which controls expression thereof, in a mammalian cell; and (ii) a CRISPR RNA (crRNA) array comprising at least two spacers, wherein each spacer encodes an RNA guide, wherein each guide hybridizes to a unique sequence located 3' from a T-rich protospacer-adjacent motif (PAM) in a contiguous region of the genome or a chromosome of a mammalian cell, said array in operative association with an RNA pol III promoter.

Additionally, or alternatively, the method further comprises harvesting genomic DNA from each cell culture to identify or quantify the deletion. In one embodiment, the method as described herein, further comprises identifying or quantifying spacers and/or RNA guides. The conventional methods of such identification or quantification is well known to one of skill in the art, for example, Polymerase chain reaction (PCR), real-time PCR, quantitative PCR, genome sequencing, or RNA-Seq (RNA sequencing).

In one embodiment, the culturing step occurs for between more than two or less than 30 days.

Additionally, or alternatively, the method further comprises identifying or quantifying the effects of the deletion on the cell. In one embodiment, the effect is a phenotypic change of the transfected cell cultures. In another embodiment, the effect is a response of the transfected cell cultures to a treatment. In a further embodiment, the treatment comprises contact of said cultured cells to a chemical or biological agent or compound, or exposure to a physical treatment. In yet a further embodiment, said treatment comprises contact of said cells with a chemical compound and said effect or change is demonstrated a change in response to said compound in said transduced cultured cells compared to the response exhibited by the said cell culture without said deletion. Compositions, reagents, protocols, methods, tools, arrays suitable for such chemical or biological agent or compound, or the physical treatment, or such identifications or quantifications can be readily chosen by one skilled artisan.

Additionally, or alternatively, the method can be utilized as a therapy for a disease, to delete disease-associated gene or polynucleotide. In one embodiment, the term "disease" refers, without limitation, to any abnormal state relating to gene copy number gains, or one or more copies of a genomic region of interest, e.g. tumor comprising a copy of oncogenes, Down syndrome, amyotrophic lateral sclerosis (ALS), frontotemporal dementia (FTD), and etc. In one embodiment, the method is utilized to generate genomic deletion(s) to remove pathogenic repeats or genomic region of interest, such as the C9orf72 repeat found in amyotrophic lateral sclerosis (ALS) and frontotemporal dementia (FTD); or the third copy of chromosome 21 found in Down syndrome.

Embodiments of the Invention

Invention disclosed herein may include but not limited to the following embodiments, which are numbered for ease of reference.

Embodiment 1 is an in vitro method that comprises: transducing a mammalian cell with one or more virus vectors, each vector comprising (i) a nucleic acid sequence encoding a Cas12a protein and an optional selectable marker in operative association with an RNA pol II promoter which controls expression thereof, in a mammalian cell; and (ii) a CRISPR RNA (crRNA) array comprising at least two spacers, wherein each spacer encodes an RNA guide, wherein each guide hybridizes to a unique sequence located 3' from a T-rich protospacer-adjacent motif (PAM) in a contiguous region of the genome or a chromosome of a mammalian cell, said array in operative association with an RNA pol III promoter; and culturing said transduced cells, wherein in the cultured cells, the Cas12a creates a deletion comprising the chromosome or genome between cleavage sites located downstream of each the PAM, thereby providing a plurality of transduced cell cultures, each cell culture comprising said deletion.

Embodiment 2 is the method according to embodiment 1, wherein the viral vector is a retroviral vector. Embodiment 3 is the method according to embodiment 1 or 2, wherein the viral vector is a lentiviral vector or an adeno-associated virus (AAV).

Embodiment 4 is the method according to any of embodiments 1 to 3, wherein said crRNA array comprises between two to ten said spacers.

Embodiment 5 is the method according to any of embodiments 1 to 4, wherein a direct repeat sequence separates each spacer in the crRNA array.

Embodiment 6 is the method according to embodiment 5, wherein at least one direct repeat is an engineered optimized repeat.

Embodiment 7 is the method according to embodiment 6, wherein the optimized repeat comprises a nucleic acid sequence, TAATTTCTACTAAGTGTAGAT, SEQ ID NO: 7.

Embodiment 8 is the method according to embodiment 6 or 7, wherein the optimized repeat consists of a nucleic acid sequence, TAATTTCTACTAAGTGTAGAT, SEQ ID NO: 7.

Embodiment 9 is the method according to any of embodiments 1 to 8, further comprising prior to the transducing step generating a library of CRISPR RNA (crRNA) spacers, wherein each spacer encodes an RNA guide which hybridizes to a unique sequence located 3' from a T-rich protospacer-adjacent motif (PAM) in a contiguous region of the genome or a chromosome of a mammalian, and wherein each crRNA guide hybridizes to a protospacer that is unique as compared to that of any other crRNA in the library.

Embodiment 10 is the method according to any of embodiments 1 to 9, further comprising prior to the transducing step: generating a library of virus vectors, each vector comprising (i) a nucleic acid sequence encoding a Cpf1 protein and a selectable marker in operative association with an RNA pol II promoter which controls expression thereof, in a mammalian cell; and (ii) a CRISPR RNA (crRNA) array comprising at least two spacers, wherein each spacer encodes an RNA guide, wherein each guide hybridizes to a unique sequence located 3' from a T-rich protospacer-adjacent motif (PAM) in a contiguous region of the genome or a chromosome of a mammalian cell, said array in operative association with an RNA pol III promoter.

Embodiment 11 is the method according to any of embodiments 1 to 10, further comprising harvesting genomic DNA from each cell culture to identify or quantify the deletion.

Embodiment 12 is the method according to any of embodiments 1 to 11, wherein the Cpf1 cleavage sites for any two crRNA spacers are spaced apart in contiguous sequence of the genome or chromosome by about 100 bp to about 1 mb.

Embodiment 13 is the method according to any of embodiments 1 to 12, wherein the deletion occurs in a non-coding sequence of said genome or chromosome.

Embodiment 14 is the method according to any of embodiments 1 to 12, wherein the deletion occurs in a coding sequence of said genome or chromosome.

Embodiment 15 is the method according to any of embodiments 1 to 14, wherein the culturing step occurs for between more than two and less than 30 days.

Embodiment 16 is the method according to any of embodiments 1 to 15, further comprising identifying or quantifying the effects of said deletion on the cell.

Embodiment 17 is the method according to any of embodiments 1 to 16, further comprising identifying or quantifying a phenotypic change of the transfected cell cultures.

Embodiment 18 is the method according to any of embodiments 1 to 17, further comprising identifying or quantifying response of the transfected cell cultures to a treatment.

Embodiment 19 is the method according to embodiment 18, wherein the treatment comprises contact of the cultured cells to a chemical or biological agent or compound, or exposure to a physical treatment.

Embodiment 20 is the method according to embodiment 19, wherein said treatment comprises contact of the cells with a chemical compound and the effect or change is demonstrated a change in response to the compound in the transduced cultured cells compared to the response exhibited by the cell culture without the deletion.

Embodiment 21 is a library of mammalian cell cultures, wherein each cell of the cell culture comprises at least one deletion in a contiguous DNA of a chromosome or the genome, and wherein the library is generated by the method of any one of embodiments 1 to 20.

Embodiment 22 is the library according to embodiment 21, wherein the cell is a eukaryotic cell, a prokaryotic cell, a mammalian cell, an embryonic stem cell, or a cancer cell.

Embodiment 23 is a library of nucleic acid sequences, comprising at least two CRISPR RNA spacers (crRNAs), wherein each spacer encodes an RNA guide which hybridizes to a unique protospacer sequence located 3' from a T-rich protospacer-adjacent motif (PAM) in a contiguous region of the genome or a chromosome of a mammalian cell, wherein the crRNA guides are capable of complexing with Cpf1 protein and providing targeting specificity and binding ability for nuclease activity of Cpf1, and wherein each of the spacers is adjacent to an optimized Direct Repeat at the 5' end thereof.

Embodiment 24 is the library according to embodiment 23, wherein the optimized Direct Repeats comprise a nucleic acid sequence of TAATTTCTACTAAGTGTAGAT, SEQ ID NO: 7.

Embodiment 25 is the library according to embodiments 23 or 24, wherein the crRNA guide targets every Cpf1-specific protospacer in a contiguous region of genome or chromosome of a cell.

Embodiment 26 is the library according to any of embodiments 23 to 25, wherein the crRNA guide targets at least about 100, about 1000, about 10,000, about 100, 000, about 1,000,000 or more sequences in a genome or chromosome of the cell.

Embodiment 27 is a library of vectors, wherein each vector comprises two or more spacers from the library according to any of embodiments 23 to 26.

Embodiment 28 is a library comprising Cpf1-guide vectors, wherein each of the Cpf1-guide vectors comprises: (a) a nucleic acid sequence encoding a Cpf1 protein and an optional selectable marker in operative association with regulatory sequences which controls expression thereof; and (b) two or more spacers from the library according to any of embodiments 23 to 26, wherein each of the spacers is adjacent to a direct Repeat at the 5' end thereof.

Embodiment 29 is the library according to embodiment 28, wherein the library comprising at least 75% of the Cpf1-guide vectors.

EXAMPLE

The following examples disclose the programmable genomic deletions by CRISPR-Cpf1 with paired crRNAs. As described in the Examples below, paired deletions of defined genomic regions were shown in human cells using Cpf1 via both transient transfection and lentiviral transduction. Pairs of guides and an optimized repeat were cloned into lentiviral Cpf1 vectors. Produced lentivirus was then transduced into HEK293 human cells. After 10 days, a flanking PCR was utilized to read out specific bands corresponding to the wild-type genome and the genome after deletion of the targeted intervening region (See Example 2). The results show that Cpf1 deletions achieve comparable efficiency to Cas9 deletions but with >3-fold higher viral titer and greater variability in their junctions. In addition, Cpf1 deletions are most efficiently induced when guide sequences have balanced GC content.

These examples are provided for the purpose of illustration only. The protocols and methods described in the examples are not considered to be limitations on the scope of the claimed invention. Rather this specification should be construed to encompass any and all variations that become evident as a result of the teaching provided herein. One of skill in the art will understand that changes or variations can be made in the disclosed embodiments of the examples, and expected similar results can be obtained. For example, the substitutions of reagents that are chemically or physiologically related for the reagents described herein are anticipated to produce the same or similar results. All such similar substitutes and modifications are apparent to those skilled in the art and fall within the scope of the invention.

The creation of precise genomic deletions using CRISPR programmable nucleases has many applications in gene therapy, human disease modeling and high-throughput forward genetic screens. The possibility of using the newly characterized Cpf1 nuclease for introducing deletions into human cells was investigated. In contrast to Cas9, Cpf1 has several advantages, such as ease of cloning, easy multiplexing of guide RNAs, a smaller nuclease size, and ability to target AT-rich regions like introns. In these examples, we measured the efficiency of our Cpf1-based deletion system head-to-head with Cas9-induced deletions. We found that Cpf1 created deletions over a large range of sizes (500 bp-5 kb) at comparable efficiency to Cas9. In addition, we demonstrate an optimized (shortened) scaffold that still can be processed by Cpf1, find that the guide GC content impacts deletion efficiency, and show that the deletion junctions between chromosomal ends differs between Cas9-induced deletions and those made using Cpf1. Thus, this novel CRISPR-Cpf1 deletion system further expands the genome editing toolbox and is of broad interest to users with different gene editing applications, including high-throughput deletion screens and in vivo disease models.

Example 1: Methods

A. sgRNA Design.

To design Cas9 sgRNA pairs, the Benchling CRISPR tool (benchling.com) was used to search for all possible guides around the Empty Spiracles Homeobox 1 (EMX1) locus. We used the following input parameters: (1) guide length was set to 20 nucleotides, and (2) the PAM sequence was defined as 5'-NGG-3'. Three pairs of guide sequences were selected based on the optimized on-target and off-target scores. On-target scores predict efficiency at the intended target (Doench, 2016) and all guides chosen scored higher than 0.5. Off-target scores indicate specificity (Hsu, 2013) and all guides chosen scored higher than 0.6 in the specificity score and had no perfect matches elsewhere in the genome.

To design Cpf1 guide pairs, all guides around EMX1 were identified by searching for the LbCpf1 PAM sequence (5'-TTTV-3', V is A/C/G) and selecting the 23 nucleotides downstream of the PAM sequence (Kim H. K., 2017). Due to the lack of specificity and efficiency scoring tools for LbCpf1 guides, the guides were screened using the following criteria: (1) we avoided guide sequences containing homo-oligomers consisting of more than four of the same nucleotide; (2) we ensured that guide sequences had a balanced GC content (30%-70%); (3) we avoided guide sequences with perfect matches elsewhere in the genome. The UCSC Blat tool (genome.ucsc.edu/cgi-bin/hgBlat?command=start) was used to align guide sequences to the human genome in order to map the deletion locations and verify the targeting specificity.

B. Vector Cloning.

To construct a lentiviral all-in-one vector for Cas9 to deliver paired guides, we performed a two-step cloning process: (1) we added the two guide sequences to flank a mU6 promoter through PCR amplification; (2) we ligated the BsmBI digested PCR product to the BsmBI digested lentiviral transfer vector. The lentiCRISPRv2 backbone used here contains a sgRNA expressing cassette (hU6 promoter and sgRNA) and SpCas9 sequence (Addgene plasmid 52961) (Sanjana, 2014). In step (1), the forward primer consists of the BsmBI recognition site, the full sequence of sgRNA-1 (includes guide sequence and sgRNA scaffold) and first 20 nt of complementary sequence of the mU6 promoter for efficient annealing. The reverse primer contains the BsmBI recognition site and only the guide sequence of another sgRNA-2, since the scaffold for sgRNA-2 is already present in lentiCRISPRv2. After PCR amplification and purification, the insert DNA was digested with FastDigest BsmBI (Thermo Fisher Scientific), enabling a scarless ligation of insert DNA and vector backbone. Additional steps in backbone preparation and ligation was performed as described previously (Sanjana, 2014).

To construct a Cpf1 all-in-one vector, we first exchanged SpCas9 for LbCpf1 in the lentiviral backbone. LentiCRISPRv2 plasmid was digested with FastDigest AfeI and BamHI, and the 8.4 kb band was gel purified then Gibson ligated with LbCpf1 amplified from pY016 plasmid (Addgene plasmid 69988). The guide expressing cassette was cut out, and then a PCR amplified cassette with a flipped Gibson overhang was ligated back to the backbone. The flipped U6 cassette ensures successful packaging of viral particle since Cpf1's ribonuclease activity is both structure and sequence dependent and it cannot recognize and cut the flipped sgRNA sequence. To clone in specific guide pairs, we synthesized top and bottom strand oligos containing guide-1, the intervening direct repeat (including both optimized and non-optimized repeat), and guide-2 with appropriate overhangs for the BsmBI digested vector overhangs. For Cpf1, no additional promoter is needed for expression of guide-2.

C. Cell Culture and Transient Transfection.

HEK293FT cells (Invitrogen) were cultured in D10 media, which is DMEM (Thermo Fisher Scientific) supplemented with 10% fetal bovine serum (Thermo Fisher Scientific), and maintained at 37° C. in 95% air, 5% $CO_2$. Cells were passaged every two to three days in 1:3 to 1:6 ratios. HAP1 cells were cultured in IMEM (Thermo Fisher Scientific) plus 10% FBS and passaged every two to three days in 1:10 to 1:20 ratios. A 6-well of 80% confluent HAP1 was transfected with 4 μg all-in-one vector and 3.3 μg of polyethylenimine (PEI) (Polysciences). After 24 hours, transfected cells were passaged into D10 with 2 μg/ml puromycin (Life Technology) for 2 to 3 days of selection. A non-transfected control was passaged in parallel into D10-puro to verify that selection was complete. Genomic DNA (gDNA) was harvested at day 3-4 post transfection for later PCR genotyping and quantifications.

D. Lentivirus Production and Functional Titer Comparison.

To produce lentivirus, early passaged HEK293FT cells were cultured in 6-well until 80% confluence, and co-transfected in OptiMEM (Life Technologies) with 1 μg all-in-one vector, 0.55 μg pMD2.G, 0.8 μg psPAX2 (Addgene plasmids 12259 and 12260) and 5.5 μl of transfection reagent (either Lipofectamine 2000, Thermo Fisher Scientific, or 1 mg/ml PEI solution). For Lipofectamine 2000, media was changed at 6 hours post transfection into D10 supplemented with 1% bovine serum albumin (Sigma). For PEI, media was added up to 3 ml per well at 24 hours post transfection. After 60 hours' incubation, virus supernatants were harvested, centrifuged at 300×g at 4° C. and filtered through a 0.45 μm low protein binding membrane (Millipore) to remove cells and cell debris. For functional titer comparison, Cas9 virus and Cpf1 virus were compared based on puromycin resistance after transduction. 200 μl of either Cas9 or Cpf1 viral supernatant was applied to 50,000 HAP1 cell suspension in triplicate in 24-well plate. In parallel, triplicate controls with the same seeding density but no addition of virus were included as a drug selection control. After 24 hours, each well was passaged in an equal ratio into D10 and D10 plus 1 μg/μl puromycin in 12-well plate. After two days of selection, all uninfected cells in puromycin media were dead and the other wells remained sub-confluent. All wells were treated the same: (1) media was aspirated and the cells were washed once with PBS (Thermo Fisher Scientific); (2) TrypLE Express (Thermo Fisher Scientific) was added to dissociate the cells, incubated at 37° C. for 3 minutes, neutralized and re-suspended in PBS; (3) Each well were counted three times as technical replicates. Puromycin survival rate was calculated as follows:

Survival %=(Cell density in puro media)/(Cell density in regular media)×100%

E. Lentivirus Transduction.

To transduce HEK293FT cells, 10 μl of the concentrated Cas9/Cpf1 virus was applied to 100,000 cells in suspension with 8 μg/ml polybrene (Sigma) to enhance transduction efficiency. Transduced cells, as well as uninfected controls, were passaged into D10 plus 1 μg/μl puromycin media 24 hours post transduction. After two days, all uninfected cells treated with puromycin media were dead. The remaining wells were kept in the selection and passaged every other day to keep them at a sub-confluent density. gDNA was harvested at day 22 for PCR genotyping and quantification.

F. gDNA Extraction, PCR Genotyping and qPCR Quantification.

gDNA was harvested using GeneJET Genomic DNA Purification Kit (Thermo Fisher Scientific). Importantly, we found that crude DNA extraction (e.g. using a lysis buffer without column cleanup) was insufficient for accurate qPCR quantification of deletion efficiency using the methods described below. PCR genotyping was performed using Phusion Flash High-Fidelity (Thermo Fisher Scientific) with outer primers that flank deletion regions. Quantitative PCR (qPCR) using PerfeCTa SYBR Green FastMix (QuantaBio) was employed to quantify wild-type gDNA. According to the manufacturer's recommendations, all gDNA samples were diluted to lower than 20 ng/μl for best amplification result. All primers used for qPCR were pre-tested with an uninfected control sample to confirm presence of a single unique amplicon based on the melting curve. We designed inner primers to amplify within the deletion region and control primers to amplify a region located on the same chromosome but 10 Mb downstream of EMX1 locus. All primers were designed to amplify a less than 200 bp region. The qPCR data was normalized using the ΔΔCt normalization. For each sample, a 2-fold serial dilution of 4 dilutions were quantified each time to increase readout validity. A similar qPCR approach was previously described to quantify gene copy number (Ma, 2014) and targeted genomic deletion (Pulido-Quetglas, 2017).

G. Allelic Cloning.

gDNA from Cas9-transfected and Cpf1-transfected HAP1 cells was amplified using Phusion Flash High-Fidelity (Thermo Fisher Scientific) with a reduced extension time to only amplify the deletion product. The PCR product was then purified with a PCR purification kit (Qiagen). pUC19 plasmid was digested with FastDigest EcoRI and BamHI, and phosphorylated using FastAP Thermosensitive Alkaline Phosphatase (Thermo Fisher Scientific) to avoid self-ligation. A 10 μl Gibson ligation reaction (NEB) was performed using ~100 ng of the purified inserts and 25 ng of the digested pUC19. 1 μl of the reaction was transformed into 10 μl of chemically competent Stbl3 cells prepared using Zymo Mix & Go kit (Zymo Research). Colonies were picked and plasmids were extracted using QIAprep Spin Miniprep kit (Qiagen) for Sanger sequencing to compare deletion junctions.

Example 2: Programmable Genomic Deletions by CRISPR-Cpf1 with Paired crRNAs

The creation of precise genomic deletions using CRISPR programmable nucleases has diverse applications in gene therapy, human disease modeling and high-throughput forward genetic screens. Here we compare CRISPR-Cpf1 and CRISPR-Cas9 deletion systems side-by-side in human near-haploid cells and human embryonic kidney cells. LbCpf1 and guide CRISPR RNAs (crRNAs) delivered in a single vector create genomic deletions with similar efficiency as SpCas9 paired sgRNAs (30-60% deletion) yet have distinct end-joining characteristics. In addition, we show that Cpf1-mediated deletions have greater variability in their junctions and are most efficiently induced when guide sequences have balanced GC content. Using lentiviral transduction, we find that Cpf1 deletions achieve comparable efficiency to Cas9 deletions but with >3-fold higher viral titer.

The CRISPR-Cas9 nuclease and paired single guide RNAs (sgRNAs) mediate targeted genomic deletions by creating two double stranded breaks (DSBs) which are joined together through intrinsic cellular repair mechanisms (Canver, 2014) (FIG. 1a). Precise genomic deletions using Cas9 have been valuable for establishing in vivo disease models (Young, 2016) and performing high-throughput loss-of-function screens (Zhu, 2016; Diao, 2017). However, Cas9-driven deletion have several limitations, including difficultly targeting AT-rich regions of the genome such as introns and potentially confounding off-target effects. The recently-characterized CRISPR effector Cpf1 has lower off-target rates compared to Cas9 (Kim D. K., 2016; Kleinstiver, 2016), suggesting a highly specific alternative for engineering genomic deletions (FIG. 1b). In addition, the Cpf1 nuclease recognizes 5'-TTTV-3' protospacer adjacent motifs (PAMs) and produces a staggered cut distal to the PAM site (Zetsche B. G., 2015). Here, we develop a system to introduce genomic deletions by engineering Cpf1 with a pair of crRNAs in a single vector system, which can be delivered either through transient transfection or lentiviral transduction.

We first constructed deletion systems that contain CRISPR nucleases and their associated guides: either *Streptococcus pyogenes* Cas9 (SpCas9) or *Lachnospiraceae bacterium* ND2006 Cpf1 (LbCpf1) (FIG. 2a). In the Cas9 deletion vector, two PolIII orthologous promoters (hU6 and mU6) drive the expression of each sgRNA individually. For Cpf1 deletion system, we incorporated a flipped crRNA cassette driven by one promoter (hU6), which initiates the expression of a single crRNA with two guides to target two regions of the genome. Due to its ribonuclease activity (Fonfara, 2016), Cpf1 further processes this crRNA into two separate functional crRNAs. The simplicity of guide expression in the Cpf1 deletion system makes it substantially easier to clone compared to the Cas9 deletion system (FIG. 3). For lentiviral production, the flipped orientation of the crRNA cassette is necessary to prevent cutting of the viral RNA genome by Cpf1 (Zetsche B, 2017).

Figure 2B:
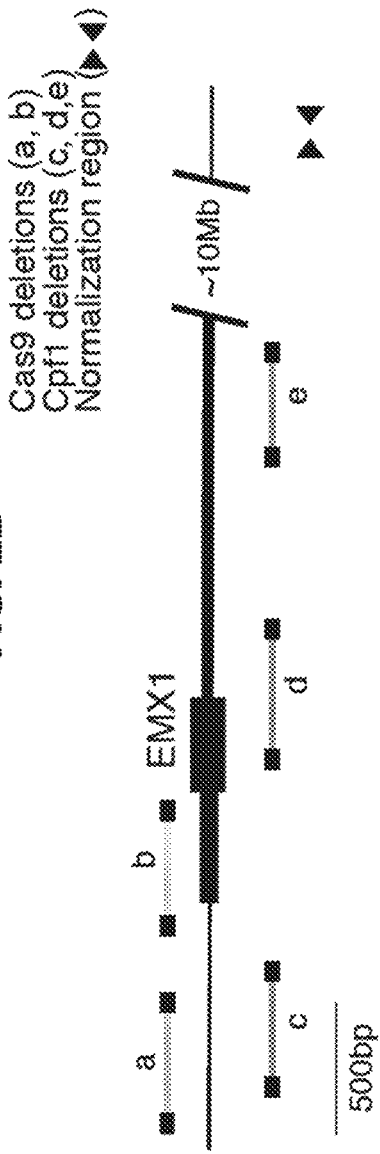
Figure 2C:
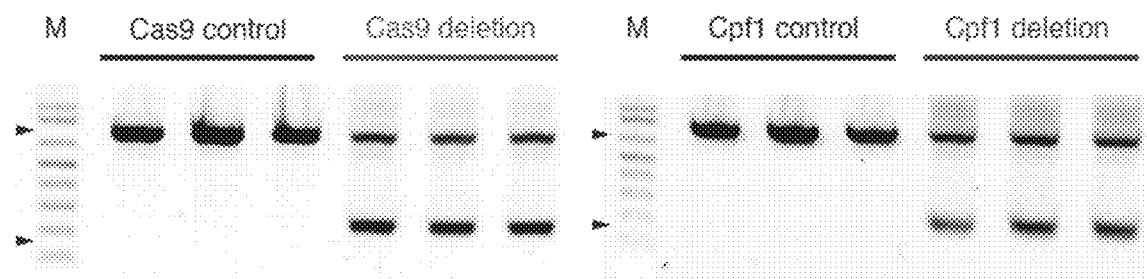
Figure 4:
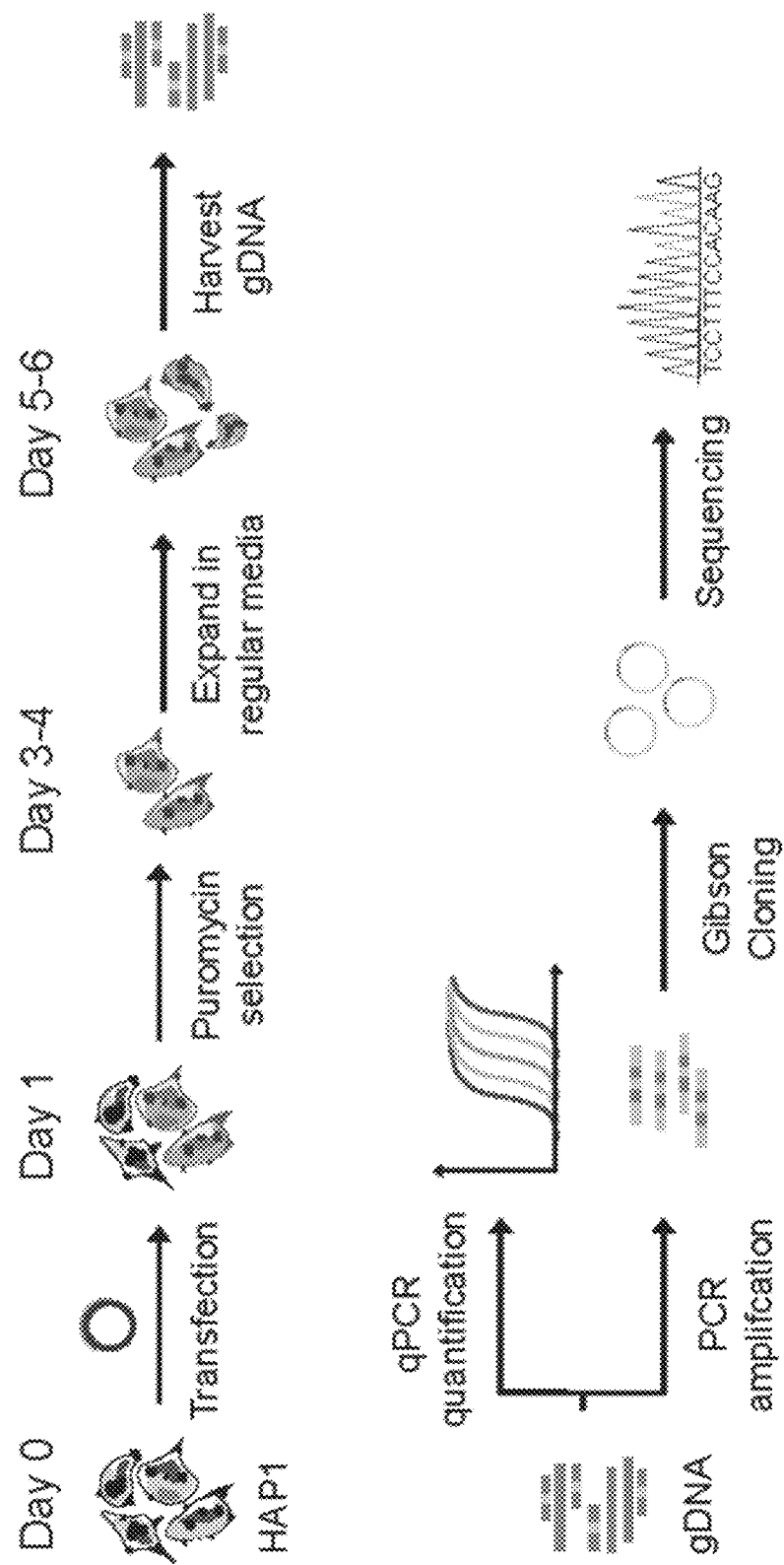
FIG. 4 provides schematics of deletion construct delivery into HAP1 cells and readout of deletions via qPCR and allele sequencing. After transient transfection of near-haploid HAP1 cells, genomic DNA is extracted for qPCR quantification of deletion efficiency and for sequencing of individual alleles.
Figure 5A:
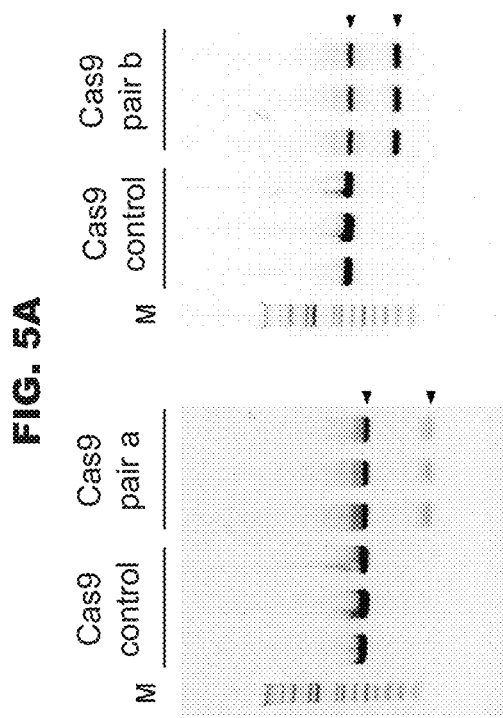
FIGS. 5a to 5b provide full gel electrophoresis images for all PCR genotyping (including those shown in FIG. 2d) of 500 bp deletions constructs from Cas9 and Cpf1 deletion systems. For PCR genotyping, non-targeting guide pairs cloned in their corresponding backbones were used as controls. For each sample, different pairs of primers that anneal outside the deletion region were used to genotype all three biological replicates.
Figure 5B:
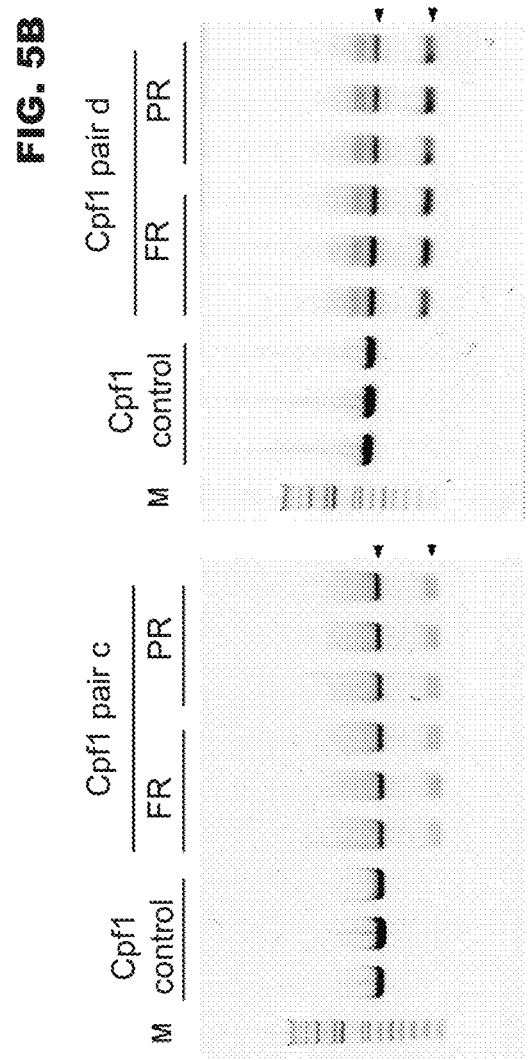
Figure 6A:
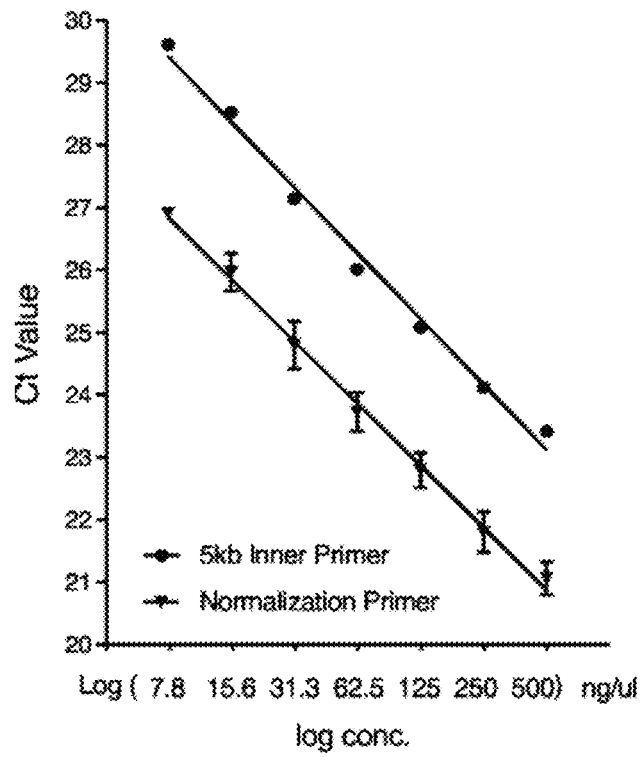
FIGS. 6a to 6b illustrate that assaying deletions with qPCR yields accurate quantification over ~100-fold range and quantification error decreases with increasing number of sample dilutions.
Figure 6B:
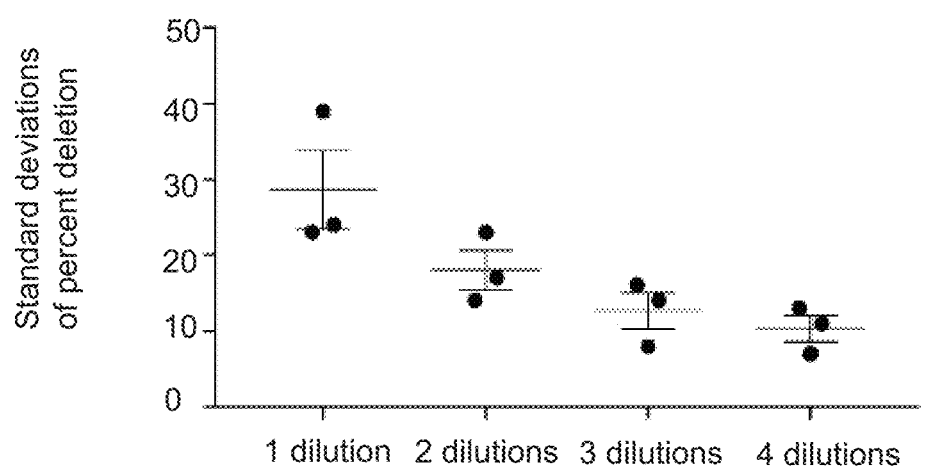

After vector cloning, we transiently transfected near-haploid HAP1 cells with Cas9 and Cpf1 deletion systems and compared resulting genomic deletions (FIG. 4). For each pair, we designed two guides spaced approximately 500 bp apart around the EMX1 locus (FIG. 2b). Conventional PCR genotyping was performed using outer primers flanking the genomic region and we found that both systems created ~500 bp deletions at the predicted sites (FIGS. 2c and 5). We next quantified the deletion efficiency using quantitative PCR (qPCR) with purified genomic DNA harvested 4-5 days post-transfection. Primers were designed to amplify ~100 bp regions within the predicted deletion and compared with a control region ~10 Mb away on the same chromosome. We found that this approach quantifies the abundance of the targeted region with high sensitivity (FIG. 6).

Figure 2D:
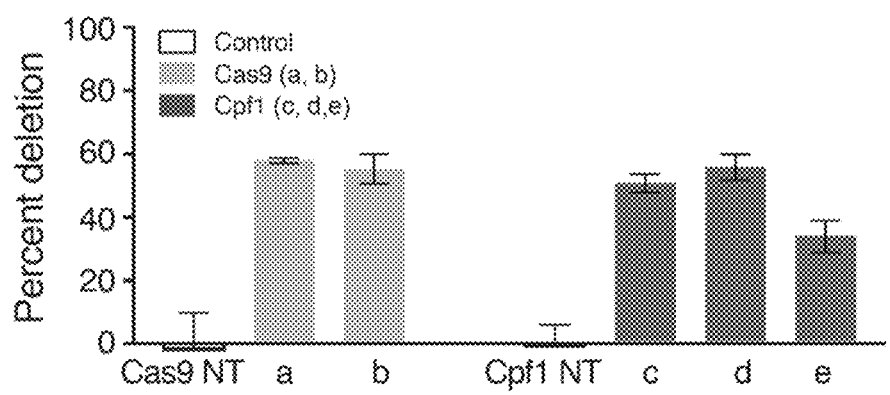
Figure 2E:
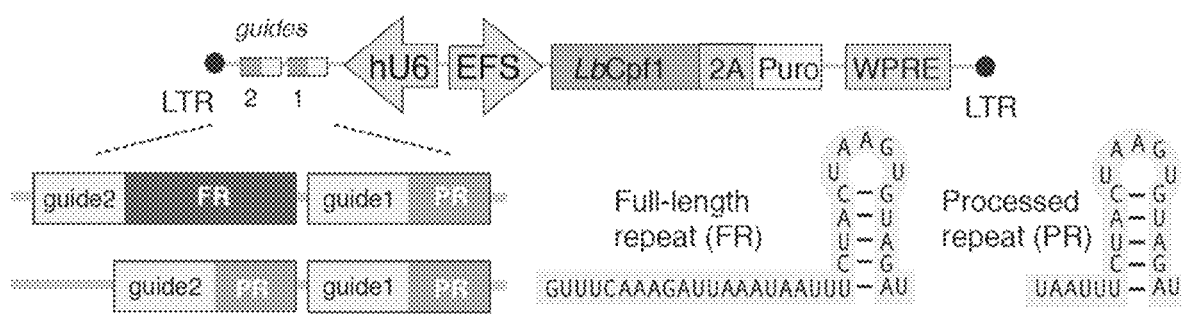
Figure 2F:
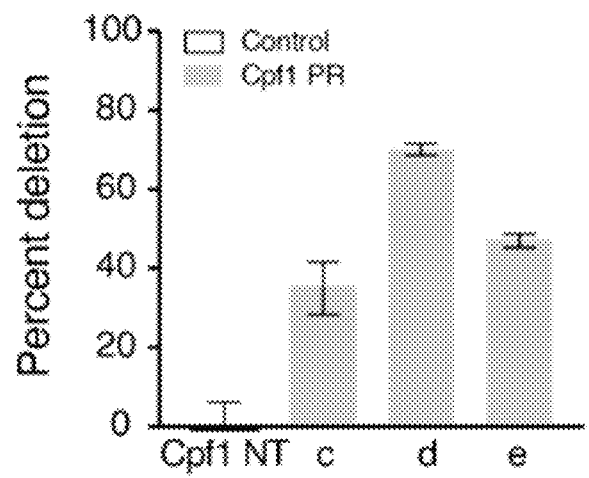
Figure 2G:
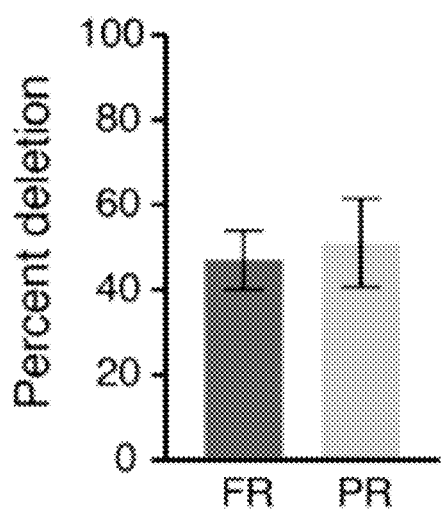

In HAP1 cells, Cpf1 deletion constructs showed a comparable deletion efficiency (51%, 56% and 34%) to Cas9 (58% and 55%) (FIG. 2d). To engineer a more compact Cpf1 deletion construct, we tested two different Cpf1 direct repeats: a full-length direct repeat that contains a 20 bp sequence before the stem-loop, and a processed form of the repeat with only 5 bp before the stem-loop (Zetsche B. G., 2015) (FIG. 2e). The processed repeat constructs had deletion efficiencies ranging between 35-70% (FIG. 2f) and there was no significant difference between these and the same guide pairs with full-length repeats (FIG. 2g). This suggests that a shortened direct repeat is sufficient for creating genomic deletions.

Figure 7A:
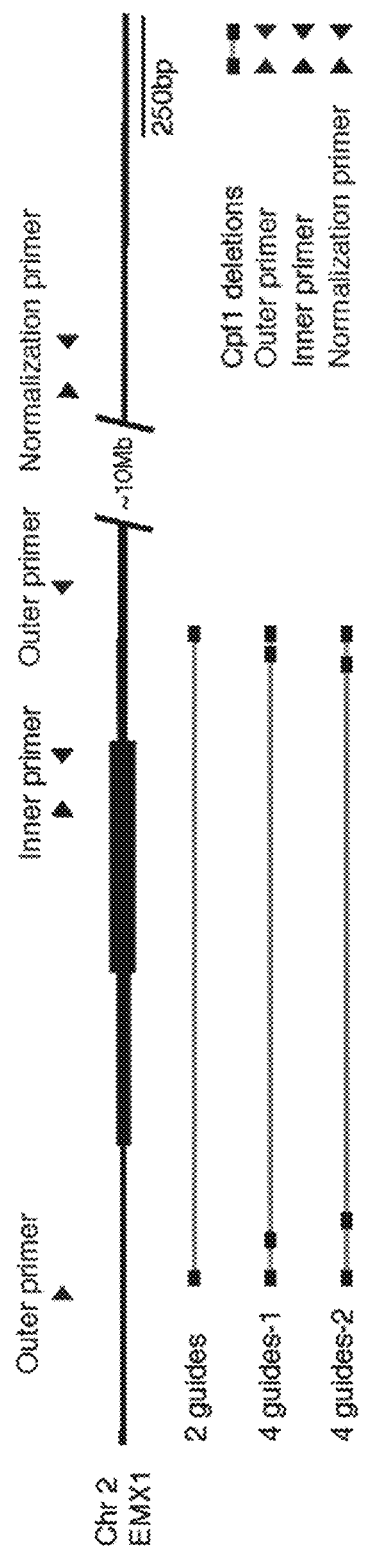
FIGS. 7a to 7d show that four guides delivered with Cpf1 result in additional genome repair outcomes with a similar overall deletion rate as two guides.
Figure 7B:
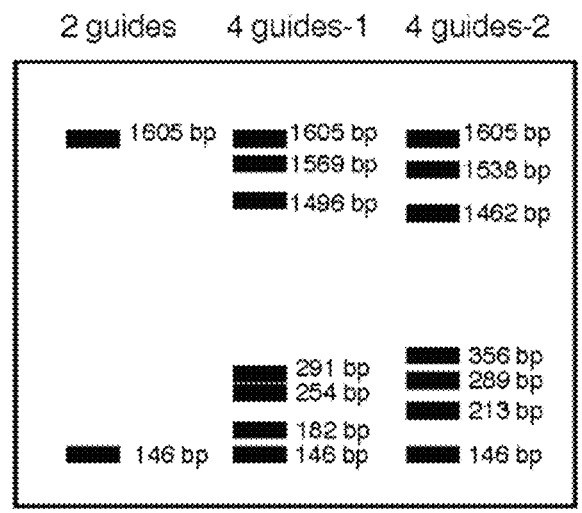
Figure 7C:
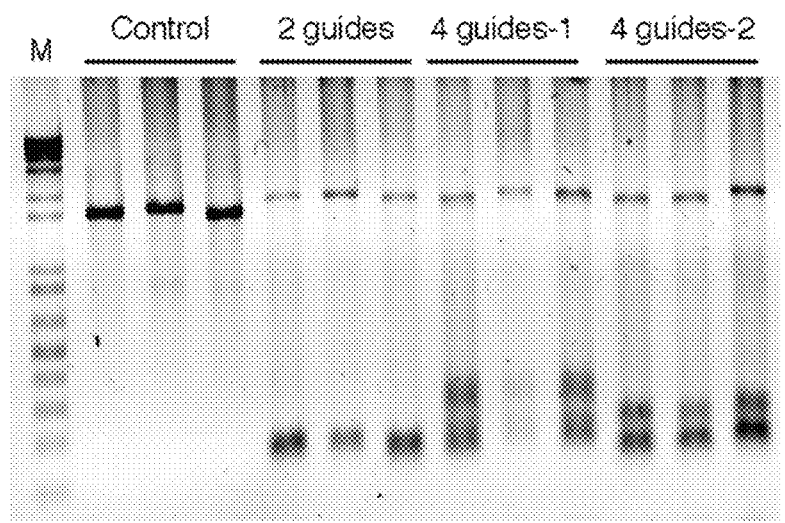
Figure 7D:
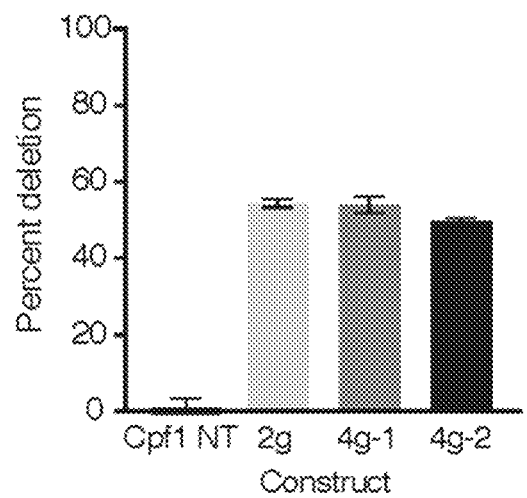

Given the easy multiplexing with the processed repeat, we wondered whether adding additional target sites at either side of the deletion could further boost deletion efficiency. To test this, we added two additional guides within 150 bp of each target site in a 1.5 kb deletion, yielding a crRNA with 4 guides linked by processed repeats between each guide (FIG. 7a). As expected, we observed additional bands corresponding to the predicted combinations of cut sites (FIGS. 7b-7c). However, we found that the overall deletion efficiency with 4 guides was similar to what we observed with only 2 guides and this was also true for an additional set of inner target sites (FIG. 7d).

Figure 8A:
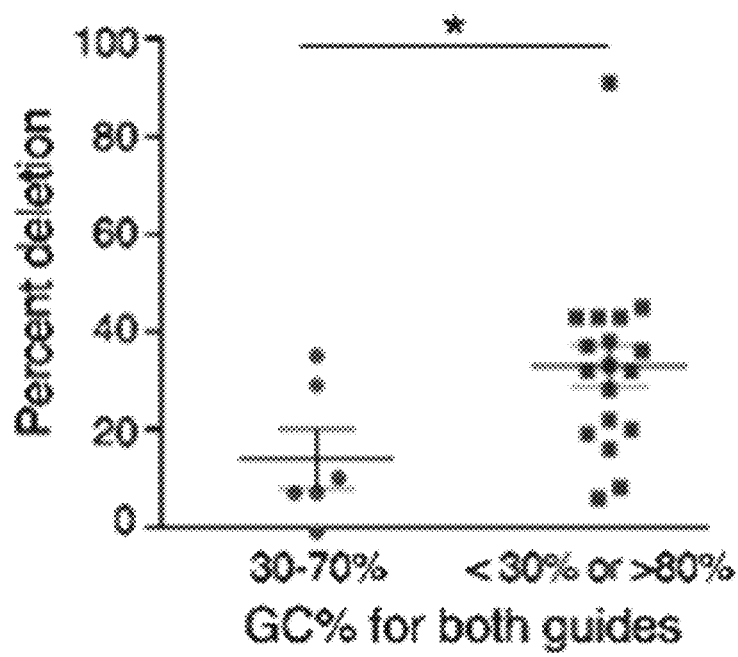
FIGS. 8a to 8f show that LbCpf1-induced deletions have distinct end-joining outcomes compared to SpCas9-induced deletions and can be delivered efficiently via lentivirus.
Figure 8B:
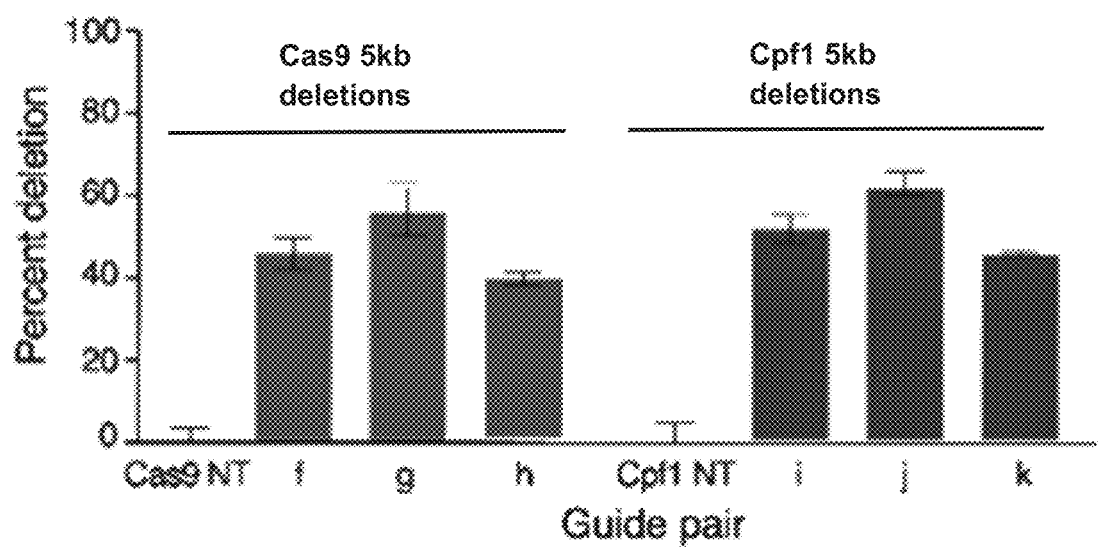
Figure 9:
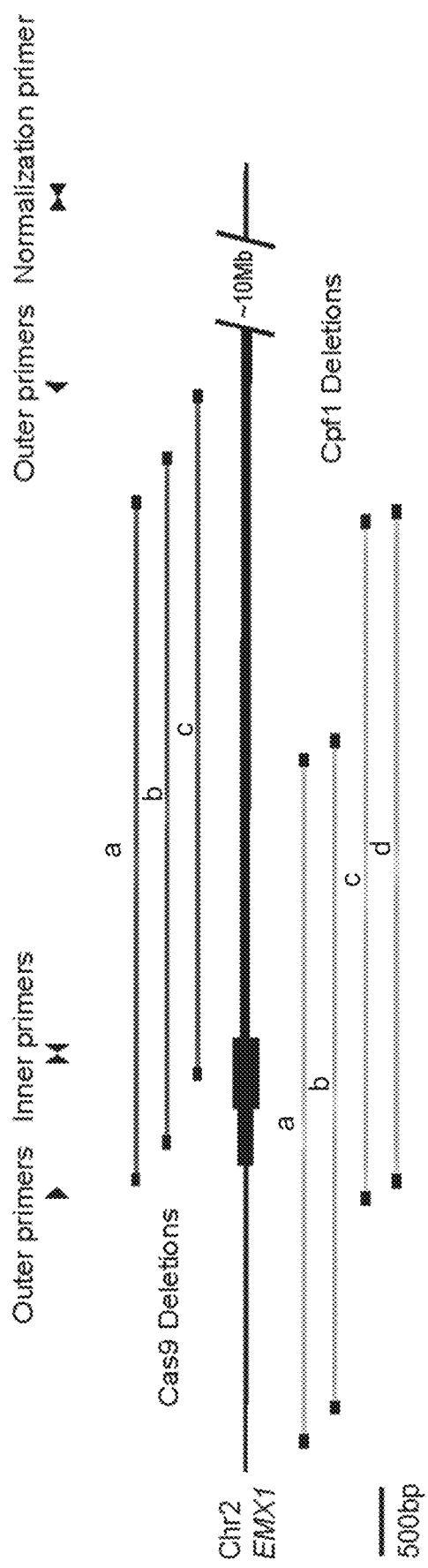
FIG. 9 provides a schematic diagram of 5 kb deletion at the EMX1 locus. Pairs of Cas9-associated sgRNAs and Cpf1-associated crRNAs are designed to introduce ~5 kb deletions around the EMX1 gene. The same inner primers are used for all constructs for qPCR quantification of deletion efficiency. Outer primers for PCR genotyping flanking selective guide pairs are also indicated.
Figure 10:
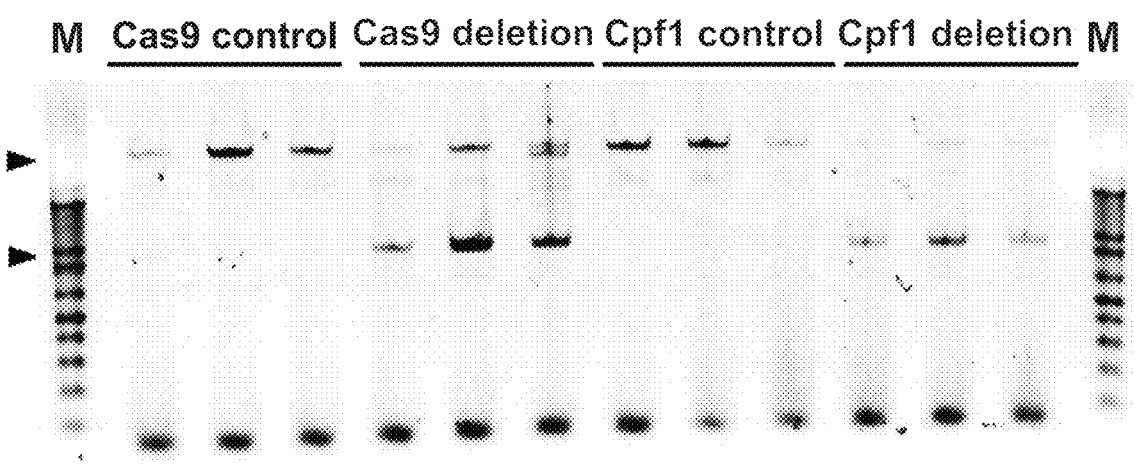
FIG. 10 provides representative gel electrophoresis image of 5 kb deletion. PCR genotyping of Cas9 5 kb pair a and Cpf1 5 kb pair d. Controls were transfecting with Cas9 or Cpf1 with non-targeting guide pairs. Marker lane contains the 1 kb+ladder.

Previous work has suggested that genome modification with another Cpf1 ortholog (AsCpf1) is most efficient when the GC content of the guide sequence is 30-70% (Kim H. K., 2017). To understand the relationship between GC content of guide sequences and deletion efficiency in our LbCpf1 deletion system, we designed 6 deletion pairs where both guides had a GC content outside of the 30-70% range and 18 pairs with GC content in the 30-70% range. All guides were designed to target in the same region near EMX1 gene. We discovered that a balanced GC content contributed to more efficient deletions with an average deletion rate of 33% while the average deletion rate in the extreme GC group was only 14% (FIG. 8a). With the improved design strategy, we designed three additional guide pairs to create larger (5 kb) deletions and again compared Cas9 and Cpf1 deletion systems head-to-head (Pulido-Quetglas, 2017) (FIG. 9). We introduced these constructs into HAP1 cells using transient transfection, and, after 4-5 days, we found that both Cas9 and Cpf1 efficiently introduced deletions with an average deletion rate of 47% for Cas9 and 53% for Cpf1 (FIGS. 10 and 8b). Overall, across the range of deletions that we attempted (500 bp, 1.5 kb, and 5 kb), we found that Cpf1 was able to introduce deletions at a comparable rate to Cas9.

Figure 8C:
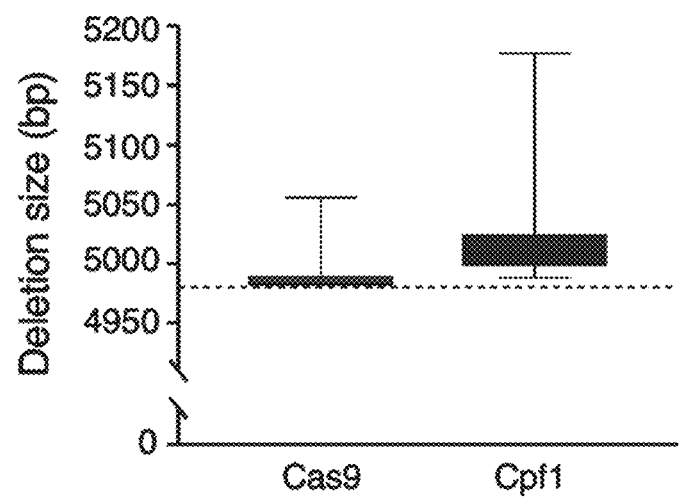
Figure 8D:
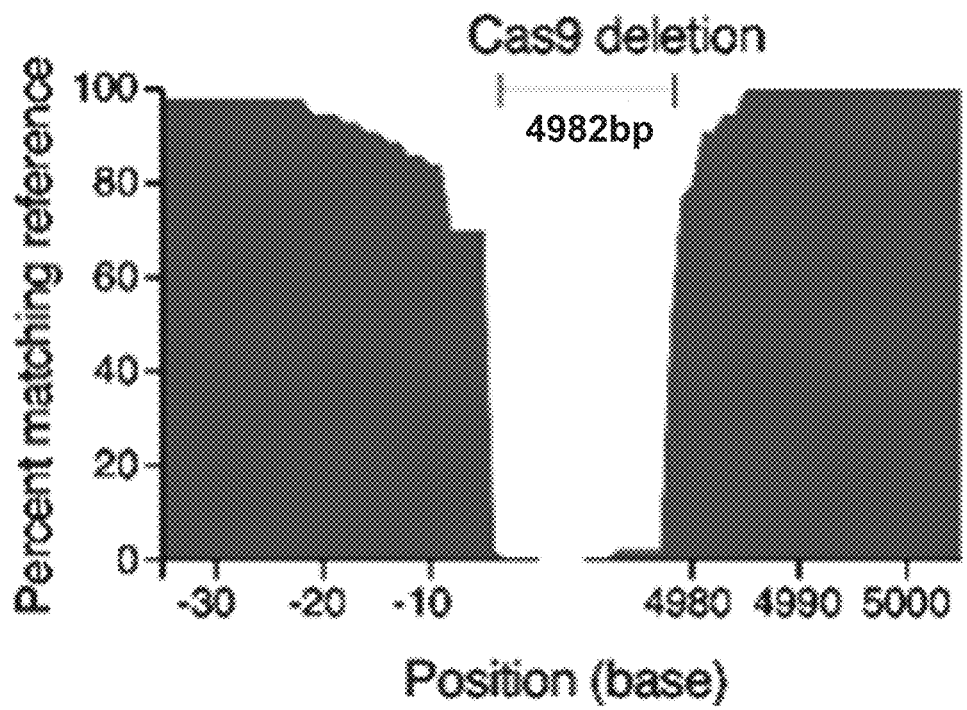
Figure 8E:
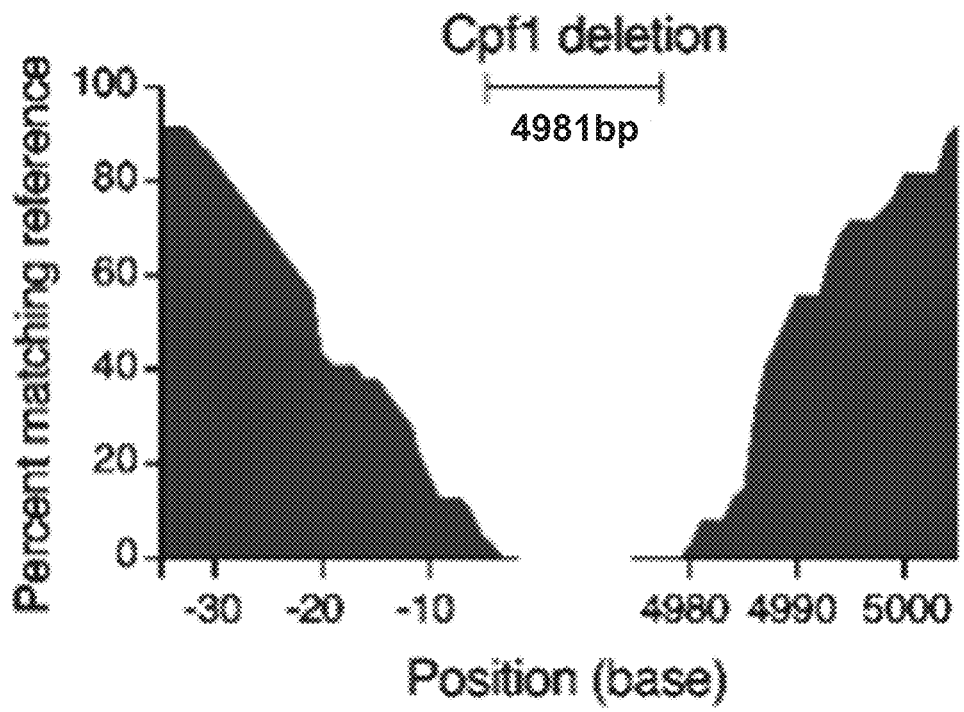

Given that Cpf1 produces a staggered cut, we wondered whether Cpf1-induced deletions would result in different repair outcomes/junctions than Cas9-induced deletions, which have a blunt cut. To test this, we amplified genomic DNA and sequenced individually cloned alleles (FIG. 11). We found that Cpf1 tended to create larger deletions than predicted by cut position with greater heterogeneity in repair outcomes, whereas Cas9 introduced more precise, stereo-typed deletions (FIGS. 8b, 8c and 11). This finding is consistent with a previous study that compared LbCpf1 and SpCas9 repair outcomes with single guide sequences: LbCpf1 tends to create indels with larger deletions (>10 bp), whereas SpCas9 often result in a mixture of small insertions and deletions (Kim D. K., 2016).

Figure 8F:
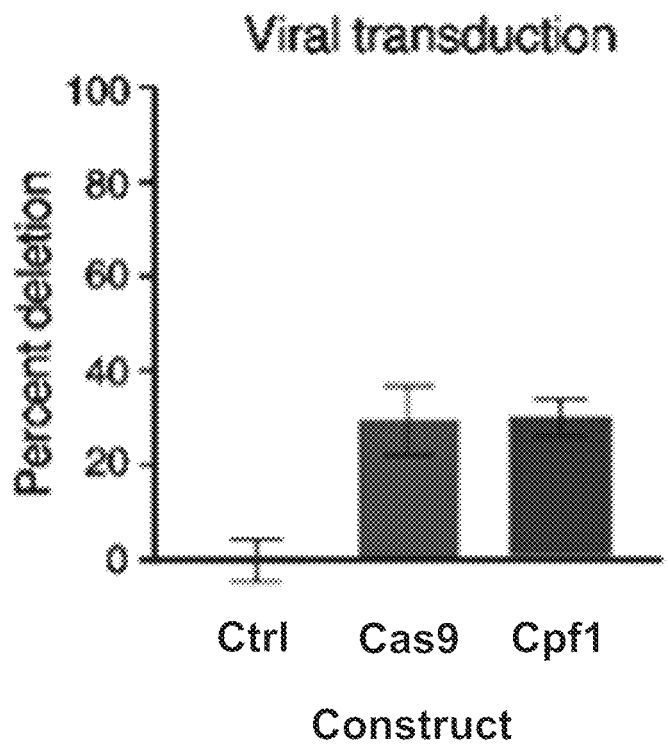
Figure 12:
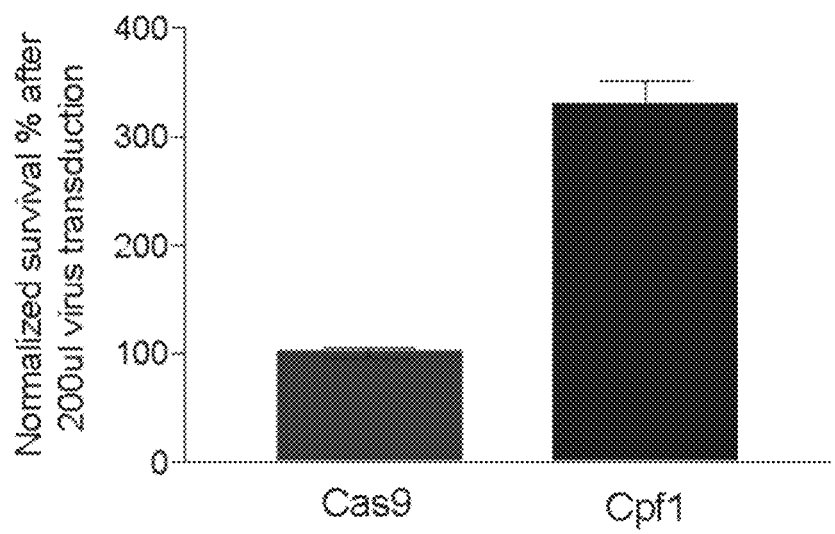
FIG. 12 provides a comparison of viral titer with Cas9 deletion lentivirus and Cpf1 deletion lentivirus. Normalized percent survival in HAP1 cells after transduction with 200 µl lentiviral supernatant. Percent survival was measured by comparing cell counts in media containing puromycin after 2 days of selection to cell counts in puromycin-free media. Cas9 5 kb pair g and Cpf1 5 kb pair 1 were used in the titer comparison.
Figure 13:
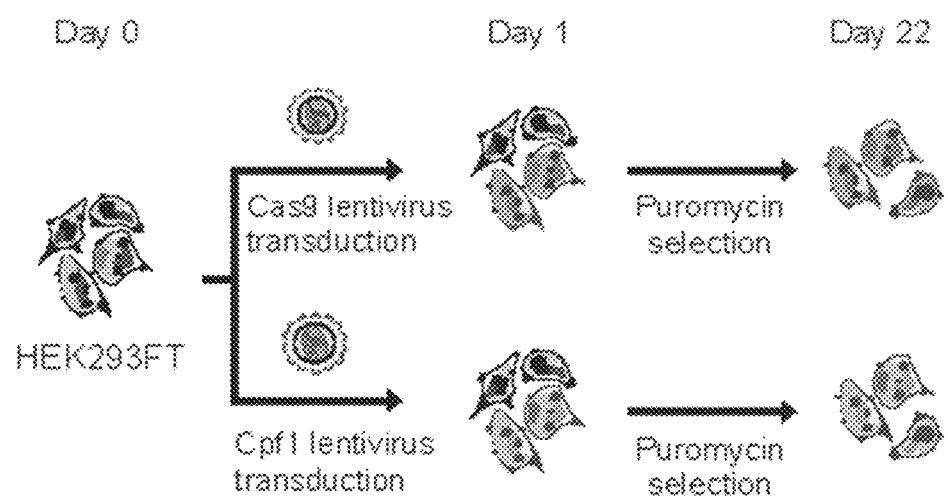
FIG. 13 provides a lentiviral experimental workflow for Cas9 and Cpf1 5 kb deletions. HEK293FT cells were transduced with lentivirus at Day 0 and, after 24 hours, 1 µg/ml puromycin was added to the media. After 3 weeks, genomic DNA was extracted and deletion efficiency was quantified via qPCR.

For certain applications such as in vivo disease models or pooled high-throughput screens, viral delivery is often required and we designed our constructs with the flexibility to use them for lentiviral production. The flipped U6 system allows successful packaging of lentivirus and prevents Cpf1 from cutting the crRNA before viral packaging, which is essential for producing an intact ssRNA genome (Zetsche B, 2017). Notably, Cpf1 deletion virus had ~3-fold higher titer compared to Cas9 deletion virus (FIG. 12). This may be due to the size difference of the lentiviral genomes (~8.6 kb for Cas9 vs. ~7.7 kb for Cpf1), as larger genome sizes results in lower viral titer (al Yacoub, 2007). It has also been observed that lentiviral vectors with multiple promoters with similar sequences (e.g. multiple U6 promoters, as in the Cas9 vector) can trigger recombination during viral packaging and also lower viral titer (Brake, 2008). We transduced HEK293FT cells at a low multiplicity of infection (<0.1) and selected them with puromycin for approximately 3 weeks (FIG. 13). We performed quantitative analysis of genome deletions and found that viral delivery of Cas9 and Cpf1 yielded a similar deletion rate in HEK293FT cells (FIG. 8*f*).

In summary, we present a side-by-side comparison of deletions introduced via the programmable nucleases Cas9 and Cpf1. Using PCR genotyping and qPCR analysis, we demonstrate that targeted deletions can be efficiently induced by both nucleases. Allele sequencing results suggest Cas9 creates deletions more precisely than Cpf1 deletions. However, an expanded targeting space of AT-rich regions, simplicity of cloning multiple guide sequences, higher viral titer and lower off-target modification make the LbCpf1 deletion system a powerful addition to the genome engineering toolbox.

An enhancer region is screened and a human chromosome-scale deletion library is under investigation using Cpf1 deletions as described above for comprehensive analysis of functional elements that impact cell growth in the chromosome.

TABLE 1

Sequences of sgRNA/crRNA guides and LbCpf1 repeats.

|  | Guide | Strand | Chr | Cut site | PAM (5'-3') | Sequence (5'-3') |
|---|---|---|---|---|---|---|
| 500 bp Deletion | | | | | | |
| Cas9 pair a | 1 | − | 2 | 72916609 | CGG | TCACCTTCCACCCGCGACCG; SEQ ID NO: 8 |
|  | 2 | + | 2 | 72917151 | CGG | CCAAACATCCACCCTCCGCT; SEQ ID NO: 9 |
| Cas9 pair b | 1 | − | 2 | 72917383 | GGG | GCCGGACTGGAGCCTTCGCG; SEQ ID NO: 10 |
|  | 2 | + | 2 | 72917884 | CGG | GTGCACACCCCGCAAGGCGG; SEQ ID NO: 11 |
| Cpf1 pair c | 1 | + | 2 | 72916736 | TTTA | AGCCACAGTGTCTCCGAGGCCCT; SEQ ID NO: 12 |
|  | 2 | + | 2 | 72917267 | TTTA | GCCCCAAGCCCTTCGGACGCCTT; SEQ ID NO: 13 |
| Cpf1 pair d | 1 | + | 2 | 72918002 | TTTA | CCATAGAGTCCTTGGTGGCCAAG; SEQ ID NO: 14 |
|  | 2 | − | 2 | 72918550 | TTTC | CTGGGAGGGAGACCTACGCGGCG; SEQ ID NO: 15 |
| Cpf1 pair e | 1 | − | 2 | 72919141 | TTTA | TTAGCAAGCCGATTGCTGGATGC; SEQ ID NO: 16 |
|  | 2 | + | 2 | 72919637 | TTTC | CCAGGTCCCGATTTGTCAGGCAA; SEQ ID NO: 17 |
| 5 kb Deletion | | | | | | |
| Cas9 pair f | 1 | + | 2 | 72917334 | AGG | AGCTAAAGGGCGGAGTCGCG; SEQ ID NO: 18 |
|  | 2 | − | 2 | 72922316 | TGG | GAAGATTAAAGTCTCTGGGG; SEQ ID NO: 19 |
| Cas9 pair g | 1 | + | 2 | 72917606 | AGG | GGTCCCAGCGGGACTCCGAA; SEQ ID NO: 20 |
|  | 2 | − | 2 | 72922618 | GGG | ACAGAGTTGCTAGGATTGCG; SEQ ID NO: 21 |
| Cas9 pair h | 1 | − | 2 | 72918096 | GGG | TGAGGGTAGTTGAGCGCCGT; SEQ ID NO: 22 |
|  | 2 | + | 2 | 72923085 | GGG | GATTGTGTGAGGGCCTAGTG; SEQ ID NO: 23 |
| Cpf1 pair i (D239) | 1 | − | 2 | 72915401 | TTTA | ACTGGGCAGGTAGAGAAGCTTGG; SEQ ID NO: 24 |
|  | 2 | + | 2 | 72920450 | TTTC | GAACCCTGTAGCGCTGTTGCTTC; SEQ ID NO: 25 |
| Cpf1 pair j (D240) | 1 | + | 2 | 72915655 | TTTC | GTTCCATATGGAAGGAGACAACG; SEQ ID NO: 26 |
|  | 2 | − | 2 | 72920592 | TTTC | TAGAGAACCGGGTCTCAGCGATG; SEQ ID NO: 27 |
| Cpf1 pair k (D241) | 1 | + | 2 | 72917158 | TTTC | AGTTCTCAGAGAACTTGGATCCG; SEQ ID NO: 28 |
|  | 2 | + | 2 | 72922172 | TTTC | CTCTGGACAAATGAACCAGAGAG; SEQ ID NO: 29 |
| Cpf1 pair l (D216) | 1 | + | 2 | 72917424 | TTTG | CCTCCGACTGCGGGCTCCCTCCC; SEQ ID NO: 30 |
|  | 2 | − | 2 | 72922413 | TTTG | ACTTGGGATAGTGGAATAGACAG; SEQ ID NO: 31 |
| 5 kb Deletion (Extreme −GC group) | | | | | | |
| Cpf1 pair 1 | 1 | + | 2 | 72917301 | TTTA | GCTGAGTCTGGTGGCCGTGCCGC; SEQ ID NO: 32 |
|  | 2 | − | 2 | 72922259 | TTTG | AAGCAAGTTATTAACATTAACAA; SEQ ID NO: 33 |
| Cpf1 pair 2 | 1 | − | 2 | 72913487 | TTTC | ACCACAAAATTTCTTGAATGATT; SEQ ID NO: 34 |
|  | 2 | − | 2 | 72918550 | TTTC | CTGGGAGGGAGACCTACGCGGCG; SEQ ID NO: 35 |
| Cpf1 pair 3 | 1 | − | 2 | 72913487 | TTTC | ACCACAAAATTTCTTGAATGATT; SEQ ID NO: 36 |
|  | 2 | − | 2 | 72918801 | TTTC | CCCCGCCCGGACGCGCCAGCGAA; SEQ ID NO: 37 |
| Cpf1 pair 4 | 1 | − | 2 | 72917301 | TTTA | GCTGAGTCTGGTGGCCGTGCCGC; SEQ ID NO: 38 |
|  | 2 | + | 2 | 72922259 | TTTG | AAGCAAGTTATTAACATTAACAA; SEQ ID NO: 39 |
| Cpf1 pair 5 | 1 | + | 2 | 72917424 | TTTG | CCTCCGACTGCGGGCTCCCTCCC; SEQ ID NO: 40 |
|  | 2 | + | 2 | 72922259 | TTTG | AAGCAAGTTATTAACATTAACAA; SEQ ID NO: 41 |
| Cpf1 pair 6 | 1 | − | 2 | 72917587 | TTTC | GGAGTCCCGCTGGGACCGACCCC; SEQ ID NO: 42 |
|  | 2 | + | 2 | 72922259 | TTTG | AAGCAAGTTATTAACATTAACAA; SEQ ID NO: 43 |

TABLE 1-continued

Sequences of sgRNA/crRNA guides and LbCpf1 repeats.

| Guide | | Strand | Chr | Cut site | PAM (5'-3') | Sequence (5'-3') |
|---|---|---|---|---|---|---|
| \multicolumn{7}{c}{5 kb Deletion (balanced -GC group)} | | | | | | |
| Cpf1 pair 7 | 1 | + | 2 | 72913577 | TTTG | TAAGGCAAGGAGACATAAAGATG; SEQ ID NO: 44 |
|  | 2 | + | 2 | 72918617 | TTTC | TAGAAAATATACCAGTTCGGACG; SEQ ID NO: 45 |
| Cpf1 pair 8 | 1 | - | 2 | 72913849 | TTTG | CTGGCTAACTTCGTTCTTAAAAC; SEQ ID NO: 46 |
|  | 2 | - | 2 | 72919225 | TTTC | TCCGGGAAAGACAAATAATTGAA; SEQ ID NO: 47 |
| Cpf1 pair 9 | 1 | - | 2 | 72914797 | TTTC | TTCCATAGCTCTGCTTATCTTTA; SEQ ID NO: 48 |
|  | 2 | - | 2 | 72919449 | TTTC | ATTTGTTTCTCTAAAAGCCGGGT; SEQ ID NO: 49 |
| Cpf1 pair 10 | 1 | - | 2 | 72914312 | TTTC | CTGGAGGTCCCATCTCCTGCAAC; SEQ ID NO: 50 |
|  | 2 | + | 2 | 72918946 | TTTC | TCGGCAACCTTGGCCCGACTTCT; SEQ ID NO: 51 |
| Cpf1 pair 11 | 1 | - | 2 | 72914344 | TTTC | ACTTTGCCCCTGTCCAGCCTCCC; SEQ ID NO: 52 |
|  | 2 | + | 2 | 72919126 | TTTA | AGGTCGTAGCCAGTCCGAACCCC; SEQ ID NO: 53 |
| Cpf1 pair 12 | 1 | - | 2 | 72914437 | TTTC | CTCCCACCCAAGCTGCTGAGCTC; SEQ ID NO: 54 |
|  | 2 | - | 2 | 72919910 | TTTC | GAGACCCAGGCTTCGGATCGAGC; SEQ ID NO: 55 |
| Cpf1 pair 13 | 1 | - | 2 | 72914859 | TTTC | CTCTCCCAGCGCCCCTTTCTGTC; SEQ ID NO: 56 |
|  | 2 | - | 2 | 72919586 | TTTC | TGTGAAAGTCAAAGTGTCAAGAG; SEQ ID NO: 57 |
| Cpf1 pair 14 | 1 | - | 2 | 72914271 | TTTG | GAGAATAGCCCGATGCCTCCCAG; SEQ ID NO: 58 |
|  | 2 | + | 2 | 72919243 | TTTC | AATTATTTGTCTTTCCCGGAGAA; SEQ ID NO: 59 |
| Cpf1 pair 15 | 1 | + | 2 | 72915335 | TTTA | GATATGAACAAGTATACCCAGAG; SEQ ID NO: 60 |
|  | 2 | + | 2 | 72920361 | TTTC | CCTCAAGAACCGAGTCTGGACGC; SEQ ID NO: 61 |
| Cpf1 pair 16 | 1 | + | 2 | 72913870 | TTTA | AGAACGAAGTTAGCCAGCAAAGA; SEQ ID NO: 62 |
|  | 2 | + | 2 | 72919157 | TTTG | CATCCAGCAATCGGCTTGCTAAT; SEQ ID NO: 63 |
| Cpf1 pair 17 | 1 | - | 2 | 72913857 | TTTG | CTTCTTTGCTGGCTAACTTCGTT; SEQ ID NO: 64 |
|  | 2 | + | 2 | 72919252 | TTTG | TCTTTCCCGGAGAAAAGAGAGTT; SEQ ID NO: 65 |
| Cpf1 pair 18 | 1 | + | 2 | 72914048 | TTTG | GAGTCTGACATTGATCCAGTGCA; SEQ ID NO: 66 |
|  | 2 | - | 2 | 72919252 | TTTC | TCTTTCCCGGAGAAAAGAGAGTT; SEQ ID NO: 67 |
| Cpf1 pair 19 | 1 | + | 2 | 72913208 | TTTG | GCTCCTAGCACGGCTCTATGAAA; SEQ ID NO: 68 |
|  | 2 | - | 2 | 72918581 | TTTC | TAGAAAAGCCTGGAGGTCTCCAC; SEQ ID NO: 69 |
| Cpf1 pair 20 | 1 | - | 2 | 72913972 | TTTG | TCCATGCGGAGAACTTGGGAATC; SEQ ID NO: 70 |
|  | 2 | + | 2 | 72919408 | TTTG | TTAGTGTAGACCAGACCACAGCC; SEQ ID NO: 71 |
| Cpf1 pair 21 | 1 | + | 2 | 72914092 | TTTA | CTCCTCACAGAGGTCCCGTATAA; SEQ ID NO: 72 |
|  | 2 | - | 2 | 72919141 | TTTA | TTAGCAAGCCGATTGCTGGATGC; SEQ ID NO: 73 |
| Cpf1 pair 22 | 1 | - | 2 | 72913591 | TTTC | ACCTCCTTCTTTCCTATTCAGCC; SEQ ID NO: 74 |
|  | 2 | - | 2 | 72918981 | TTTG | CTTACTGCAAACCTTCCCCACCT; SEQ ID NO: 75 |
| Cpf1 pair 23 | 1 | - | 2 | 72913527 | TTTC | TGTCCTCATGTTTCTCTCAGTCT; SEQ ID NO: 76 |
|  | 2 | + | 2 | 72919012 | TTTG | CAGTAAGCAAACTGGCTTCCGCC; SEQ ID NO: 77 |
| Cpf1 pair 24 | 1 | + | 2 | 72913983 | TTTG | AGGTGATTCCCAAGTTCTCCGCA; SEQ ID NO: 78 |
|  | 2 | + | 2 | 72919356 | TTTA | AAGAGTGGCCTTGATTTGTACAG; SEQ ID NO: 79 |
| Cas9 control non-targeting | 1 |  |  |  |  | CTGAAGGTTCCAGGTCATTG; SEQ ID NO: 80 |
|  | 2 |  |  |  |  | ACGGAGGCTAAGCGTCGCAA; SEQ ID NO: 81 |
| Cpf1 control non-targeting | 1 |  |  |  |  | GAGCAGACTCGTCGCTCACGACC; SEQ ID NO: 82 |
|  | 2 |  |  |  |  | GAAGCTGTACCGGTGCTGAGTCA; SEQ ID NO: 83 |
| \multicolumn{7}{c}{Multi-guide deletion} | | | | | | |
| Cpf1 2-guide | 1 | - | 2 | 72917158 | TTTC | AGTTCTCAGAGAACTTGGATCCG; SEQ ID NO: 84 |
|  | 2 | + | 2 | 72918617 | TTTC | TAGAAAATATACCAGTTCGGACG; SEQ ID NO: 85 |
| Cpf1 4-guide-1 | 1 | - | 2 | 72917158 | TTTC | AGTTCTCAGAGAACTTGGATCCG; SEQ ID NO: 86 |
|  | 2 | + | 2 | 72917267 | TTTA | GCCCCAAGCCCTTCGGACGCCTT; SEQ ID NO: 87 |
|  | 3 | - | 2 | 72918581 | TTTC | TAGAAAAGCCTGGAGGTCTCCAC; SEQ ID NO: 88 |
|  | 4 | + | 2 | 72918617 | TTTC | TAGAAAATATACCAGTTCGGACG; SEQ ID NO: 89 |

TABLE 1-continued

Sequences of sgRNA/crRNA guides and LbCpf1 repeats.

| Guide | | Strand | Chr | Cut site | PAM (5'-3') | Sequence (5'-3') |
|---|---|---|---|---|---|---|
| Cpf1 4-guide-2 | 1 | − | 2 | 72917158 | TTTC | AGTTCTCAGAGAACTTGGATCCG; SEQ ID NO: 90 |
| | 2 | − | 2 | 72917301 | TTTA | GCTGAGTCTGGTGGCCGTGCCGC; SEQ ID NO: 91 |
| | 3 | − | 2 | 72918550 | TTTC | CTGGGAGGGAGACCTACGCGGCG; SEQ ID NO: 92 |
| | 4 | + | 2 | 72918617 | TTTC | TAGAAAATATACCAGTTCGGACG; SEQ ID NO: 93 |

TABLE 2

Sequences of LbCpf1 Repeats

| LbCpf1 Repeats | Full-length | GTTTCAAAGATTAAATAAT TTCTACTAAGTGTAGAT; SEQ ID NO: 6 |
|---|---|---|
| | Processed | TAATTTCTACTAAGTGTAG AT; SEQ ID NO: 7 |

TABLE 3

Primers used in qPCR quantification

| | | Forward (5'-3') | Reverse (5'-3') |
|---|---|---|---|
| Normalization primers | | CACAGTCCTTCTCCA GCCAG; SEQ ID NO: 94 | TTCACATACTGGGTC ACGCC; SEQ ID NO: 95 |
| 500 bp inner primers | Cas9 pair 1 | GATGGGCTCGGGCTA CTTG; SEQ ID NO: 96 | CACCCTCCAGCTGTT CGC; SEQ ID NO: 97 |
| | Cas9 pair 2 | AGGTGAGCGGCGGCC AAT; SEQ ID NO: 98 | GCGCGGGCTCCGTGC TAG; SEQ ID NO: 99 |
| | Cpf1 pair 1 | TGGATCTCCCAGTGC CGAG; SEQ ID NO: 100 | TGTTCCTGAGGTTTC GCGTT; SEQ ID NO: 101 |
| | Cpf1 pair 2 | GTTCCCCGAGGCCAT GAAC; SEQ ID NO: 102 | GGACCCAGGGGTAGA AATGG; SEQ ID NO: 103 |
| | Cpf1 pair 3 | TCCCGGAGAAAAGAG AGTTGCAT; SEQ ID NO: 104 | CTAGCTCTGAGCCAT AGACCCT; SEQ ID NO: 105 |
| 5 kb inner primers | | GTTCCCCGAGGCCAT GAAC; SEQ ID NO: 106 | GGACCCAGGGGTAGA AATGG; SEQ ID NO: 107 |
| Multi-guide inner primers | | GTTCCCCGAGGCCAT GAAC; SEQ ID NO: 108 | GGACCCAGGGGTAGA AATGG; SEQ ID NO: 109 |

TABLE 4

Primers used in PCR genotyping and allelic cloning

| | | Forward (5'-3') | Reverse (5'-3') |
|---|---|---|---|
| 5 kb outer primers | | GGAGGGTTGGAGTTT AGCCC; SEQ ID NO: 110 | AACAAGCCTCTACCC ACAGC; SEQ ID NO: 111 |
| 500 bp outer primers | Cas9 pair 1 | CCGTACGGAAAAACT GGCCG; SEQ ID NO: 112 | TTCGTCCCGGGATGT CGTTT; SEQ ID NO: 113 |
| | Cas9 pair 2 | AGGAGGAGGCCTGGA TCTC; SEQ ID NO: 114 | GTAGTTGAGCGCCGT GGG; SEQ ID NO: 115 |
| Cpf1 pair 1 | | TGCTTCTGCGTGTCC TGACG; SEQ ID NO: 116 | CTGGCTTCTCCTCGC GACT; SEQ ID NO: 117 |
| Cpf1 pair 2 | | GCGCGGCTTTACCAT AGAGTC; SEQ ID NO: 118 | CTTGCGAGAGAAGCG TGGTG; SEQ ID NO: 119 |
| Cpf1 pair 3 | | TTAAGGTCGTAGCCA GTCCG; SEQ ID NO: 120 | CTTGCCCAAGGCAGA TGACA; SEQ ID NO: 121 |
| Multi-guide outer primers | | TGTTGGACCCCAAAC ATCCA; SEQ ID NO: 122 | GGAGAGCGGGAGGAG TTGTA; SEQ ID NO: 123 |
| 5 kb outer primers for allelic cloning | Forward | AGTCACGACGTTGTAAAACGACGGCC AGTGGGAGGGTTGGAGTTTAGCCC; SEQ ID NO: 124 | |
| | Reverse | AGCTTGCATGCCTGCAGGTCGACTCT AGAGAACAAGCCTCTACCCACAGC; SEQ ID NO: 125 | |

Example 3: Discussion

To deliver paired Cas9 sgRNAs in lentivirus, each sgRNA requires a promoter to drive expression, current Cas9 deletion often uses mU6-hU6 promoter systems to reduce recombination during plasmid preparation and virus production (Zhu, 2016). Library cloning for a paired sgRNAs requires a two-step cloning to first insert paired sgRNAs and then cloned in the promoter. Additional steps in preparing library clones might increase the chance of losing sgRNA representations. Due to the ribonucleactivity of Cpf1, two sgRNAs can be expressed under the same promoter and later processed into two sgRNAs. One-step cloning can be used for Cpf1 dual-sgRNAs library preparation, demonstrating its ease of multiplexing.

When using the same amount of viral supernatant, Cas9 viral transductions show an overall lower titer compare to Cpf1 (>3-fold difference). Virus titer is indicated by puromycin survival rate after selection and needs to be tightly controlled in a pooled screen. Typically, MOI of 0.3-0.4 is recommended for pooled CRISPR screens to ensure single cell receives one or zero construct. If viral titer starts too low, it requires more cells to be used in the transduction, thus limiting the size of the sgRNA library, in turn, setting more constrains to the screening region.

The off-target cutting of Cas9 has the potential to confound a noncoding screening result. Cpf1 was reported to have significant lower off-target rate compares to Cas9 (Kim D. K., 2016; Kleinstiver, 2016). Using a Cas9 guide that has a relatively low specificity score (e.g. ~60% specificity score predicted by Doench model (Doench, 2016)), the off-target cutting significantly reduces the growth rate even though guides were targeting at a non-expressing gene locus, which might influence the outcome in screens evaluating essentiality.

Most of the screens use a two-vector system to deliver a sgRNA library to Cas9-expressing cell line. The 'all-in-one' vector described in the methods herein is easily used for comparison between effectors and cell lines. There is no need to establish the Cas9/Cpf1 expressing cell line, i.e., picking single cell-derived clones and evaluating effector activity for multiple clones (which usually takes months). There is no need to control for similar effector activity among cell lines if the goal of the screen is to, e.g., find cancer specific vulnerabilities (increasing cell lines multiplies the efforts). However, using an all-in-one vector may require more cells to be used in screens to average the effector activity variance among cells.

This application contains sequences and a sequence listing, which is hereby incorporated by reference in its entirety. Also incorporated by reference herein in its entirety is U.S. Provisional Patent Application No. 62/552,816, filed Aug. 31, 2017. Each and every patent, patent application, and publication, including websites cited throughout the specification, and sequence that is publicly available or is identified in the specification, is incorporated herein by reference. While the invention has been described with reference to particular embodiments, it will be appreciated that modifications can be made without departing from the spirit of the invention. Such modifications are intended to fall within the scope of the appended claims.

Sequence Listing Free Text

The following information is provided for sequences containing free text under numeric identifier <223>.

| SEQ ID NO: (containing free text) | Free text under <223> |
|---|---|
| 6 | <223> Direct repeat sequence |
| 7 | <223> Direct repest sequence. |
| 8 | <223> Pair a, guide 1, minus strand for Cas9 |
| 9 | <223> Pair a, guide 2, plus strand for Cas9 |
| 10 | <223> Pair b, guide 1, minus strand for Cas9 |
| 11 | <223> Pair b, guide 2, plus strand for Cas9 |
| 12 | <223> Pair c, guide 1, plus strand for Cpf1 |
| 13 | <223> Pair c, guide 2, plus strand for Cpf1 |
| 14 | <223> Pair d, guide 1, plus strand for Cpf1 |
| 15 | <223> Pair d, guide 2, minus strand or Cpf1 |
| 16 | <223> Pair e, guide 1, minus strand for Cpf1 |
| 17 | <223> Pair e, guide 2, plus strand for Cpf1 |
| 18 | <223> Pair f, guide 1, plus strand for Cas9 |
| 19 | <223> Pair f, guide 2, minus strand for Cas9 |
| 20 | <223> Pair g, guide 1, plus strand for Cas9 |
| 21 | <223> Pair g, guide 2, minus strand for Cas9 |
| 22 | <223> Pair h, guide 1, minus strand for Cas9 |
| 23 | <223> Pair h, guide 2, plus strand for Cas9 |
| 24 | <223> Pair i, guide 1, minus strand for Cpf1 (D239) |
| 25 | <223> Pair i, guide 2, plus strand for Cpf1 (D239) |
| 26 | <223> Pair j, guide 1, plus strand for Cpf1 (D240) |
| 27 | <223> Pair j, guide 2, minus strand for Cpf1 (D240) |
| 28 | <223> Pair k, guide 1, plus strand for Cpf1 (D241) |
| 29 | <223> Pair k, guide 2, plus strand for Cpf1 (D241) |
| 30 | <223> Pair l, guide 1, plus strand for Cpf1 (D216) |
| 31 | <223> Pair l, guide 2, minus strand for Cpf1 (D216) |
| 32 | <223> Pair 1, guide 1, plus strand for Cpf1 |
| 33 | <223> Pair 1, guide 2, minus strand for Cpf1 |
| 34 | <223> Pair 2, guide 1, minus strand for Cpf1 |
| 35 | <223> Pair 2, guide 2, minus strand for Cpf1 |
| 36 | <223> Pair 3, guide 1, minus strand for Cpf1 |
| 37 | <223> Pair 3, guide 2, minus strand for Cpf1 |
| 38 | <223> Pair 4, guide 1, minus strand for Cpf1 |
| 39 | <223> Pair 4, guide 2, plus strand for Cpf1 |
| 40 | <223> Pair 5, guide 1, plus strand for Cpf1 |
| 41 | <223> Pair 5, guide 2, plus strand for Cpf1 |
| 42 | <223> Pair 6, guide 1, minus strand for Cpf1 |
| 43 | <223> Pair 6, guide 2, plus strand for Cpf1 |
| 44 | <223> Pair 7, guide 1, plus strand for Cpf1 |
| 45 | <223> Pair 7, guide 2, plus strand for Cpf1 |
| 46 | <223> Pair 8, guide 1, minus strand for Cpf1 |
| 47 | <223> Pair 8, guide 2, minus strand for Cpf1 |
| 48 | <223> Pair 9, guide 1, minus strand for Cpf1 |
| 49 | <223> Pair 9, guide 2, minus strand for Cpf1 |
| 50 | <223> Pair 10, guide 1, minus strand for Cpf1 |
| 51 | <223> Pair 10, guide 2, plus strand for Cpf1 |
| 52 | <223> Pair 11, guide 1, minus strand for Cpf1 |
| 53 | <223> Pair 11, guide 2, plus strand for Cpf1 |
| 54 | <223> Pair 12, guide 1, minus strand for Cpf1 |
| 55 | <223> Pair 12, guide 2, minus strand for Cpf1 |
| 56 | <223> Pair 13, guide 1, minus strand for Cpf1 |
| 57 | <223> Pair 13, guide 2, minus strand for Cpf1 |
| 58 | <223> Pair 14, guide 1, minus strand for Cpf1 |
| 59 | <223> Pair 14, guide 2, plus strand for Cpf1 |
| 60 | <223> Pair 15, guide 1, plus strand for Cpf1 |
| 61 | <223> Pair 15, guide 2, plus strand for Cpf1 |
| 62 | <223> Pair 16, guide 1, plus strand for Cpf1 |
| 63 | <223> Pair 16, guide 2, plus strand for Cpf1 |
| 64 | <223> Pair 17, guide 1, minus strand for Cpf1 |
| 65 | <223> Pair 17, guide 2, plus strand for Cpf1 |
| 66 | <223> Pair 18, guide 1, plus strand for Cpf1 |
| 67 | <223> Pair 18, guide 2, plus strand for Cpf1 |
| 68 | <223> Pair 19, guide 1, plus strand for Cpf1 |
| 69 | <223> Pair 19, guide 2, minus strand for Cpf1 |
| 70 | <223> Pair 20, guide 1, minus strand for Cpf1 |
| 71 | <223> Pair 20, guide 2, plus strand for Cpf1 |
| 72 | <223> Pair 21, guide 1, plus strand for Cpf1 |
| 73 | <223> Pair 21, guide 2, minus strand for Cpf1 |
| 74 | <223> Pair 22, guide 1, minus strand for Cpf1 |
| 75 | <223> Pair 22, guide 2, minus strand for Cpf1 |
| 76 | <223> Pair 23, guide 1, minus strand for Cpf1 |
| 77 | <223> Pair 23, guide 2, plus strand for Cpf1 |
| 78 | <223> Pair 24, guide 1, plus strand for Cpf1 |
| 79 | <223> Pair 24, guide 2, plus strand for Cpf1 |
| 80 | <223> Non-targeting control guide 1 for Cas 9 |
| 81 | <223> Non-targeting control guide 2 for Cas 9 |
| 82 | <223> Non-targeting control guide 1 for Cpf1 |
| 83 | <223> Non-targeting control guide 2 for Cpf1 |
| 84 | <223> Guide 1, minus strand for two-guide deletion via Cpf1 |
| 85 | <223> Guide 2, plus strand for two-guide deletion via Cpf1 |
| 86 | <223> Set 1, Guide 1, minus strand for four-guide deletion via Cpf1 |
| 87 | <223> Set 1, Guide 2, plus strand for four-guide deletion via Cpf1 |
| 88 | <223> Set 1, Guide 3, minus strand for four-guide deletion via Cpf1 |
| 89 | <223> Set 1, Guide 4, plus strand for four-guide deletion via Cpf1 |
| 90 | <223> Set 2, Guide 1, minus strand for four-guide deletion via Cpf1 |
| 91 | <223> Set 2, Guide 2, minus strand for four-guide deletion via Cpf1 |
| 92 | <223> Set 2, Guide 3, minus strand for four-guide deletion via Cpf1 |
| 93 | <223> Set 2, Guide 4, plus strand for four-guide deletion via Cpf1 |
| 94 | <223> Normalization primers, forward. |
| 95 | <223> Normalization primers, reverse. |
| 96 | <223> 500 bp inner primers, Cas9 pair 1, forward. |

-continued

| SEQ ID NO: (containing free text) | Free text under <223> |
|---|---|
| 97 | <223> 500 bp inner primers, Cas9 pair 1, reverse. |
| 98 | <223> 500 bp inner primers, Cas9 pair 2, forward. |
| 99 | <223> 500 bp inner primers, Cas9 pair 2, reverse. |
| 100 | <223> 500 bp inner primers, Cpf1 pair 1, forward. |
| 101 | <223> 500 bp inner primers, Cpf1 pair 1, reverse. |
| 102 | <223> 500 bp inner primers, Cpf1 pair 2, forward. |
| 103 | <223> 500 bp inner primers, Cpf1 pair 2, reverse. |
| 104 | <223> 500 bp inner primers, Cpf1 pair 3, forward. |
| 105 | <223> 500 bp inner primers, Cpf1 pair 3, reverse. |
| 106 | <223> 5 kb inner primers, forward. |
| 107 | <223> 5 kb inner primers, reverse. |
| 108 | <223> Multi-guide inner primers, forward. |
| 109 | <223> Multi-guide inner primers, reverse. |
| 110 | <223> 5 kb outer primers, forward. |
| 111 | <223> 5 kb outer primers, reverse. |
| 112 | <223> 500 bp outer primers, Cas9 pair 1, foward. |
| 113 | <223> 500 bp outer primers, Cas9 pair 1, reverse. |
| 114 | <223> 500 bp outer primers, Cas9 pair 2, foward. |
| 115 | <223> 500 bp outer primers, Cas9 pair 2, reverse. |
| 116 | <223> 500 bp outer primers, Cpf1 pair 1, forward. |
| 117 | <223> 500 bp outer primers, Cpf1 pair 1, reverse. |
| 118 | <223> 500 bp outer primers, Cpf1 pair 2, forward. |
| 119 | <223> 500 bp outer primers, Cpf1 pair 2, reverse. |
| 120 | <223> 500 bp outer primers, Cpf1 pair 3, forward. |
| 121 | <223> 500 bp outer primers, Cpf1 pair 3, reverse. |
| 122 | <223> Multi-guide outer primers, forward. |
| 123 | <223> Multi-guide outer primers, reverse. |
| 124 | <223> 5 kb outer primers for allelic cloning, forward. |
| 125 | <223> 5 kb outer primers for allelic cloning, reverse. |

REFERENCES al Yacoub, N. R. (2007). Optimized production and concentration of lentiviral vectors containing large inserts. *J Gene Med*, 9, 579-584.

Bernd Zetsche, e. a. (2015). Cpf1 is a single RNA-guided endonuclease of a class 2 CRISPR-Cas system. *Cell*, 163.3 (2015): 759-771.

Brake, O. T. (2008). Lentiviral Vector Design for Multiple shRNA Expression and Durable HIV-1 Inhibition. *Mol Ther*, 16, 557-564.

Canver, M. C. (2014). Characterization of genomic deletion efficiency mediated by clustered regularly interspaced palindromic repeats (CRISPR)/Cas9 nuclease system in mammalian cells. *The Journal of Biological Chemistry*, 289, 21312-21324.

Diao, Y. F. (2017). A tiling-deletion-based genetic screen for cis-regulatory element identification in mammalian cells. *Nat Methods*, 14, 629-635.

Doench, J. G. (2016). Optimized sgRNA design to maximize activity and minimize off-target effects of CRISPR-Cas9. *Nature Biotechnology*, 34, 184-191.

Fonfara, I. R. (2016). The CRISPR-associated DNA-cleaving enzyme Cpf1 also processes precursor CRISPR RNA. *Nature*, 532, 517-521.

Hsu, P. D. (2013). DNA targeting specificity of RNA-guided Cas9 nucleases. *Nat Biotechnol*, 31, 827-832.

Kadonaga, J. T. (2012). Perspectives on the RNA polymerase II core promoter. *Wiley Interdisciplinary Reviews: Developmental Biology*, 1.1: 40-51.

Kim, D. K. (2016). Genome-wide analysis reveals specificities of Cpf1 endonucleases in human cells. *Nature Biotechnology*, 34, 863-868.

Kim, H. K. (2017). In vivo high-throughput profiling of CRISPR-Cpf1 activity. *Nat Methods*, 14, 153-159.

Kleinstiver, B. P. (2016). Genome-wide specificities of CRISPR-Cas Cpf1 nucleases in human cells. *Nature Biotechnology*, 34, 869-874.

Ma, L. &. (2014). Quantitative analysis of copy number variants based on real-time LightCycler PCR. *Curr Protoc Hum Genet*, 80, Unit 7 21.

Ng P C, H. S. (2003). SIFT: predicting amino acid changes that affect protein function. *Nucleic Acids Res*, 31(13): 3812-4.

Ng, P. C., & Henikoff, S. (2002). Accounting for Human Polymorphisms Predicted to Affect Protein Function. *Genome Res*, 12(3):436-46.

Ng, P. C., & Henikoff, S. (2006). Predicting the Effects of Amino Acid Substitutions on Protein Function. *Annu Rev Genomics Hum Genet*, 7:61-80.

Ng, P. C., & Henikoff, S. (2009). Predicting the effects of coding non-synonymous variants on protein function using the SIFT algorithm. *Nat Protoc*, 4(7):1073-81.

Pulido-Quetglas, C. A.-P. (2017). Scalable Design of Paired CRISPR Guide RNAs for Genomic Deletion. *PLoS Comput Biol*, 13, e1005341.

Sanjana, N. E. (2014). Improved vectors and genome-wide libraries for CRISPR screening. *Nat Methods*, 11, 783-784.

Sim, N.-L., Kumar, P., Hu, J., Henikoff, S., Schneider, G., & Ng, P. C. (2012). SIFT web server: predicting effects of amino acid substitutions on proteins. *Nucleic acids research, Volume* 40, Issue W1, W452-W457.

Yamano, T., Nishimasu, H., Zetsche, B., Hirano, H., Slaymaker, I. M., Li, Y., . . . Nureki, O. (2016). Crystal structure of Cpf1 in complex with guide RNA and target DNA. *Cell*, 165(4): 949-962.

Young, C. S. (2016). A Single CRISPR-Cas9 Deletion Strategy that Targets the Majority of DMD Patients Restores Dystrophin Function in hiPSC-Derived Muscle Cells. *Cell Stem Cell*, 18, 533-540.

Zetsche B, H. M. (2017). Multiplex gene editing by CRISPR-Cpf1 using a single crRNA array. *Nat Biotechnol*, 35, 31-34.

Zetsche, B. G. (2015). Cpf1 is a single RNA-guided endonuclease of a class 2 CRISPR-Cas system. *Cell*, 163, 759-771.

Zetsche, B., Strecker, J., Abudayyeh, O. O., Gootenberg, J. S., Scott, D. A., & Zhang, F. (2017). A Survey of Genome Editing Activity for 16 Cpf1 orthologs. *bioRxiv*, 134015.

Zhu, S. L. (2016). Genome-scale deletion screening of human long non-coding RNAs using a paired-guide RNA CRISPR-Cas9 library. *Nat Biotechnol*, 34, 1279-1286.

The invention claimed is:

1. An in vitro method comprising:
   (a) transducing a mammalian cell with one or more lentiviral vectors, each vector comprising
      (i) a nucleic acid sequence encoding a Cpf1 (Cas12a) protein in operative association with an RNA pol II promoter which controls expression thereof, in a mammalian cell; and
      (ii) a flipped CRISPR RNA (crRNA) array comprising at least two spacers,
   wherein each spacer encodes an RNA guide, wherein each guide hybridizes to a unique sequence located 3 from a T-rich protospacer-adjacent motif (PAM) in a contiguous region of the genome or a chromosome of a mammalian cell, said array in operative association with an RNA pol III promoter, wherein the RNA pol II promoter and the RNA pol III promoter are independent from each other and are present in opposing orientations with respect to each other; and
   (b) culturing said transduced cells, wherein in the cultured cells, the Cpf1 (Cas12a) creates a deletion comprising the chromosome or genome between cleavage sites located downstream of the PAM, thereby providing a plurality of transduced cell cultures, each cell culture comprising said deletion.

2. The method according to claim 1, wherein said crRNA array comprises between two to ten said spacers.

3. The method according to claim 1, wherein the crRNA array comprises a first spacer, a second spacer, and a direct repeat sequence positioned between and interconnecting the first spacer and the second spacer.

4. The method according to claim 3, wherein at least one direct repeat is an engineered optimized repeat.

5. The method according to claim 4, wherein the optimized repeat comprises a nucleic acid sequence, TAATTTCTACTAAGTGTAGAT, SEQ ID NO: 7.

6. The method according to claim 4, wherein the optimized repeat consists of a nucleic acid sequence, TAATTTCTACTAAGTGTAGAT, SEQ ID NO: 7.

7. The method according to claim 1, further comprising prior to the transducing step generating a library of CRISPR RNA (crRNA) spacers, wherein each spacer encodes an RNA guide which hybridizes to a unique sequence located 3' from a T-rich protospacer-adjacent motif (PAM) in a contiguous region of the genome or a chromosome of the mammalian cell, and wherein each crRNA guide hybridizes to a protospacer that is unique as compared to that of any other crRNA in the library.

8. The method according to claim 1, further comprising harvesting genomic DNA from each cell culture to identify or quantify the deletion.

9. The method according to claim 1, wherein the Cpf1 (Cas12a) cleavage sites for any two crRNA spacers are spaced apart in contiguous sequence of the genome or chromosome by about 100 bp to about 1 mb.

10. The method according to claim 1, wherein the deletion occurs in a non-coding sequence of said genome or chromosome.

11. The method according to claim 1, wherein the deletion occurs in a coding sequence of said genome or chromosome.

12. The method according to claim 1, wherein the culturing step occurs for between more than two and less than 30 days.

13. The method according to claim 1, further comprising identifying or quantifying the effects of said deletion on the cell.

14. The method according to claim 1, further comprising identifying or quantifying a phenotypic change of the transfected cell cultures.

15. The method according to claim 1, further comprising identifying or quantifying response of the transfected cell cultures to a treatment.

16. The method according to claim 15, wherein the treatment comprises contact of the cultured cells to a chemical or biological agent or compound, or exposure to a physical treatment.

17. The method according to claim 16, wherein said treatment comprises contact of the cells with the chemical compound, and the response is demonstrated as a change in response to the compound in the transduced cultured cells compared to the response exhibited by the cell culture without the deletion.

18. A library of mammalian cell cultures, wherein each cell of the cell culture comprises at least one deletion in a contiguous DNA of a chromosome or the genome, and wherein the library is generated by the method of claim 1.

19. The library according to claim 18, wherein the cell is an embryonic stem cell or a cancer cell.

20. The method of claim 1, wherein the RNA Pol II promoter is EFS and the RNA pol III promoter is hU6.

* * * * *